US007067804B2

(12) United States Patent
Chen et al.

(10) Patent No.: US 7,067,804 B2
(45) Date of Patent: Jun. 27, 2006

(54) ATMOSPHERIC PRESSURE ION LENS FOR GENERATING A LARGER AND MORE STABLE ION FLUX

(75) Inventors: David D. Y. Chen, Vancouver (CA); Donald J. Douglas, Vancouver (CA); Bradley B. Schneider, Bradford (CA)

(73) Assignee: The University of British Columbia, Vancouver (CA)

( * ) Notice: Subject to any disclaimer, the term of this patent is extended or adjusted under 35 U.S.C. 154(b) by 289 days.

(21) Appl. No.: 10/275,990

(22) PCT Filed: May 22, 2001

(86) PCT No.: PCT/CA01/00728

§ 371 (c)(1),
(2), (4) Date: Nov. 21, 2002

(87) PCT Pub. No.: WO01/91158

PCT Pub. Date: Nov. 29, 2001

(65) Prior Publication Data

US 2004/0011953 A1 Jan. 22, 2004

Related U.S. Application Data

(60) Provisional application No. 60/229,321, filed on Sep. 1, 2000, and provisional application No. 60/205,549, filed on May 22, 2000.

(51) Int. Cl.
*B01D 59/44* (2006.01)
*H01J 49/00* (2006.01)

(52) U.S. Cl. ....................... 250/288; 250/281; 250/282; 250/286; 250/287

(58) Field of Classification Search ................. 250/288, 250/281, 286, 287, 282
See application file for complete search history.

(56) References Cited

U.S. PATENT DOCUMENTS 4,842,701 A 6/1989 Smith et al.

(Continued)

FOREIGN PATENT DOCUMENTS

| | | | |
|---|---|---|---|
| WO | WO 99/19899 | A1 | 4/1999 |
| WO | WO 00/15321 | | 3/2000 |
| WO | WO 00/52455 | A | 9/2000 |
| WO | WO 01/50499 | A1 | 7/2001 |
| WO | WO 02/08724 | A2 | 1/2002 |
| WO | WO 02 059563 | A2 | 8/2002 |

OTHER PUBLICATIONS

Beavis, R.C., An Automated Off-Line Liquid Chromatography—Mass Spectrometry Interface using Solid Phase, Time-of-Flighl Secondary Ion Mass Spectrometry, Thesis Dissertation, 1987, pp. 43-46, 77-79, 82-93.

(Continued)

*Primary Examiner*—Nikita Wells
*Assistant Examiner*—Johnnie L Smith, II
(74) *Attorney, Agent, or Firm*—Bereskin & Parr

(57) ABSTRACT

An ion lens is used to focus ions produced by various types of ion sources which are substantially at atmospheric pressure. The ions are focused to the inlet of a downstream mass spectrometer or other devices which require a larger and more stable ion flux improved performance. The ion lens is mounted in close proximity to the sprayer tip. The ion lens increases the total ion count rate summed over all of the generated ions. The ion lens may also be employed to vary the degree of ion fragmentation and the charge state pattern of the generated ions. The ion lens may also result in a more stable ion signal. Furthermore, more than one ion lens may be used. This invention may also be extended to multi-sprayer ion sources.

62 Claims, 43 Drawing Sheets

U.S. PATENT DOCUMENTS

| | | | | | |
|---|---|---|---|---|---|
| 4,885,076 | A | | 12/1989 | Smith et al. | |
| RE34,757 | E | | 10/1994 | Smith et al. | |
| 5,412,208 | A | | 5/1995 | Covey et al. | |
| 5,432,343 | A | | 7/1995 | Gulcicek et al. | |
| 5,495,108 | A | | 2/1996 | Apffel, Jr. et al. | |
| 5,747,799 | A | | 5/1998 | Franzen | |
| 5,750,988 | A | | 5/1998 | Apffel et al. | |
| 5,838,002 | A | | 11/1998 | Sheehan | |
| 5,838,003 | A | * | 11/1998 | Bertsch et al. | 250/288 |
| 6,060,705 | A | | 5/2000 | Whitehouse et al. | |
| RE36,892 | E | | 10/2000 | Apffel, Jr. et al. | |
| 6,245,227 | B1 | | 6/2001 | Moon et al. | |
| 6,359,275 | B1 | * | 3/2002 | Bertsch et al. | 250/281 |
| 6,462,337 | B1 | | 10/2002 | Li et al. | |
| 6,586,731 | B1 | * | 7/2003 | Jolliffe | 250/288 |
| 6,690,004 | B1 | * | 2/2004 | Miller et al. | 250/286 |
| 2001/0013579 | A1 | | 8/2001 | Andrien et al. | |
| 2002/0000517 | A1 | | 1/2002 | Corso et al. | |
| 2002/0096631 | A1 | | 7/2002 | Andrien et al. | |

OTHER PUBLICATIONS

Beavis et al., An Improved Method of Target Preparation By Electrospray, Proceedings of the 31st ASMS Conference on Mass Spectrometry and Allied Topics, Boston, May 8–13, 1983, p. 679–680.

Beavis et al., Automated Dry Fraction Collection For Microbore High–Performance Liquid Chromatography–Mass Spectrometry, Journal of Chromatography, 359 (1986), pp. 489–497.

Bruins, A.P.; Covey, T.R.; Henion, J.D., "Ion Spray Interface for Combined Liquid Chromatography/Atmospheric Pressure Ionization Mass Spectrometry", Anal. Chem. 1987, 59, 2642–2646.

Cao, P.; Moini, M., "A Novel Sheathless Interface for Capillary Electrophoresis/Electrospray Ionization Mass Spectrometry Using an In–capillary Electrode", J. Am. Soc. Mass Spectrom. 1997, 8, 561–564.

Dole, M.; Mach, L.L.; Hines, R.L.; Mobley, R.C.; Ferguson, L.P.; Alice, M.B. "Molecular Beams of Macroions", J. Chem. Phys. 1968, 49, 2240–2249.

Eckers, C.; Wolff, J. C.; Haskins, N. J.; Sage, A. B.; Giles, K.; Bateman, R. Accurate Mass Liquid Chromatography/Mass Spectrometry on Orthogonal Acceleration Time–of–Flight Mass Analyzers Using Switching between Separate Sample and Reference Sprays. 1. Proof of Concept. Analytical Chemistry, Aug. 15, 2000, vol. 72, No. 16, p. 3683–3688.

Feng, Xiao and Agnes, George R., "Single Isolated Droplets With Net Charge as a Source of Ions", J Am Soc Mass Spectrom 2000, 11, pp. 393–399.

Figeys, D.; Aebersold, R., "High sensitivity identification of proteins by electrospray ionization tandem mass spectrometry: Initial comparison between an ion trap mass spectrometer and a triple quadrupole mass spectrometer", Electrophoresis, 18, 1997, 360–368.

Figeys, D.; Ning, Y.; Aebersold, R., "A Microfabricated Device for Rapid Protein Identification by Microelectrospray Ion Trap Mass Spectrometry", Anal. Chem. 1997, 69, 3153–3160.

Hofstadler, S.A.; Severs, J.C.; Swanek, F.D.; Ewing, A. G.; Smith, R.D., "Analysis of Single Cells with Capillary Electrophoresis Electrospray Ionization Fourier Transform Ion Cycloton Resonance Mass Spectrometry", Rapid Communications in Mass Spectrometry, vol. 10, 1996, 919–922.

Iribarne et al., "On the evaporation of small ions from charged droplets", The Journal of Chemical Physics, vol. 64, No. 6, Mar. 15, 1976, pp. 2287–2294.

Jorgenson, Mikkers, et al., "On–Line Mass Spectrometric Detection for Capillary Zone Electrophoresis", Anal. Chem., 1987, 1230–1232.

Kebarle, P.; Tang, L., "From Ions In Solution To Ions In The Gas Phase", Analytical Chemistry, vol. 65, No. 22, Nov. 15, 1993, 972A–986A.

Liu, H. et al., "Development of Multichannel Devices with an Array of Electrospray Tips for High–Throughput Mass Spectrometry", Analytical Chemistry, vol. 72, No. 14, Jul. 15, 2000, p. 3303–3310.

Lu et al., "Pulsed Electrospray for Mass Spectrometry", Analytical Chemistry, vol. 73, No. 19, Oct. 1, 2001, pp. 4748–4753.

Schmelzeisen–Redeker et al., "Desolvation of Ions and Molecules in Thermospray Mass Spectrometry", Int. J. Mass Spectrom. Ion Processes, 1989, 90, pp. 139–150.

Severs, J.C.; Smith, R.D. Characterization of the Microdialysis Junction Interface for Capillary Electrophoresis/Microelectrospray Ionization Mass Spectrometry, Anal. Chem., vol. 69, No. 11, Jun. 1, 1997, 2154–2158.

Smith, A.D.; Moini, M., Control of Electrochemical Reactions at the Capillary Electrophoresis Outlet/Electrospray Emitter Electrode under CE/ESI–MS through the Application of Redox Buffers, Anal. Chem. vol. 73, No. 2, Jan. 15, 2001, 240–246.

Smith et al., Capillary Zone Electrophoresis—Mass Spectrometry Using an Electrospray Ionization Interface, Analytical Chemistry, vol. 60, No. 5, Mar. 1, 1988, p. 436–441.

Standing, K.G. et al., Secondary Ion Mass Spectrometry By Time–of–Flight, International Journal of Mass Spectrometry and Ion Physics, 53 (1983), pp. 125–134.

Takahashi, Y.; Fujimaki, S.; Kobayashi, T.; Morita, T., Higuchi, T., Accurate mass determination by multiple sprayers nano–electrospray mass spectrometry on a magnetic sector instrument. Rapid Communications in Mass Spectrometry, 2000, 14, p. 947–949.

Tang Keqi et al., Generation of Multiple Electrosprays Using Microfabricated Emitter Arrays for Improved Mass Spectrometric Sensitivity, Anal. Chem. 2001, vol. 73, No. 8, Apr. 15, 2001, pp. 1658–1663.

Wahl, J.H.; Gale, D.C.; Smith, R.D., "Sheathless capillary electrophoresis–electrospray ionization mass spectrometry using 10 μm I.D. capillaries: analyses of tryptic digests of cytochrome c", J. Chromatrogr. A. 1994, 659, 217–222.

Whitehouse, C.M.; Dreyer, R.N.; Yamashita, M.; Fenn, J.B., "Electrospray Interface for Liquid Chromatographs and Mass Spectrometers", Anal. Chem. 1985, 57, 675–679.

Wilm, M.; Mann, M., "Analytical Properties of the Nanoelectrospray Ion Source", Anal. Chem. 1996, 68, 1–8.

Yamashita, M.; Fenn, J.D., "Electrospray Ion Source. Another Variation on the Free–Jet Theme", J. Phys. Chem, 1984, 88, 4451–4459.

Yamashita, M.; Fenn, J.D., "Negative Ion Production with the Electrospray Ion Source", J. Phys. Chem, 1984, 88, 4671–4675.

Zhang, B.; Foret, F.; Karger, B.L., "A Microdevice with Integrated Liquid Junction for Facile Peptide and Protein Analysis by Capillary Electrophoresis/Electrospray Mass Spectrometry", Anal. Chem. 2000, 72, 1015–1022.

* cited by examiner

ATMOSPHERIC PRESSURE ION LENS FOR GENERATING A LARGER AND MORE STABLE ION FLUX

REFERENCE TO RELATED APPLICATION

This application is a national phase entry application of PCT application Ser. No. PCT/CA01/00728 filed on May 22, 2001. Accordingly, this application also claims priority from U.S. Provisional Patent Application Ser. No. 60/205,549 filed on May 22, 2000 and U.S. Provisional Patent Application Ser. No. 60/229,321 filed on Sep. 1, 2000.

FIELD OF THE INVENTION

The present invention relates to various types of ion sources such as, but not limited to, ionspray, electrospray, reduced liquid flow-rate electrospray, reduced liquid flow-rate ionspray, nanospray and atmospheric pressure chemical ionization (APCI) sources. More particularly, the present invention relates to increasing the ion signal stability and the ion flux generated by various types of electrospray ion sources.

BACKGROUND OF THE INVENTION

Electrospray ionization (ESI) is a method of generating ions in the gas phase at relatively high pressure. ESI was first proposed as a source of ions for mass analysis by Dole et al. (Dole, M.; Mach, L. L.; Hines, R. L.; Mobley, R. C.; Ferguson, L. P.; Alice, M. B. J. Chem. Phys. 1968, 49, 2240–2249). The work of Fenn and coworkers (Yamashita, M.; Fenn, J. D. J. Phys. Chem. 1984, 88, 4451–4459; Yamashita, M.; Fenn, J. D. J. Phys. Chem. 1984, 88, 4671–4675; Whitehouse, C. M.; Dreyer, R. N.; Yamashita, M.; Fenn, J. B. Anal. Chem. 1985, 57, 675–679) helped to demonstrate its potential for mass spectrometry. Since then, ESI has become one of the most commonly used types of ionization techniques due to its versatility, ease of use, and effectiveness for large biomolecules.

ESI involves passing a liquid sample through a capillary which is maintained at a high electric potential. Droplets from the liquid sample become charged and an electrophoretic type of charge separation occurs. In positive ion mode ESI, positive ions migrate downstream towards the meniscus of a droplet which forms at the tip of a capillary. Negative ions are attracted towards the capillary and this results in charge enrichment in the growing droplet. Subsequent fissions or evaporation of the charged droplet result in the formation of single solvated gas phase ions (Kebarle, P.; Tang, L. Analytical Chemistry, 1993, 65, 972A–986A). These ions are then usually transmitted to a downstream aperture of an analysis device such as a quadrupole mass spectrometer, a time of flight mass spectrometer, an ion trap mass spectrometer, an ion cyclotron resonance mass analyzer or the like.

Ionspray is a form of ESI in which a nebulizer gas flow is used to promote an increase in droplet fission. The nebulizer gas aids in the break-up of droplets formed at the capillary tip. Ions formed in this manner can be directed into the vacuum system of various mass analyzers which include, but are not limited to, quadrupoles, time of flight, ion traps and ion cyclotron resonance mass analyzers.

Unfortunately, the use of ESI and ionspray with mass spectrometers results in poor ion sampling efficiency. Typically, the majority of ion losses occur between the atmospheric pressure region, where the ions are generated, and the first differentially pumped vacuum stage that the ions must enter. Ions are formed in a broad plume of the electrospray, typically up to 1 cm in diameter. The ion sampling orifice, i.e. inlet orifice of the mass spectrometer, is typically about 0.01 to 0.025 cm in diameter, and so only a small fraction of the ions pass through the sampling aperture. The size of the aperture separating the atmospheric pressure region from the first vacuum stage provides a conductance limit for the flow of gas and ions into the mass spectrometer. The diameter of the aperture is limited by the pumping speed of the vacuum system of the mass spectrometer. Due to the substantial expense associated with vacuum pumps, a compromise must be reached between the desired aperture size and the cost of the vacuum pumps. In addition, since the ion motion at atmospheric pressure is dependent upon the shape and distribution of the equipotential lines, many ions are not directed to the inlet aperture.

Accordingly, there have been attempts to increase the ion sampling efficiency which have led to the development of nanoelectrospray ionization (Wilm, M.; Mann, M. Anal. Chem. 1996, 68, 1–8) and other reduced flow rate electrospray ionization sources (Figeys, D.; Aebersold, R. Electrophoresis, 18, 1997, 360–368). Reduced flow-rate ionization sources make use of a tapered sprayer with an internal diameter that is much smaller than those used in typical ESI sources. Reduced flow rate ion sources typically have a flow rate of 0.05 to 1.0 μL/min and have a tapered sprayer with an internal diameter of 5–30 μm. Typical ESI and ionspray sources have flow rates of 1–1000 μL/min and sprayer tip diameters of 50–200 μm. For a given analyte concentration, the signal with a reduced flow-rate ion source is typically as great as or greater than that of conventional electrospray sources even though much lower flow rates are required. This is a result of the substantial increase in the sampling efficiency of the analyte ions generated by the source. Reduced flow-rate ion sources may also incorporate a nebulizer gas flow. These types of ion sources are referred to as reduced flow-rate ionspray sources in the text that follows.

Another approach that can be used to increase the ion sampling efficiency of ESI for mass spectrometry involves modifying the mass spectrometer to which the ESI source is attached. In particular, the diameter of the entrance aperture of the mass spectrometer may be increased in order to draw more ions into the vacuum system. Provided that the ion to gas ratio remains constant, an increase in the ion signal is expected to be proportional to the increase in the gas flow. However, a larger vacuum pump will be required to maintain the same pressure within the mass spectrometer. Unfortunately, increasing the vacuum pump speed results in a mass spectrometer with a substantially higher cost.

Prior art methods have looked at applying potentials in a vacuum region or regions or a transition region or regions which are at reduced pressures to reduce the spread of the ions, i.e. to focus the ion beam. However, this is difficult because the ion spread is controlled by both equipotentials and gas velocity within the reduced pressure region or regions. Also, if an inappropriate potential were applied to the lens elements, undesirable ion fragmentation may result. Conversely, in an atmospheric pressure region, it is the equipotentials which dominate the ion trajectories and the distance that the ions travel between collisions is so short that the ions do not accumulate enough energy to effect ion fragmentation or to achieve significant velocity.

Ion lenses have been used in vacuum regions to focus ion beams and alter ion trajectories. Other prior art methods are directed towards improving ion trajectories immediately prior to entry into a downstream mass spectrometer. Franzen et al. (U.S. Pat. No. 5,747,799) described a ring electrode positioned on the inside wall of a heated capillary inlet, which was at or near atmospheric pressure, for a mass spectrometer that was downstream of an ESI source. The ring was intended to help draw ions into the inlet capillary of the mass spectrometer. The ring improved the shape of the equipotentials such that the electric field lines were pointed directly into the inlet capillary of the mass spectrometer. However, no evidence was given as to whether an appreciable increase in the ion signal was observed.

Gulcicek et al. (U.S. Pat. No. 5,432,343) disclosed an interface for an ESI source, at atmospheric pressure, connected to a mass spectrometer that contained a transition region with multiple vacuum stages. The transition region included at least one electrostatic lens that had to be properly positioned to aid in focusing the ions along a centerline. The electrostatic lens was intended to increase the ion transmission efficiency through the second and third differentially pumped stages of vacuum. In the ESI source housing, Gulcicek showed an end plate lens element and a cylindrical lens which was placed near the perimeter of the housing of the ESI source. The lenses in the ESI source housing were intended to help enrich the concentration of charged droplets near the centerline, in the ESI source, where the desorbed analyte ions could be more efficiently swept into a capillary entrance which led to the transition region. However, these lenses were located at a substantial distance from both the sprayer and the inlet aperture of the capillary that led to the transition region so it is questionable as to how much of a focusing effect the lenses in the source housing provided near the sprayer tip. While details of electric fields are given for other parts of the apparatus, no details are given of the electric field in this atmospheric ionization chamber. Furthermore, no results were shown to indicate that an increase in ion signal is achievable with this method.

Feng et al. (Feng, X.; Agnes, G. R. J. Am. Soc. Mass. Spectrom. 2000, 11, 393–399) evaluated several atmospheric pressure electrode designs to guide ions into the sampling orifice of a downstream mass spectrometer. The wire lenses were located downfield from a droplet levitation ion source. The flow rate of the ion source was 5 μL/min. Feng et al. found that the wire lenses led to increased ion currents detected within a mass spectrometer. However, the lenses used both AC and DC voltages which requires a more expensive power supply. Furthermore, the Feng device cannot be used with a curtain gas, therefore the practical use is limited. In addition, the Feng lens has been demonstrated to work only with single isolated droplets and not with a continuous ion source like an ESI source. Finally, the Feng lens is located in the desolvation region substantially downfield from the source of ions.

Whitehouse et al. (U.S. Pat. No. 6,060,705) added windows along an atmospheric pressure ionization chamber to allow for direct viewing of the electrospray and the atmospheric pressure ion source during operation. Whitehouse also disclosed a cylindrical electrode extending along the side walls of the atmospheric pressure ionization chamber and a nebulizer gas flow which was applied to the electrospray needle tip. There were also three electrostatic lenses in a transition region between the ion source and a downstream mass spectrometer. The potential of the cylindrical electrode within the source housing was set so that the charged ions which left the electrospray needle tip were directed and focused by an electric field towards an orifice or capillary entrance of the downstream mass spectrometer. Whitehouse noted that there was an increase in the ion signal when the potential applied to the cylindrical electrode, within the source housing, was increased, as well as when a potential was applied to the cylindrical lens and a nebulizer gas was used to aid in breaking-up the charged droplets. Whitehouse also demonstrated that the potentials and the needle position could be adjusted to optimize the electrospray performance. However, once again, the cylindrical electrode within the ESI source housing was far away from the ESI sprayer. Furthermore, the configuration of the cylindrical electrode was fixed, and the position or orientation of the electrode could not be adjusted.

Bertsch et al. (U.S. Pat. No. 5,838,003) disclosed an electrospray ionization chamber which operated substantially at or near atmospheric pressure and incorporated an asymmetric electrode. The asymmetric electrode was either one half of a full cylinder, a flat semicircular plate, a wire or a flat circular disk. The sprayer was oriented at a 90 degree angle to the axis of the ion entrance of the mass spectrometer. Bertsch also disclosed that the electrode may have extended past the tip of the sprayer. However, Bertsch demonstrated that the asymmetric electrode was required to initiate and sustain the electrospray. It appears that the asymmetric electrode is maintained at the same potential as a counter electrode, i.e. similar to other prior proposals there is no clear teaching of a separate lens maintained at a potential different from that of two electrodes establishing the basic electric field. Bertsch also taught that their device was applicable for flow rates of 1 μL/min up to 2 ml/min and thus was not applicable for reduced flow-rate ESI sources. Bertsch also stated that a nebulizer gas may be introduced to assist in the formation of an aerosol.

In other work, Tang et al. (Tang, K.; Lin, Y.; Matson, D.; Taeman, K.; Smith, R. D. Anal. Chem. 2001, 73, 1658–1663) disclosed multiple microelectrospray emitters which successfully generated stable multielectrosprays in a liquid flow rate range (1 to 8 μL/min total flow) compatible with mass spectrometry. Higher total electrospray ion currents were observed as the number of electrosprays increased at a given total liquid flow rate. Tang also disclosed that stable electrosprays could be generated at higher liquid flow rates compared to conventional single ESI sources in which the electrospray was generated from a fused-silica capillary. A nebulization gas may also be used with the multiple microelectrospray emitters.

In light of the prior art, a need still remains for an inexpensive apparatus that can be used to focus ions, as they are generated at the capillary tip, to increase the ion flux into a downstream device such as a mass spectrometer. It is especially important to note that very few studies to date have focused on methods of improving ion trajectories as the ions are generated in the sprayer plume of an ion source.

SUMMARY OF THE INVENTION

The present invention focuses on improving ion transmission into a downstream device, such as a mass spectrometer, by focusing on the point at which the ions and charged droplets are initially generated. This is accomplished by situating at least one "ion lens" in close proximity to the sprayer tip of an ion source that is substantially at atmospheric pressure. In this document, "ion lens" or "ion focusing element" means an electrode that can be used to change the equipotentials in the atmospheric pressure region in order to cause more ions from the source to reach a downstream device such as a mass spectrometer. More particularly, the invention is concerned with an "ion lens" mounted adjacent a sprayer tip or a sprayer outlet, to change the equipotentials as defined. Various shapes of ion lenses may be incorporated into the ESI source to focus a larger number of ions into the orifice of the downstream mass spectrometer. By adding a single ion lens and applying a high voltage to the ion lens, an increase in the total count rate of all ions in the mass spectrum has been observed when a reduced flow-rate ESI source and an ionspray source operating at high flow-rates were used. In addition, the ion signal stability was improved for both ion sources. Furthermore, the fragmentation and charge state patterns of the ions produced can be advantageously optimized by varying the geometry of the ion lens (or ion lenses) and the magnitude of the potentials applied to the ion lens (or ion lenses).

In a first aspect, the present invention provides an ion source apparatus for generating ions from an analyte sample, wherein the apparatus comprises an ion source, at least one counter electrode and an ion focusing element. The ion source is mounted opposite the at least one counter electrode and the ion focusing element is mounted relative to the ion source. In use, a potential difference is applied between the ion source and the at least one counter electrode to generate a spray of ionized droplets and to cause ions to move towards the at least one counter electrode. In addition, a potential is applied to the ion focusing element to change the equipotentials adjacent the ion source to focus and direct ions in a desired direction of ion propagation. The ion focusing element is located adjacent to the ion source such that the ions are directed along an axis extending from the ion source. The potential applied to the ion focusing element is adapted to ensure that the equipotentials adjacent to the ion source are substantially perpendicular to the desired axis of ion propagation, both on the axis and for a substantial area around the axis.

In a second aspect, the present invention provides a method for generating ions from an analyte sample. The method comprises the steps of:

1) supplying the analyte sample to an ion source;

2) providing at least one counter electrode spaced from the ion source;

3) providing a potential difference between the ion source and the at least one counter electrode to generate a spray of ions or ionized droplets; and, 4) providing an ion focusing element and applying a potential to the ion focusing element to change the equipotentials adjacent the ion source to focus and direct ions in a desired axis of ion propagation.

The method further comprises providing the ion focusing element adjacent to the ion source such that the ions are directed along an axis extending from the ion source. The method further comprises adjusting the potential applied to the ion focusing element to ensure that the equipotentials adjacent to the ion source are substantially perpendicular to the desired axis of ion propagation, both on the axis and for a substantial area around the axis.

It should be noted that in the present invention, an ion source is meant to comprise an ion sprayer. Furthermore, mass spectrometers typically have an orifice plate with an orifice such that the ion source apparatus may be bolted onto the orifice plate. Accordingly, a region is created between the curtain plate of the ion source apparatus and the orifice plate in which curtain gas may be placed.

Further objects and advantages of the invention will appear from the following description, taken together with the accompanying drawings.

BRIEF DESCRIPTION OF THE DRAWINGS

For a better understanding of the present invention and to show more clearly how it may be carried into effect, reference will now be made, by way of example, to the accompanying drawings which show preferred embodiments of the present invention and in which.

DETAILED DESCRIPTION OF THE INVENTION

In this description, like elements in different figures will be represented by the same numerals. In addition, all voltages are DC voltages. Furthermore, all simulation results shown in this description were obtained using the MacSIMION, version 2.0 simulation program.

Figure 1:
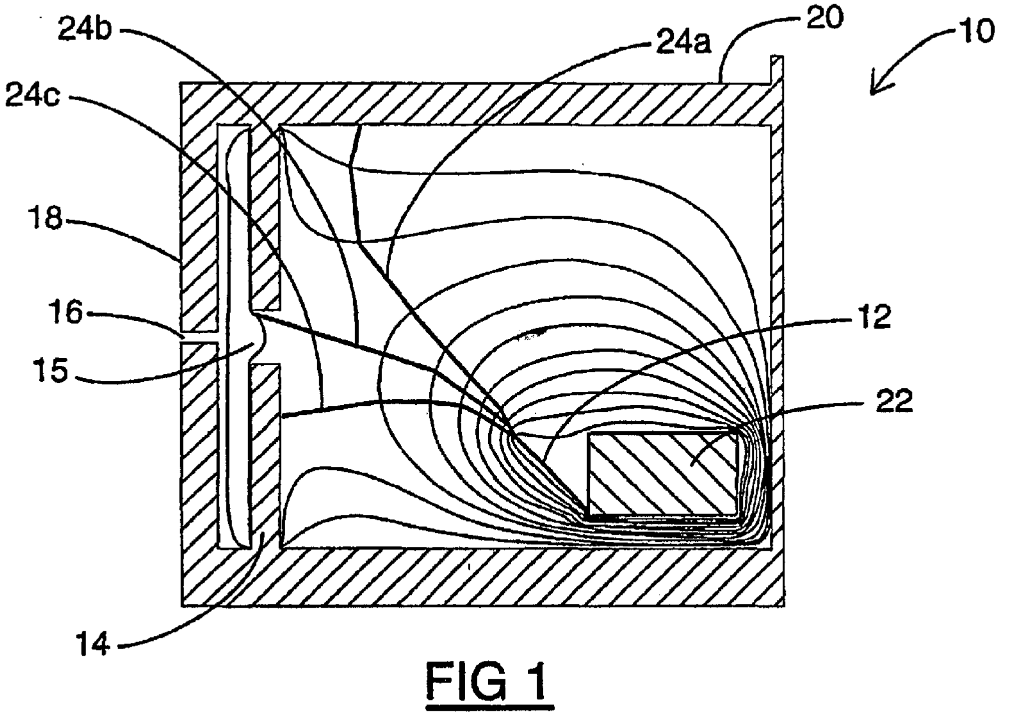
FIG. 1 is a simulation result showing equipotential lines and qualitative ion trajectories for a prior art conventional electrospray ion source operating at high liquid flow-rates.

Simulation results for prior art ion source configurations will be described first. Referring to FIG. 1, a conventional ionspray or high flow-rate ESI ion source 10 is shown comprising a sprayer 12, a curtain plate 14, an aperture 15 in the curtain plate 14, an orifice 16 in an orifice plate 18, a housing 20 and a sprayer mount 22. The curtain plate 14, the orifice plate 18, and the housing 20 serve as counter electrodes for the ESI ion source 10. The region between the curtain plate 14 and the orifice plate 18 is at atmospheric pressure and is flushed with a gas such as nitrogen. The rest of the interior of the housing 20 is also at atmospheric pressure. The orifice plate 18 separates the atmospheric pressure region in the housing 20 from any elements downstream from the housing 20 such as the first stage of the vacuum system of a mass spectrometer.

A simulation was conducted on this configuration in which the applied potentials were 5000 V on the sprayer 12, 1000 V on the curtain plate 14, 190 V on the orifice plate 18 and 0 V for the housing 20 (it is common practice to maintain the housing at ground). The ESI sprayer mount 22 was at the same potential as the sprayer 12. FIG. 1 shows that the equipotential lines, resulting from this arrangement of potentials, can be used to determine the direction of ion travel within the housing 20. Ions experience a force in the direction of an electric field. The direction of the electric field within the housing 20 is perpendicular to a tangential line drawn at any point on the equipotential lines. In an atmospheric environment, ions travel short distances between collisions and never gain substantial velocity. Hence, ion paths, in the absence of a gas flow, can be determined by assuming that they are always perpendicular to the equipotential lines. Accordingly, the curvature of the equipotential lines at the tip of the sprayer 12 can be used to determine a series of ion trajectories such as 24*a*, 24*b* and 24*c*. As shown, these ion trajectories 24*a*, 24*b* and 24*c* diverge over a wide range and demonstrate the defocusing that the ions undergo after they leave the tip of the sprayer 12. With this arrangement, the spatial spread of the ions formed at the tip of the sprayer 12 increases as the ions travel towards the curtain plate 14. This causes a large fraction of the generated ions to strike the curtain plate 14. Consequently, only a very small fraction of the ions generated by the sprayer 12 pass through the aperture 15 to reach orifice 16.

Figure 2:
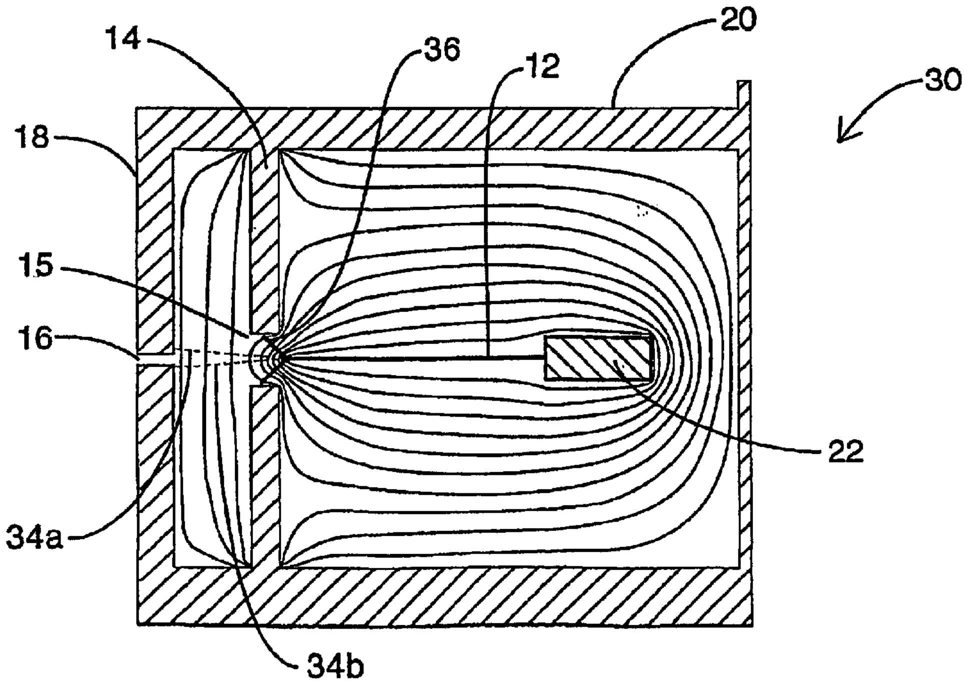
FIG. 2 is a simulation result showing equipotential lines and qualitative ion trajectories for one preferred orientation of a prior art reduced flow-rate ESI source.

Referring to FIG. 2, a conventional reduced flow-rate ESI source 30 is shown with the tip of the sprayer 12 located much closer to the curtain plate 14 than the conventional ion source that was shown in FIG. 1. The sprayer 12 is also centered in front of the inlet aperture 15. A simulation was conducted on this configuration in which the applied potentials were 3000 V for the sprayer 12, 1000 V on the curtain plate 14, 190 V on the orifice plate 18 and 0 V for the housing 20. The equipotential lines, once more, result in a defocusing of the ion trajectories near the tip of the sprayer 12. The ion trajectories 34*a* and 34*b* illustrate that a widening plume 36 of ions is generated which results in a low efficiency of ion transfer through the orifice 16. This is because the spatial spread of ions formed at the tip of the sprayer 12 becomes wider as the ions travel towards the orifice 16. This widening of ion trajectories causes a large number of ions to strike the curtain plate 14 or the orifice plate 18.

Figure 3:
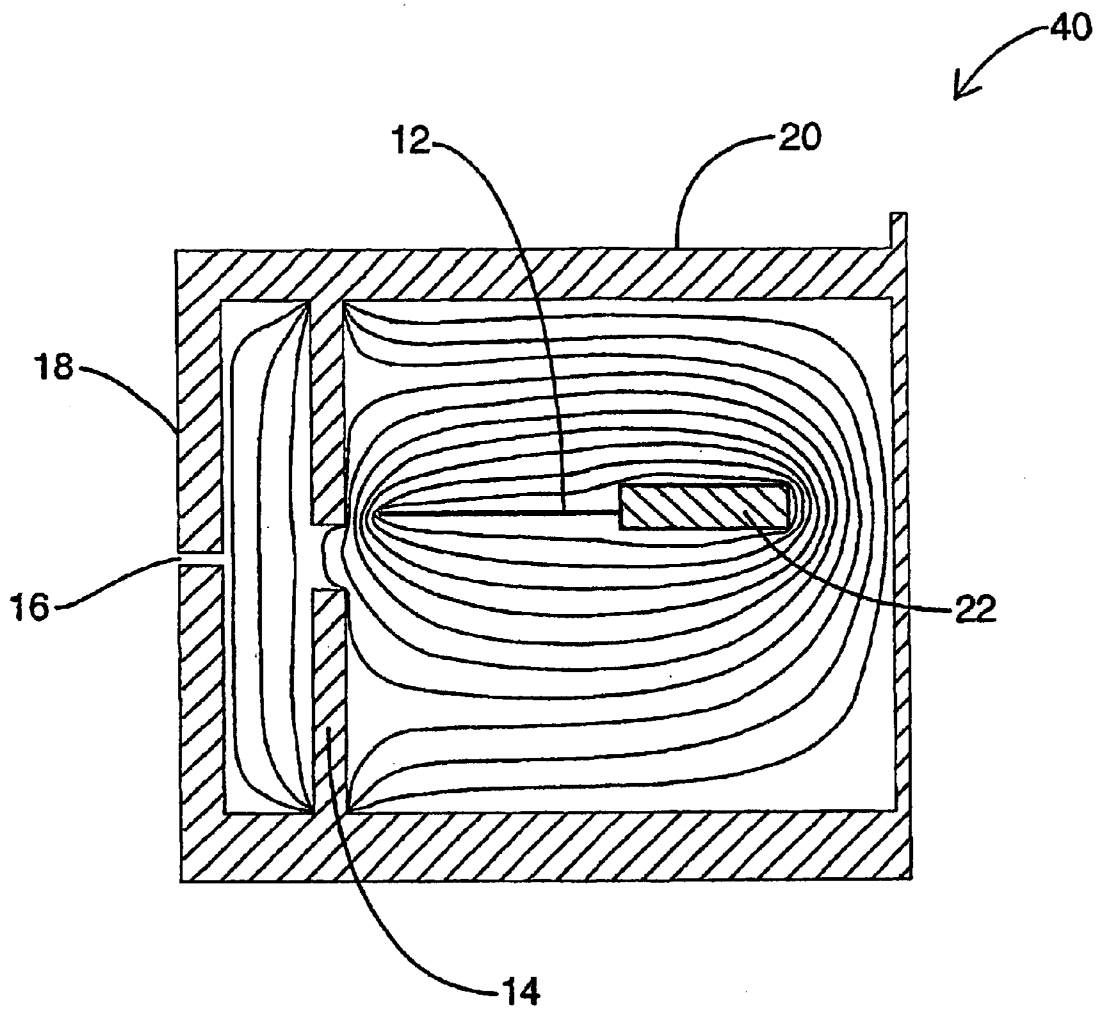
FIG. 3 is a simulation result showing equipotential lines and qualitative ion trajectories for a second preferred orientation of a prior art reduced flow-rate ESI source.

Referring to FIG. 3, an alternative arrangement for a conventional reduced flow rate ESI source 40 is shown having the same components shown in FIG. 2. In this arrangement, the sprayer 12 is slightly offset from the aperture 15 in the curtain plate 14. A simulation was performed using the potentials from the simulation shown in FIG. 2. The simulation results suggest a slight increase in ion signal sent through the orifice 16 because there is a decreased spread of ions even though the equipotentials located near the tip of the sprayer 12 still appear to be defocusing the ions. In this arrangement, the ions are directed at an angle that is sufficient to allow them to enter the orifice 16 more efficiently.

The present invention will now be discussed. The present invention provides an ion focusing element, in close proximity to the ion sprayer, for focusing droplets or ions emitted from the capillary tip of an ion source thereby improving the ion flux into a downstream device such as a mass spectrometer or the like.

Figure 4B:
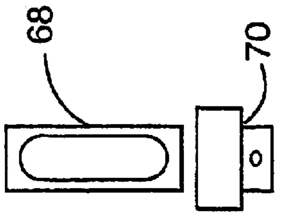
FIG. 4*b* is a front view of the ion lens of FIG. 4*a* placed on its side and an attachment device for biasing the ion lens at a desired potential.
Figure 4D:
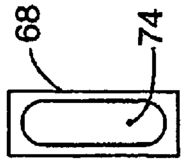
FIG. 4*d* is a front view of the ion lens of FIG. 4*c* surrounding the capillary tip from FIG. 4*c;*
Figure 4A:
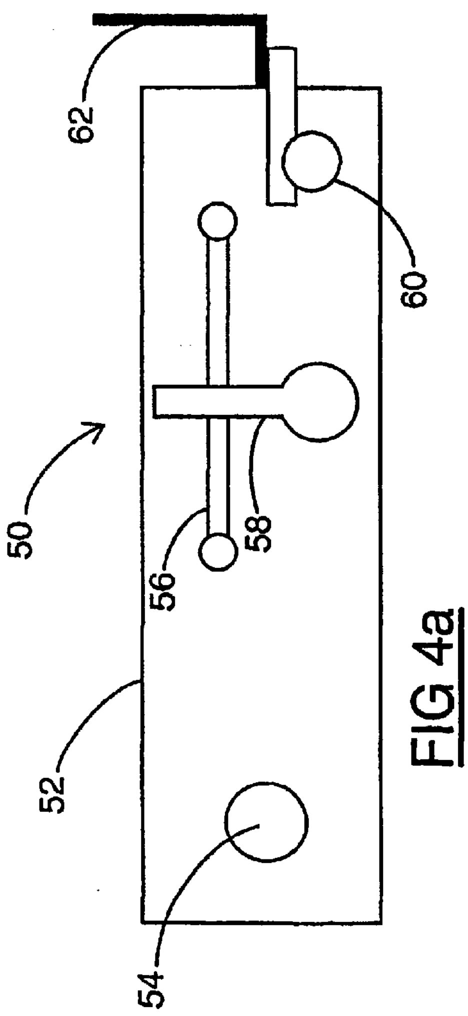
FIG. 4*a* is a top view of a mounting device with an ion lens placed near the tip of a reduced flow rate ESI source in accordance with the present invention.

Referring to FIG. 4*a,* an embodiment for a mounting device 50 for use with reduced flow-rate ESI sources is shown. The mounting device 50 comprises a sprayer mount 52 that is used to position an electrospray capillary 66 (FIG. 4*b*) and an ion lens 62. The sprayer mount 52 is made of plexiglass. Alternatively, another non-conductive material may be used for the sprayer mount 52. The sprayer mount 52 has a mounting hole 54, a groove 56, a conductive brass arm 58 and a set-screw 60 for securing an ion lens 62. The ion lens 62 may also be referred to as a lens electrode or a ring electrode. The mounting hole 54 is positioned on the sprayer mount 52 so that the sprayer mount 52 may be installed on commercial equipment, such as a mass spectrometer or the like, to replace a commercial ionspray or electrospray arm. The groove 56 is machined into the sprayer mount 52 to hold a stainless steel junction 64 which is the point of application of a potential to the electrospray capillary 66 to bias the tapered capillary tip 74 with respect to the ion source housing (not shown), in which the sprayer mount 52 is installed. The ion source housing is typically held at 0 V. The potential is then applied to a capillary 66 through the conductive brass arm 58. The set-screw 60 is used to position the ion lens 62 at various locations. Alternatively, other types of bracketry or mounting arrangements could be used to keep the ion lens 62 in place.

Alternatively, the capillary 66 can be coupled with the tapered tip 74 by any means known to those skilled in the art. This may include, but is not limited to, a low dead volume conductive fastener in place of the stainless tube, a liquid junction (Zhang, B.; Foret, F.; Karger, B. L. Anal. Chem. 2000, 72, 1015–1022.), or a microdialysis junction (Severs, J. C.; Smith, R. D. Anal. Chem. 1997, 69, 2154–2158). In addition, the end of the capillary 66 may be pulled to a tapered tip. In this case, the electrospray potential may be applied using sheathless types of interfaces. These may include, but are not limited to applying a conductive coating to the sprayer tip (Wahl, J. H.; Gale, D. C.; Smith, R. D. J. Chromatogr. A. 1994, 659, 217–222 and Hofstadler, S. A.; Severs, J. C.; Swanek, F. D.; Ewing, A. G.; Smith, R. D. Rapid Commun. Mass Spectrom. 1996, 10, 919–923), or inserting an electrode into the sprayer (Cao, P.; Moini, M. J. Am. Soc. Mass Spectrom. 1997, 8, 561–564 and Smith, A. D.; Moini, M. Anal. Chem. 2001, 73, 240–246). It will be apparent to those skilled in the art that there are many different methods for applying an electrospray potential to a reduced flow-rate ion source, and the above methods are given as examples only, and are in no way meant to limit the scope or the spirit of this invention. In addition, any fastening means may be used to couple a capillary tip with any of the above junctions, including, but not limited to glue, a set screw, a nut, an external clamp, or a compression fitting. In addition, the term microelectrospray can be used to describe reduced flow-rate electrospray sources (Figeys, D.; Ning, Y.; Aebersold, R. Anal. Chem. 1997, 69, 3153–3160).

Referring to FIG. 4*b,* the ion lens 62 comprises two parts. The first part of the ion lens 62 is a ring 68 which is positioned around the capillary 66. The second part of the ion lens 62 is an attachment element 70 which is adapted to bias the ion lens 62 at a desired potential.

Figure 4C:
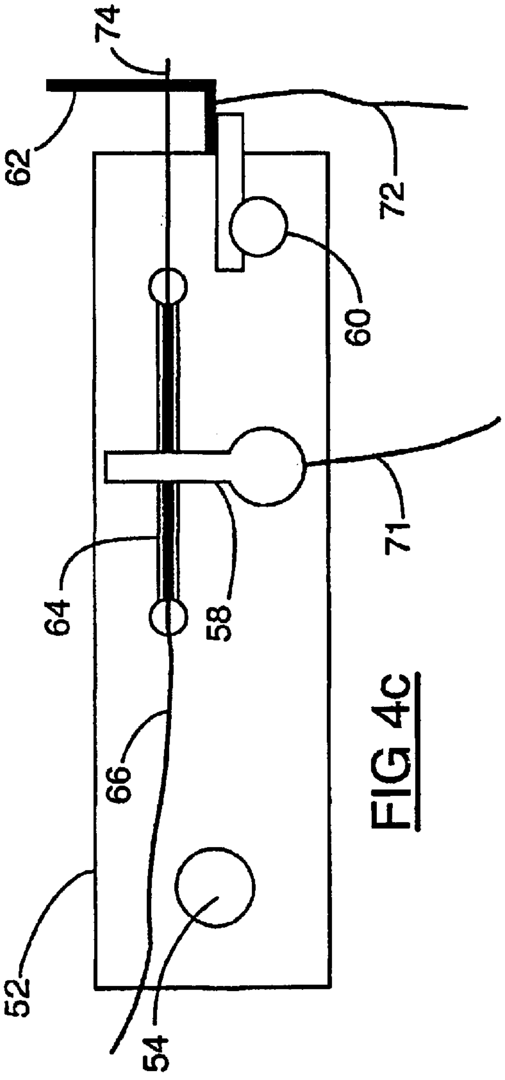
FIG. 4*c* is a top view of the device of FIG. 4*a* including a capillary.

Referring to FIG. 4*c,* a reduced flow rate ESI source is shown which comprises the capillary 66 and the sprayer mount 52. The capillary 66 and the tapered capillary tip 74 are connected inside the stainless steel junction 64 which is positioned on the groove 56. The tapered tip 74 of the capillary 66 is preferably as uniform as possible in shape. The tapered tip 74 has an internal diameter of approximately 5–30 μm for reduced flow-rate applications. In a variety of embodiments the capillary 66 may be connected to a syringe pump, a capillary electrophoresis instrument, a microfluidic device or any other type of fluid delivery system compatible with the requirements of a reduced flow-rate ion source. A separate external power supply (not shown) is connected to the ion lens 62 through a wire 72 for applying a potential to the ion lens 62. This potential may be optimized depending on the liquid sample carried in the capillary 66, the solution flow-rate, the type of solvent, the mass of the ions, the polarity of the ESI source, the electrospray potential, the curtain plate potential, the proximity of the sprayer to the curtain plate and the position of the ion lens relative to the tip of the sprayer. In this embodiment, the end of the tapered tip 74 of the capillary 66 projects beyond the ion lens 62. A wire 24 is attached to a power supply (not shown) for application of the electrospray potential.

Referring to FIG. 4*d,* an end view of the ion lens 62 and the tapered tip 74 of the capillary 66 shows that the tapered tip 74 of the capillary is preferably vertically centered in the ion lens 62 and near the left hand side of the ion lens 62 in one favorable embodiment. In an alternative favorable embodiment, the tapered tip 74 is preferably vertically centered in the ion lens 62 and horizontally centered in the ion lens 62. Alternatively, the tapered tip 74 may be asymmetrically placed, both horizontally and vertically, within the ion lens 62. Furthermore, the plane defined by the ion lens is positioned substantially perpendicular to the axis of the capillary 66 and the tip 74 of the capillary 66 abuts or intersects this plane. The position of the ion lens is also adjustable along the axis of the capillary 66. The position of the ion lens is preferably optimized to maximize the ion flux into a downstream device such as a mass spectrometer. Optimization involves adjusting the position of the sprayer and setting the potentials applied to the various components of the ion source.

Figure 5A:
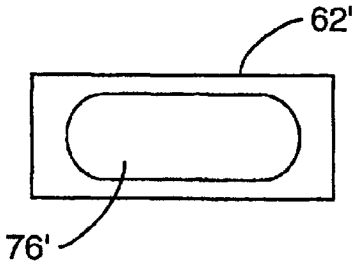
FIG. 5*a* is a schematic of one embodiment of the ion lens.
Figure 5B:
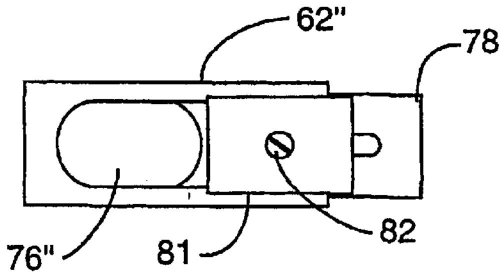
FIG. 5*b* is a schematic of an alternate embodiment of the ions lens in which the orifice of the ions lens is adjustable.

Referring to FIGS. 5*a* and 5*b,* these Figures show two other embodiments 62' and 62" of the ion lens 62. The physical dimensions, all in mm, are shown for illustrative purposes only. Accordingly, other dimensions and shapes may be used. In FIG. 5*a,* the ion lens 62' is non-adjustable. The ion lens 62' preferably has a length of 19 mm, and a height of 8 mm and an aperture 76' with slightly smaller dimensions. The aperture 76' preferably has a length of 10 mm and a height of 5 mm. The ion lens 62' also has a thickness of 1 mm and is made from stainless steel. Other aperture dimensions ranging from 5 mm to 15 mm have been used to achieve favorable results as well. In general, the smallest dimensions for the ion lens 62 are dictated by the onset of arcing to the sprayer and the largest dimensions for the ion lens 62 are dictated by spatial limitations and decrease in effectiveness. The ion lens 62 may be constructed of other conductive materials as well, however, stainless steel is used because it is inert.

Referring to FIG. 5*b,* ion lens 62" is adjustable in that the size of aperture 76" can vary in size in the horizontal direction due to a slotted window piece 78. To increase the size of the aperture 76", the slotted window piece 78 is moved to the right. Likewise, to decrease the size of the aperture 76", the slotted window piece 78 is moved to the left. The size of the aperture 76" of the ion lens 62" is adjustable so that the ion signal may be optimized. In this embodiment, the vertical dimension of the ion lens 62" is non-adjustable, however, a vertical adjustment could easily be built into the ion lens 62" in an alternate embodiment.

Figure 5C:
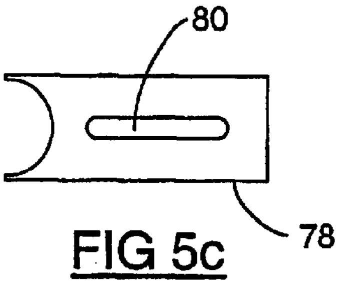
FIG. 5*c* is a front view of the slotted window piece shown in FIG. 5*b;*
Figure 5D:
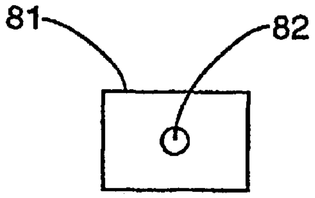
FIG. 5*d* is a front view of the cover piece which attaches the slotted window piece to the ion lens.

The slotted window piece 78 is shown in more detail in FIG. 5*c*. In a preferred embodiment, the slotted window piece 78 has a groove 80 which is used to permit horizontal movement of the slotted window piece 78. The slotted window piece 78 is slid into a horizontal groove (not shown) in the ion lens 62". The horizontal groove allows the slotted window piece 78 to be moved in the horizontal direction, effectively changing the size of the ion lens aperture 76". Alternatively, a series of ion lenses with different dimensions may be used. In an alternative embodiment, the length of the aperture 76" is adjustable from a length of 7 mm to a length of about 14 mm although a length of 9 mm may be preferable. A cover piece 81 is placed over the slotted window piece 78 and a screw, through aperture 82, holds the cover piece 81 and the slotted window piece 78 onto the ion lens 62".

The ion lens 62 is annular and has a solid cross section. Alternatively, the "ring" of the ion lens 62 may be hollow. The ion lens 62 may further have a continuous or discontinuous cross-section having the form of a circle, an oval, a square, a rectangle, a triangle or any other regular or irregular polygonal shape or other two-dimensional shape. Note that there may also be a gap in the "ring" portion of the ion lens 62 so that the ion lens 62 substantially surrounds the sprayer.

Figure 6A:
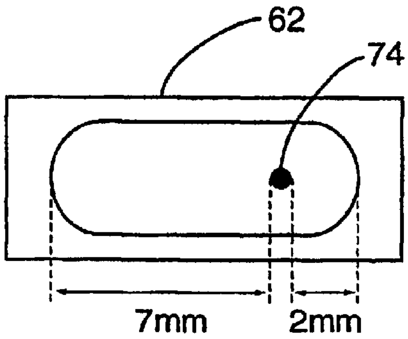
FIG. 6*a* is a front view of a preferred embodiment of the location of an electrospray capillary with respect to the ion lens.
Figure 6B:
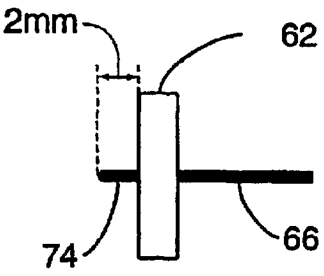
FIG. 6*b* is a side view of the preferred embodiment of the location of an electrospray capillary with respect to the ion lens.

Referring to FIGS. 6*a* and 6*b*, a preferred embodiment of the position of the tapered tip 74 of the capillary 66 is shown. Experimental results which support this embodiment are discussed later on. In this embodiment, the ion lens 62 is positioned horizontally asymmetric with respect to the tapered tip 74 of the capillary 66. The tapered tip 74 of the capillary 66 is approximately 2 mm from the right hand side of the ion lens 62 and approximately 7 mm from the left hand side of the ion lens 62. In the vertical direction, the tapered tip 74 of the capillary 66 is centered within the ion lens 62.

Figure 6C:
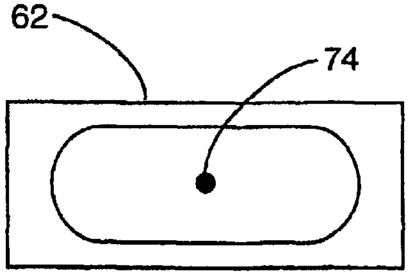
FIG. 6*c* is a front view of a second preferred embodiment of the location of an electrospray capillary with respect to the ion lens.
Figure 6D:
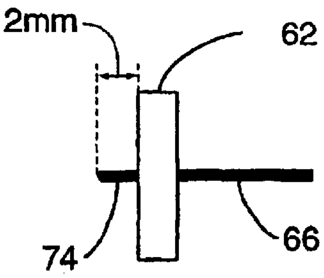
FIG. 6*d* is a side view of a second preferred embodiment of the location of an electrospray capillary with respect to the ion lens.

Referring to FIGS. 6*c* and 6*d*, a second preferred embodiment of the position of the tapered tip 74 within the ion lens 62 is shown. Experimental results which support this embodiment are also discussed later on. In this embodiment, the ion lens 62 is horizontally and vertically centered with respect to the tapered tip 74 of the capillary 66. The positioning of the tapered tip 74 within the ion lens 62 may be optimized to increase the ion flux, and the position of the sprayer mount 52 may be adjusted with respect to the aperture 15 in the curtain plate 14, i.e. the distance from the sprayer mount 52 to the curtain plate 14, whether the sprayer mount 52 is aligned with the aperture 15 in the curtain plate 14 or whether the sprayer mount 52 is offset from the aperture 15 in the curtain plate 14 and the like. This optimization process would also include varying the potentials on the various components of the ion source.

It has also been found that the position of the ion lens 62 along the axis of the capillary 66 with respect to the end of the tapered 74 affects the generated ion signal. The ion lens 62 is preferably positioned approximately 0.1 to 5 mm behind the end of the tapered tip 74. More preferably, the ion lens 62 may be positioned approximately 1 to 3 mm behind the end of the tapered tip 74. Most preferably, the ion lens 62 is placed approximately 2 mm behind the end of the tapered tip 74 as shown in FIG. 6*b*. The effectiveness of the ion lens 62 may vary as the ion lens 62 is moved farther forward or back from 2 mm behind the end of the tapered tip 74. Furthermore, it may be preferable to apply large potentials to the ion lens 62 to increase the focusing of the generated ions. However, due to the loss of spraying efficiency, as the ion lens potential increases, the effective electric field at the tip 74 of the sprayer 12 seems to decrease. Eventually, the electric field is not large enough to produce a stable electrospray.

Figure 7:
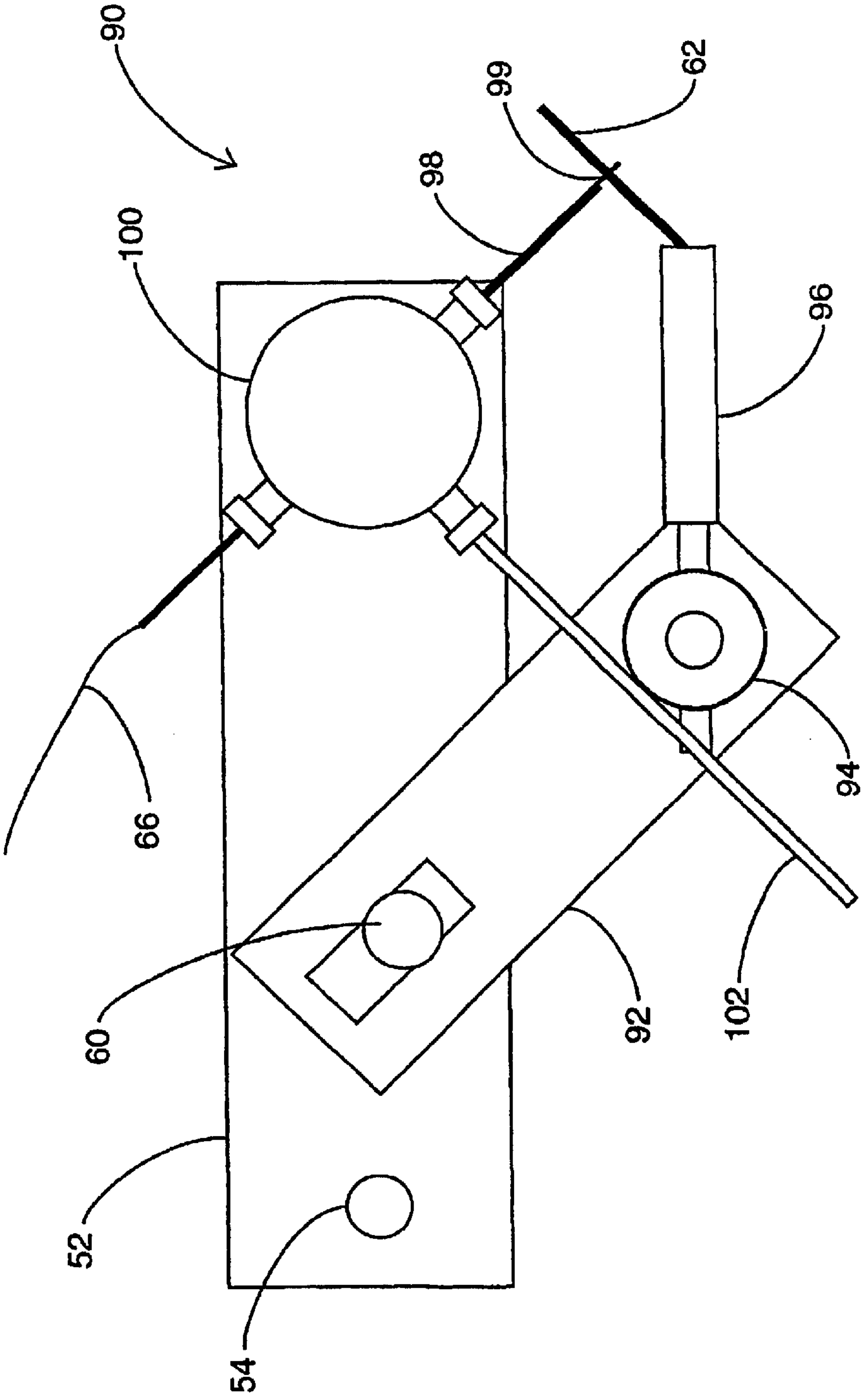
FIG. 7 is a schematic of an embodiment of the present invention in which an ion lens Is placed near the tip of an ionspray source.

Reference is now made to an embodiment of an ionspray, or high flow-rate electrospray ionization source 90 with an ion lens 62 shown in FIG. 7. The ionspray source 90 preferably comprises a sprayer mount 52, a mounting hole 54, a set screw 60, a capillary 66, an ion lens 62, an adjustable support 92, a turnable mount 94, a Teflon arm 96, a sprayer 98, a stainless steel tee 100 and tubing 102. The sprayer mount 52 is similar to that used in some commercial ionspray sources with a mounting hole 54 which is adapted to attach the sprayer mount 52 to a commercial type of stud mount (not shown). The adjustable support 92 is attached to the sprayer mount 52 via the setscrew 60. The adjustable support 92 is attached to the sprayer mount 52 to optimize the position of the ion lens 62 relative to the sprayer 98 and more particularly to the tip 99 of the sprayer 98. The turnable mount 94 and the Teflon arm 96 are used to hold the ion lens 62 in place. The turnable mount 94 may be rotated through 360 degrees which allows for the precise angle of the ion lens 62 relative to the sprayer 98 to be adjusted. The length of the Teflon arm 96 may range from 1 to 20 cm depending on the required distance for positioning the ion lens 62 relative to the tapered tip 99.

In use, an analyte solution travels via the capillary 66 to a stainless steel tee 100. A nebulizer gas, which is carried to the stainless steel tee 100 via the tubing 102, flows coaxially through a stainless steel tube which surrounds capillary 66. The nebulizer gas consists of compressed air, but may be replaced with nitrogen, oxygen, sulphur hexafluoride, or other gases. In particular, nebulizer gases such as oxygen and sulphur hexafluoride may be useful as electron scavenging gases when operating in negative ion mode. The analyte solution in the capillary and the coaxial nebulizer gas travel through the sprayer 98 to the sprayer tip 99. The nebulizer gas assists in breaking up charged droplets at the sprayer tip 99. The nebulizer gas also allows for much higher analyte solution flow-rates to be used and may help to evaporate the solvent in the analyte sample. A potential is applied to the ion lens 62 to focus the charged droplets (that are forming) into a narrow ion beam which is directed to an aperture associated with the counter-electrode for the ionspray ionization source 90. In a preferable embodiment, the ion lens 62 has an aperture with a height of 6 mm and a length which is adjustable from 6 mm to 12 mm. Other preferred embodiments of the ion lens 62 include oblong shapes with dimensions of 12.4 mm ×8.90 mm, 14.10 mm ×10.2 mm, 14.92 mm ×11.10 mm, 17.60 mm ×13.00 mm and 19.3 mm ×15.00 mm. Other dimensions may also be used. It is important to note that the ion lens 62 would be effective for use with a turbo-ionspray source as well. In turbo-ionspray sources, an additional flow of heated gas is directed at the electrospray plume to assist in evaporating the droplets and in desolvating ions. This turbo-ionspray is described in U.S. Pat. No. 5,412,208 which is hereby incorporated by reference.

Figure 8A:
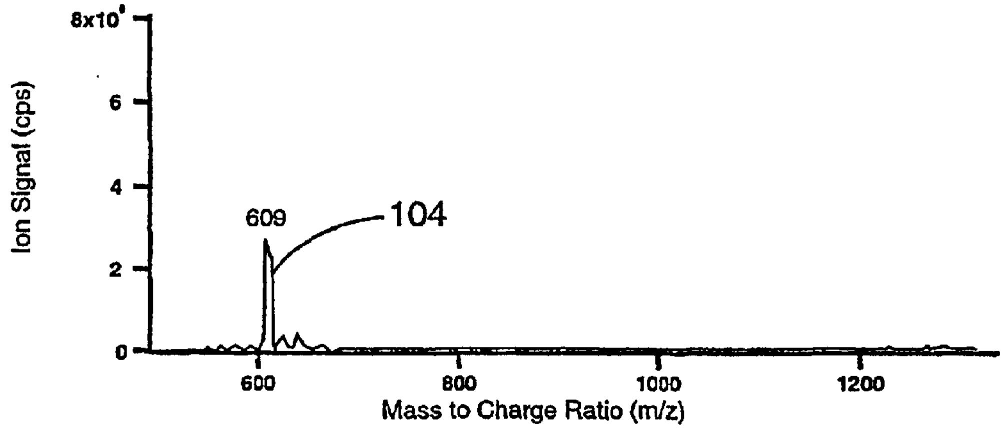
FIG. 8*a* is the mass spectrum obtained for a sample of reserpine using a prior art conventional ionspray source.
Figure 8B:
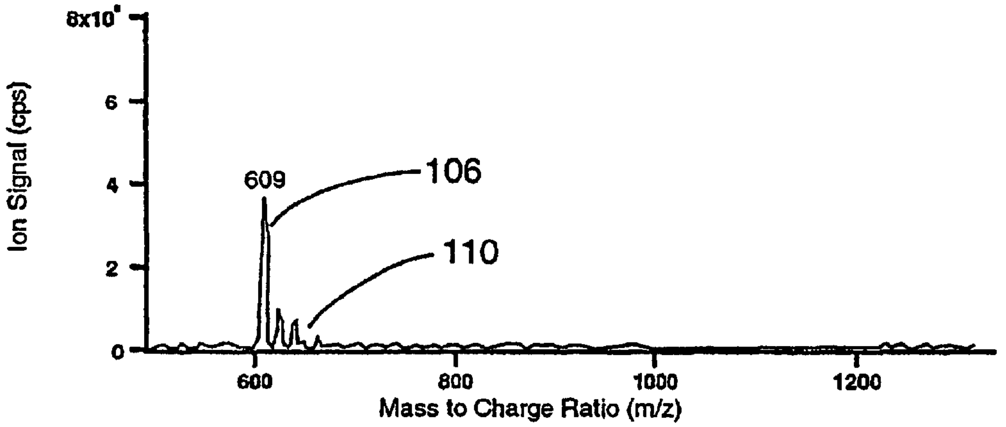
FIG. 8*b* is the mass spectrum obtained for a sample of reserpine using a conventional prior art reduced flow-rate ESI source.
Figure 8C:
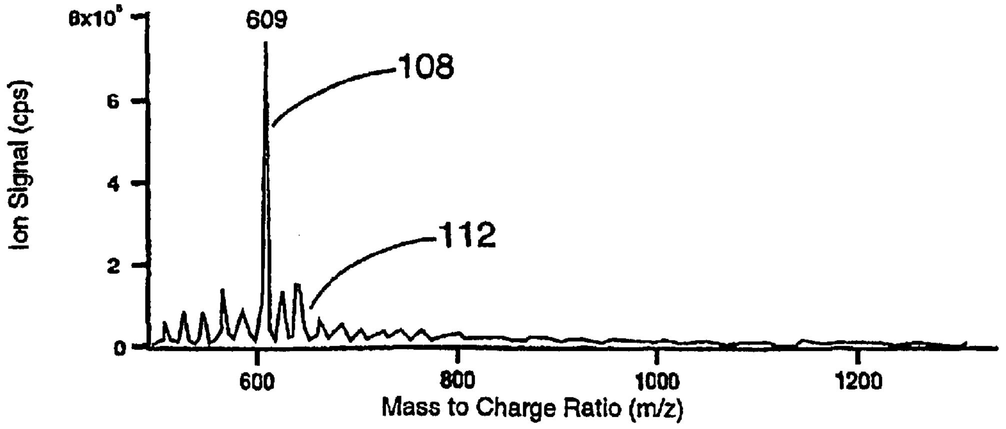
FIG. 8*c* is the mass spectrum obtained for a sample of reserpine using a reduced flow-rate ESI source incorporating an ions lens in accordance with the present invention.

Reference is now made to FIGS. 8*a*–8*c* which depict the ion signal increase achieved when using an ion source with an ion lens on a mass spectrometer with a sample of reserpine. FIG. 8*a* shows the mass spectrum obtained with a commercial ionspray source without an ion lens, FIG. 8*b* shows the mass spectrum obtained with a reduced flow-rate ESI source without an ion lens and FIG. 8*c* shows the mass spectrum obtained with a reduced flow-rate ESI source with an ion lens. The solution flow rate was 1 μL/min for the commercial ionspray source and 0.2 μL/min for the reduced flow rate ESI sources. The reserpine sample was prepared with a concentration of $10^{-5}$ M in a solution of 10% water and 90% acetonitrile with 1 mM ammonium acetate. The reserpine sample was prepared in a mostly volatile non-aqueous matrix and therefore a very large potential, relative to the sprayer potential, could be maintained on the ion lens which resulted in a strong ion signal. The voltage parameters for the experiment of FIG. 8*c* were 4000 V, 2000 V, and 5700 V for the reduced flow rate sprayer, curtain plate, and ion lens respectively. In FIG. 8*a*, the voltage parameters were 5000 V and 1000 V for the sprayer and the curtain plate, respectively. In FIG. 8*b*, the voltage parameters were 3000 V and 1000 V for the sprayer and curtain plate, respectively.

The ion signals 104 and 106 obtained in FIGS. 8*a* and 8*b* respectively were quite similar although a slightly higher ion signal 106 was obtained with the reduced flow-rate ESI source. However, FIG. 8*c* shows that a significant enhancement for the ion signal 108 is obtained when an ion lens is used. The ion signal 108 is approximately 2 to 2.5 times stronger than the ion signals 104 and 106 with the ion lens in place. There is also a substantial increase in the solvated ion peaks 112 in the mass spectra as well.

Figure 9A:
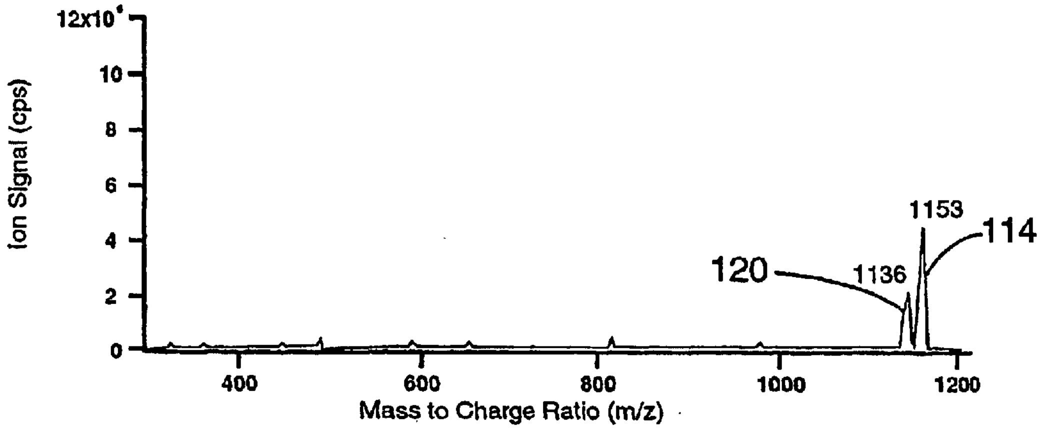
FIG. 9*a* is the mass spectrum obtained for a sample of β-cyclodextrin using a prior art conventional reduced flow-rate ESI source.
Figure 9B:
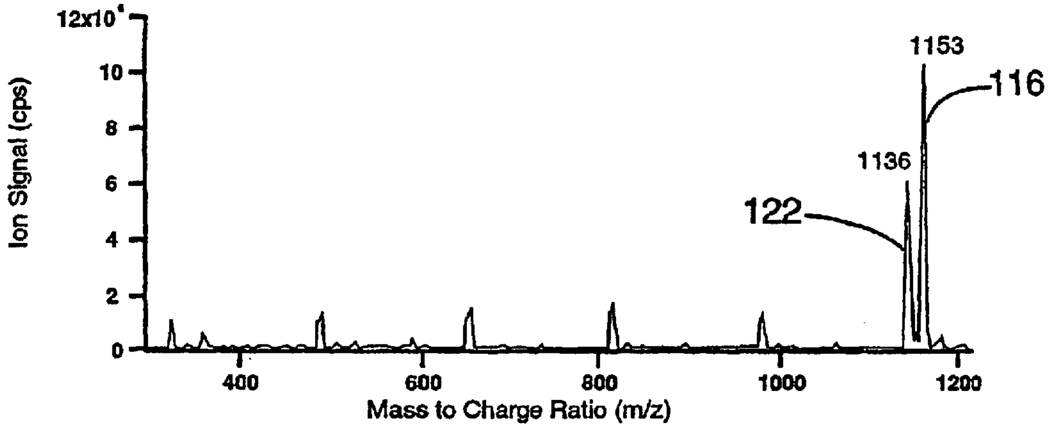
FIG. 9*b* is the mass spectrum obtained for a sample of β-cyclodextrin using a reduced flow-rate ESI source with an ion lens at a first location in accordance with the present invention.
Figure 9C:
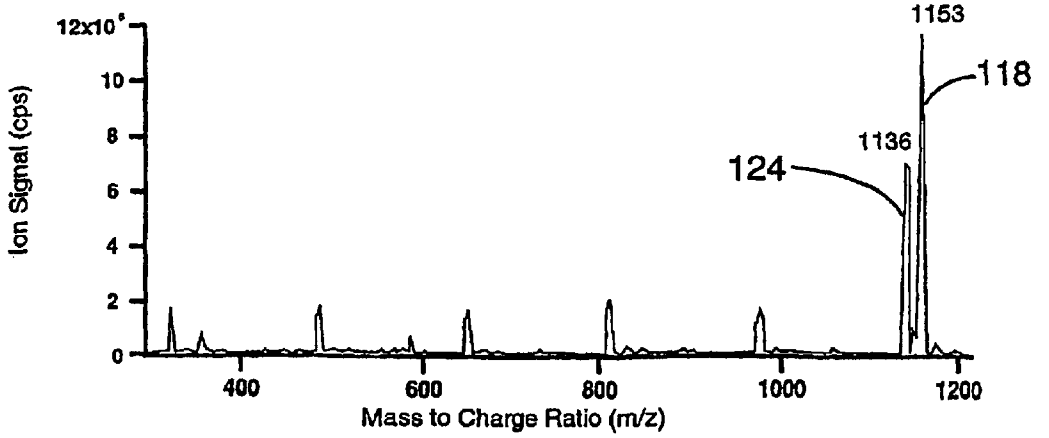
FIG. 9*c* is the mass spectrum obtained for a sample of β-cyclodextrin using a reduced flow-rate ESI source with an ions lens at a second location in accordance with the present invention.

Reference is now made to FIG. 9 which depicts the ion signal increase achieved when using an ion source with an ion lens on a mass spectrometer with a solution of $10^{-3}$ M of β-cyclodextrin. FIG. 9*a* shows the mass spectrum obtained with a reduced flow-rate ESI source without an ion lens, FIG. 9*b* shows the mass spectrum obtained with a reduced flow-rate ESI source with an ion lens in a first position and FIG. 9*c* shows the mass spectrum obtained with a reduced flow-rate ESI source with an ion lens in a second position. In FIG. 9*b*, the sprayer was approximately 2 mm from the curtain plate and in FIG. 9*c* the sprayer was approximately 1 mm from the curtain plate. All mass spectra were obtained from the summation of 10 scans.

These Figures demonstrate an Increase in the total number of ions from the β-cyclodextrin sample when an ion lens is used. In FIGS. 9*a*–9*c*, β-cyclodextrin with an ammonium adduct is the dominant peak (i.e. peaks 114, 116, 118 in FIGS. 9*a*–9*c*) at a mass-to-charge (m/z) ratio of 1153. The next dominant peak is protonated P-cyclodextrin at a m/z ratio of 1136 (i.e. peaks 120, 122 and 124 in FIGS. 9*a*–9*c*). The peaks at m/z ratios of 326, 488, 650, 812, and 974 are fragment peaks. An increase in the parent ion signal, peaks 118 and 116 versus 114, of 2.5 to 3 times is seen in FIGS. 9*b* and 9*c* where an ion lens was used. Furthermore, in FIGS. 9*b* and 9*c* there is also an increase of every fragment peak by a factor of 3.5 to 5.5. These fragments correspond to losses of successive glucose molecules from β-cyclodextrin due to collisions with gas molecules within the first differentially pumped vacuum stage of the mass spectrometer. The results shown in FIGS. 9*b* and 9*c* were obtained with applied potentials of 3000 V on both the reduced flow rate sprayer and the ion lens, 190 V on the orifice plate and slightly more than 1000 V on the curtain plate. In FIG. 9*a*, the potentials were 3000 V, 1000 V and 190 V for the sprayer, curtain plate and orifice plate, respectively.

In the experiments in which an ion lens was added to a reduced flow-rate ESI source at substantially atmospheric pressure, it was found that the strength of the ion beam was optimized when the ion lens was located approximately 0.1 to 5 mm and more preferably 1.5–3 mm behind the end of the tapered tip of the capillary. In some instances it was also preferable to place the ion lens around the tapered tip of the capillary with an asymmetrical orientation in the horizontal direction as shown in FIG. 6*b*. The horizontal distance from the tapered capillary to the right side of the oblong-shaped aperture of the ion lens was approximately 2 mm. The distance from the capillary to the left side of the oblong-shaped aperture of the ion lens was approximately 7–8 mm. In the vertical direction, the capillary was preferably centered in the aperture of the ion lens; i.e. the spacing between the capillary to the top and the bottom of the aperture of the ion lens was approximately 2.5 mm. For this embodiment, the reduced flow-rate ESI sprayer was positioned close to the right hand edge of the aperture in the curtain plate. Similar results could be obtained by placing the tapered tip closer to the left hand side of the ion lens, and positioning the sprayer close to the left hand side of the aperture in the curtain plate, or by turning the ion lens at a 90 degree angle and orienting the sprayer near the top or the bottom of the aperture in the curtain plate. In other instances, it was preferable to place the ion lens around the tapered tip of the capillary with a symmetrical orientation in both the horizontal and vertical direction as shown in FIG. 6*d*. In this embodiment, the sprayer was centered in front of the aperture in the curtain plate. The end of the capillary Up was either centered in front of the aperture, or off to the side. To achieve optimal results, it was preferable that the shape of the tapered tip of the capillary was as uniform as possible since the beneficial effects of the ion lens decreased when a capillary with a damaged tip was used. Other tests showed that an asymmetric placement of the tapered tip in the ion lens (in both dimensions) showed favorable results.

The test results of the ion lens with a reduced flow rate ESI source at substantially atmospheric pressure showed a significant increase in the total ion count. In fact, the use of an ion lens with a reduced flow-rate ESI source increased the total number of ions entering the mass spectrometer by a factor of approximately three or four compared to the reduced flow-rate ESI source alone. For instance, the total count rate for all ions in the mass spectrum of a β-cyclodextrin sample using a commercial ionspray source without an ion lens was approximately 1.3 million counts per second (cps) whereas the total ion count for the sample using the reduced flow-rate ESI source with the ion lens resulted in a total ion count of approximately 5.5 million cps. In the experiments with the reduced flow-rate ESI source with the ion lens, the sprayer was located very close to the curtain plate whereas in the experiments without the ion lens, the sprayer had to be positioned farther away from the curtain plate to maintain a strong signal.

Figure 10A:
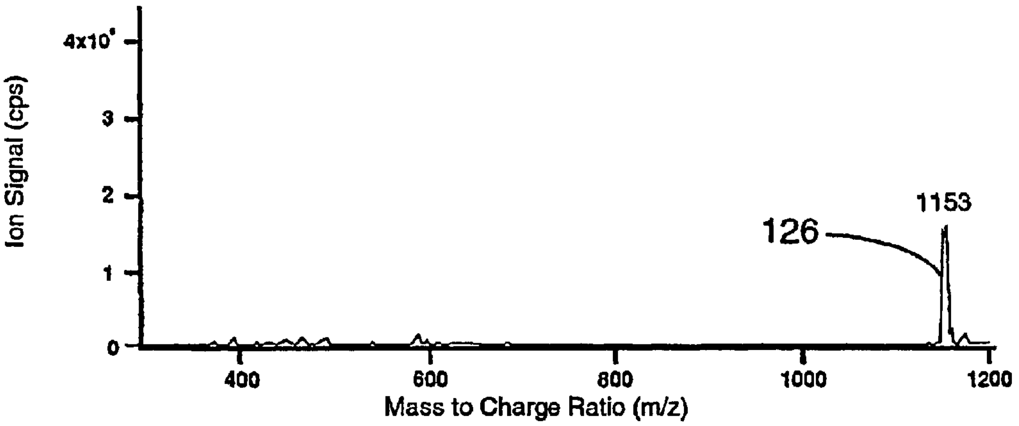
FIG. 10*a* is a mass spectrum for β-cyclodextrin using a prior art conventional reduced flow-rate ESI source, and optimizing the source to generate doubly protonated ions.
Figure 10B:
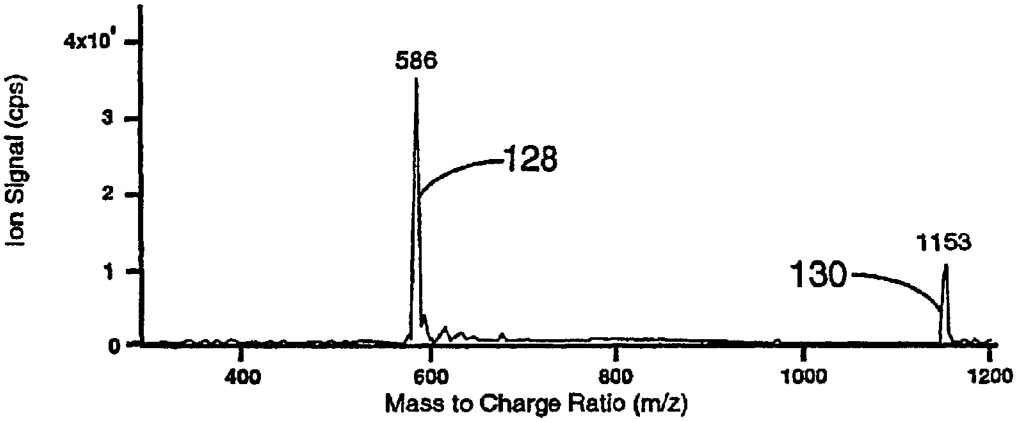
FIG. 10*b* is a mass spectrum for β-cyclodextrin using a reduced flow-rate ESI source with an ion lens at a first location in accordance with the present invention, and optimizing the source to generate doubly protonated ions.
Figure 10C:
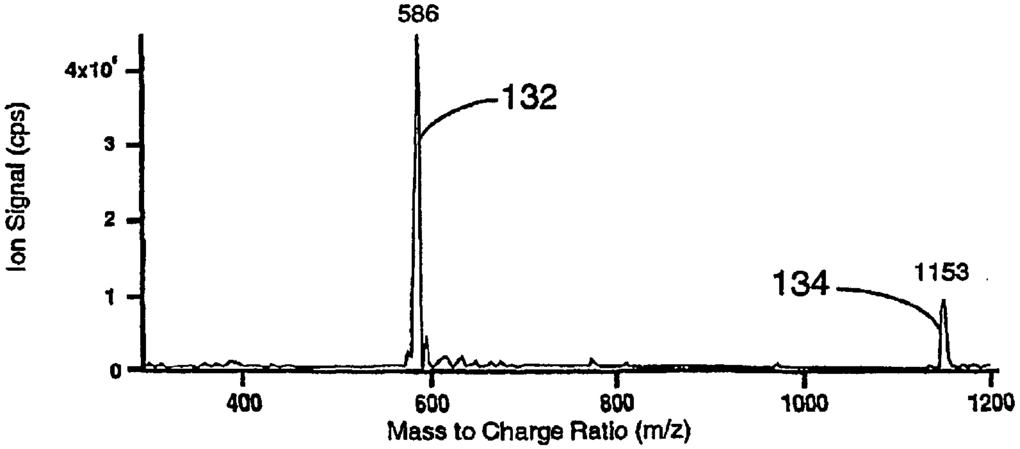
FIG. 10*c* is a mass spectrum for β-cyclodextrin using a reduced flow-rate ESI source with an ion lens at a second location in accordance with the present invention, and optimizing the source to generate doubly protonated ions.

Reference is now made to FIGS. 10*a*–10*c* which depict changes in the charge state for a particular compound when using an ion source at substantially atmospheric-pressure with an ion lens on a mass spectrometer for a sample of β-cyclodextrin. FIG. 10*a* shows the mass spectrum obtained with a reduced flow-rate ESI source without an ion lens and FIGS. 10*b* and 10*c* show the mass spectra obtained with the reduced flow-rate ESI source with an ion lens. The β-cyclodextrin solution comprised $10^{-5}$ M β-cyclodextrin in approximately 10 mM ammonium acetate at a pH of 7. The results in each of these Figures were achieved with an applied potential of 140 V on the orifice plate.

Referring to FIG. 10*a*, the applied voltages were 3000 V on the ESI sprayer, and 1000 V on the curtain plate. In this Figure, the singly charged β-cyclodextrin 126 at a m/z ratio of 1153 is the predominant ion species observed in the mass spectrum. In FIGS. 10*b* and 10*c*, the applied potentials were 3000 V for the sprayer, 1580 V for the curtain plate and 2850 V for the ion lens. In addition, the Up of the reduced flow-rate sprayer was positioned very close to the curtain plate. The tip of the reduced flow-rate sprayer was also moved slightly closer to the middle of the aperture of the curtain plate for FIG. 10*c* as opposed to FIG. 10*b*. It can be seen that with the addition of the ion lens, the doubly charged peak 128 and 132 at a m/z of 586 can be increased relative to the other peaks in the mass spectrum. The ion signals are also substantially increased, with a 3.3 times increase in total β-cyclodextrin ions detected even though the singly charged peak 130 and 134 is only slightly changed from the peak 126 in FIG. 10*a*. For FIG. 10*a,* it was not possible to generate a greater degree of doubly charged β-cyclodextrin ions. It is Important to note that this increase in the ion signal for the doubly charged β-cyclodextrin is achieved while only slightly reducing the ion signal for the singly charged molecule.

Figure 11A:
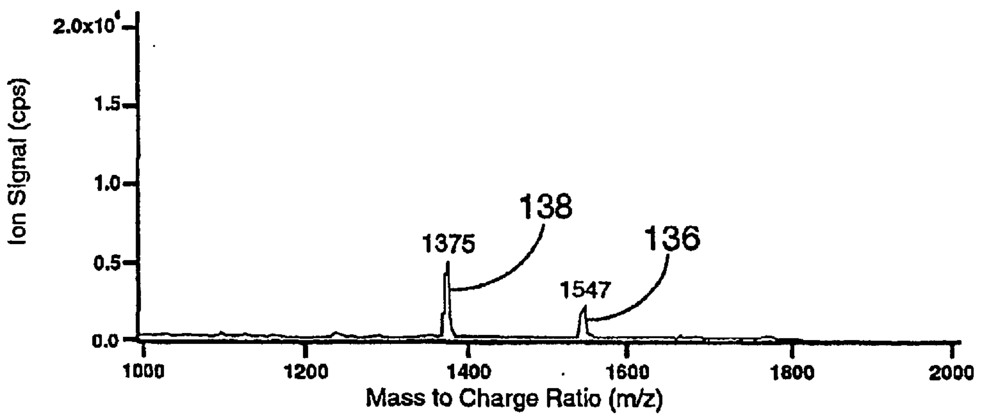
FIG. 11*a* is a mass spectrum for cytochrome c using a prior art conventional ionspray source, and optimizing the source for maximum ion signal.
Figure 11B:
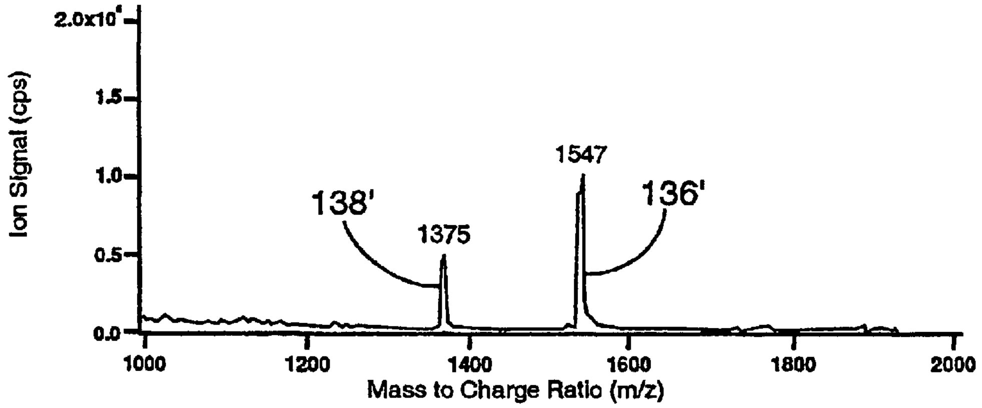
FIG. 11*b* is a mass spectrum for cytochrome c using a prior art conventional reduced flow-rate ESI source, and optimizing the source for maximum ion signal.
Figure 11C:
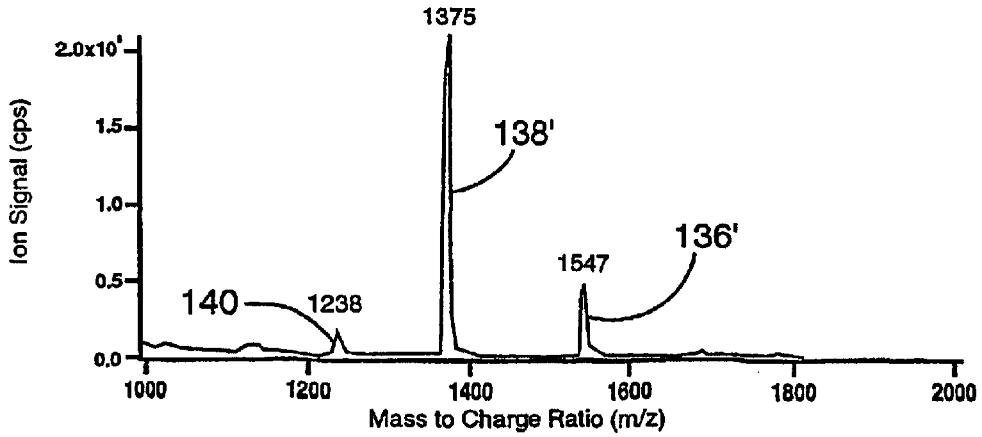
FIG. 11*c* is a mass spectrum for cytochrome c using a reduced flow-rate ESI source with an ion lens in accordance with the present invention, and optimizing the source for maximum ion signal.

The ability of the ion lens to vary the charge state of a particular ion is also seen in FIGS. 11*a*–11*c* which illustrate the mass spectra obtained for an ion source with a mass spectrometer analyzing a solution of the protein cytochrome c. FIG. 11*a* is a mass spectrum obtained with an ionspray ion source without an ion lens, FIG. 11*b* is a mass spectrum obtained with a reduced flow-rate electrospray ion source and FIG. 11*c* is a mass spectrum obtained with the reduced flow-rate electrospray ion source with an ion lens. The solution comprises cytochrome c at a concentration of 100 μmol/L in water with approximately 1% acetic acid. The peaks in the mass spectra of FIGS. 11*a*–11*c* correspond to the various charge states of the protein cytochrome c. The peak 136, at a m/z ratio of 1547, corresponds to a charge state of +8; the peak 138, at a m/z ratio of 1375, corresponds to a charge state of +9 and the peak 140, at a m/z ratio of 1238, corresponds to a charge state of +10. In all cases, the ion sources were adjusted to yield the largest ion signal. The addition of the ion lens allows for selective enhancement of the ion signal for the protein with a particular charge state. The applied potentials for the ionspray source without the ion lens (FIG. 11*a*) were 4796 V for the sprayer and 1000 V for the curtain plate. Furthermore, a nebulizer gas was used with a pressure of 30 psi. For the reduced flow-rate ion source without the ion lens (FIG. 11*b*), the applied potentials were 3374 V for the sprayer and 1560 V for the curtain plate. For the reduced flow-rate ion source with the ion lens (FIG. 11*c*), the applied voltages were 4000 V on the sprayer, 2000 V on the curtain plate and 4200 V on the ion lens. All other parameters of the mass spectrometer were constant for the mass spectra of FIGS. 11*a*–11*c*.

The ability to vary the charge states can be effected by varying the potential applied to the ion lens and the position of the sprayer relative to the aperture in the curtain plate. In fact, for sugars and proteins, higher potentials applied to the ion lens may be effective for generating or focusing higher charge state ions into a mass spectrometer. Experiments conducted with bradykinin demonstrate the ability of the ion lens to substantially increase the ion signal for the higher charge states of peptides (+2 and +3) while at the same time decreasing or maintaining the signal for the singly charged background solvent peaks. This can lead to substantial increases (i.e. a factor of 3 to 6) for the signal to noise ratio of the multiply charged peptide peaks.

Figure 12A:
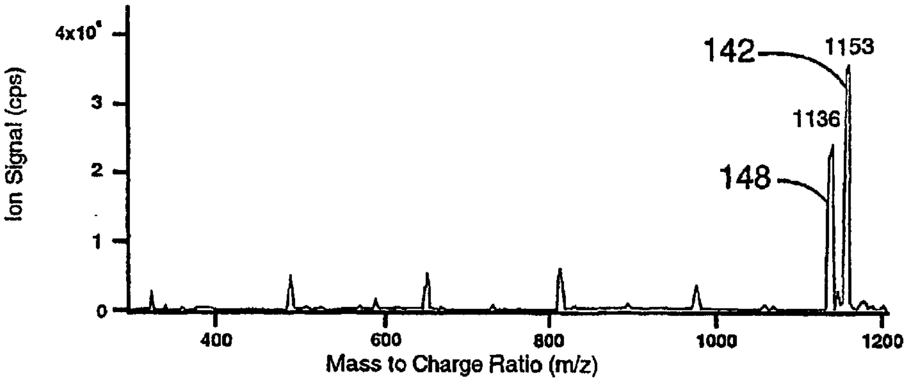
FIG. 12*a* is a mass spectrum showing the degree of fragmentation for a sample of β-cyclodextrin using a reduced flow-rate ESI source with an ion lens and a potential of 3750 V applied to the ion lens in accordance with the present invention.
Figure 12B:
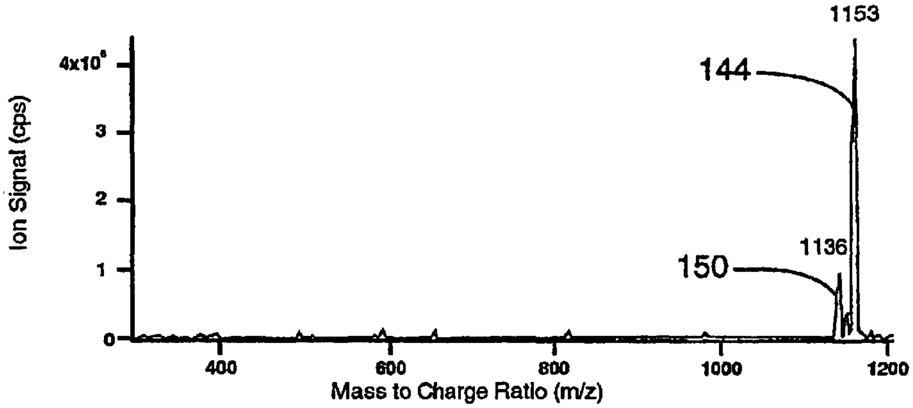
FIG. 12*b* is a mass spectrum of the ion signal when the tip of the ion sprayer was moved closer to the curtain plate and the potential applied to the ion lens was 5100 V in accordance with the present invention.
Figure 12C:
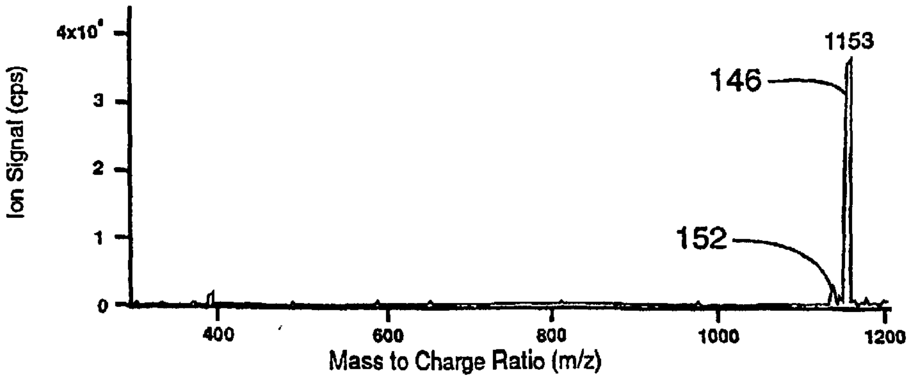
FIG. 12*c* is a mass spectrum of the ion signal when the tip of the ion sprayer was positioned approximately flush to the curtain plate and the potential applied to the ion lens was 4500 V in accordance with the present invention.

The use of an ion lens may also result in a variation of the degree of fragmentation of the parent ions in an analyte sample. Referring now to FIGS. 12*a*–12*c,* the mass spectra obtained with a reduced flow-rate ESI source with an ion lens on a mass spectrometer are shown. The sample was β-cyclodextrin, as described previously for FIGS. 9*a*–9*c*. In each of these Figures, the results were obtained with applied potentials of 190 V on the orifice plate, 1000 V on the curtain plate, 3100 V on the sprayer and 110 V on a skimmer within the first vacuum stage of a downstream mass spectrometer. The applied potential to the ion lens was 3750 V, 5100 V, and 4500 V for FIGS. 12*a*–12*c* respectively. The increase in the applied potential on the ion lens allows the sprayer to be positioned slightly closer to the aperture of the curtain plate. For each Figure, the sprayer was positioned in front of the aperture and the curtain gas flow rate was constant. For FIG. 12*c,* the tip of the sprayer was positioned approximately even with the curtain plate. For FIGS. 12*a* and 12*b,* the ion lens was positioned approximately 2 mm behind the tip of the reduced flow rate sprayer. For FIG. 12*c,* the ion lens was moved even farther behind (approximately 4 mm behind) the tip of the reduced flow-rate sprayer to allow the tip of the reduced flow-rate sprayer to be placed approximately even with the curtain plate without arcing between the ion lens and the curtain plate. The peaks at m/z ratios of 326, 650, 488, 812 and 974 correspond to fragment ions generated by collision-induced dissociation in the first differentially pumped vacuum region of a downstream triple quadrupole mass spectrometer. The fragment ion peaks decrease in magnitude as the ion spray Is generated closer to the inlet aperture of the mass spectrometer. This data demonstrates that the degree of ion fragmentation can be varied by adjusting the position of the sprayer tip relative to the curtain plate and setting an appropriate lens potential.

It is not clear at this point whether the variation in the mass spectrum is due to a change in the mechanism of the electrospray itself or due to the fact that the charged droplets are forming closer to the aperture of the curtain plate which may cause a higher degree of solvation on the gas phase ions in FIGS. 12*b* and 12*c*. A higher degree of ion solvation necessitates an increased internal input energy between the orifice plate, and the skimmer, in a downstream mass spectrometer, to achieve desolvation. Thus, less energy would be available for ion fragmentation for a fixed potential difference between the orifice plate and the skimmer in the mass spectrometer. An increase in solvation is consistent with the increased signals experimentally observed for the solvated ions in other mass spectra as well such as in FIG. 8*c*. The spacing on some of the peaks above the reserpine peak (a m/z ratio of 609) was 18 m/z ratio units which suggests that some of the increased ion signal was due to higher order solvation.

Figure 13:
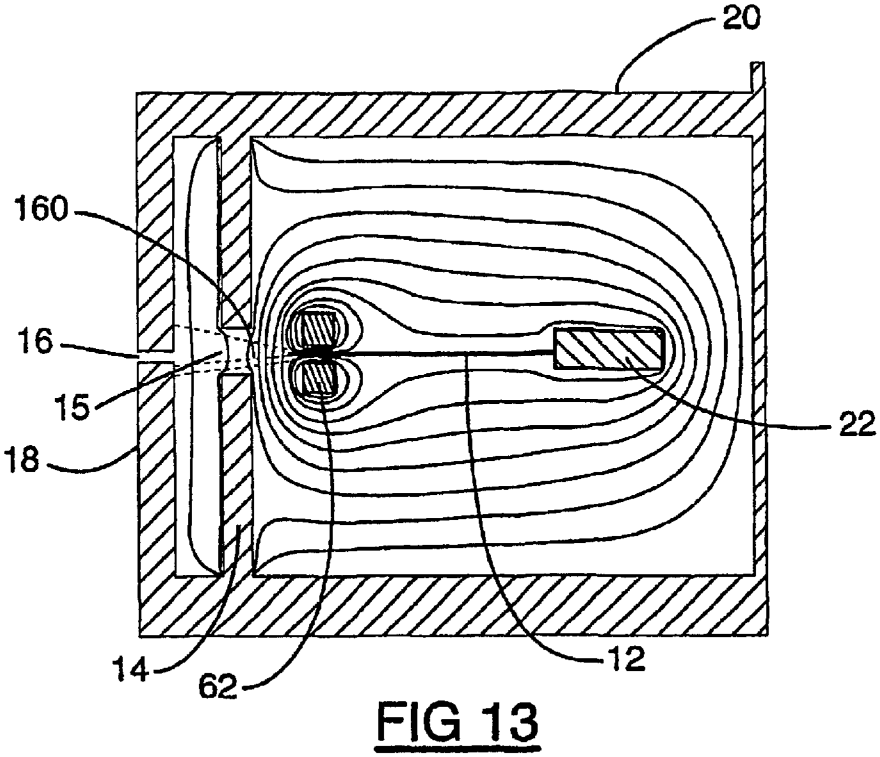
FIG. 13 is a simulation result showing equipotential lines and qualitative ion trajectories for a reduced flow rate ESI source with an ion lens in accordance with the present invention.

The increase in ion signal due to the use of an ion lens may be due to a change in the equipotentials near the tip of the sprayer. Referring now to FIG. 13, the results of a simulation of a reduced flow-rate ESI source with an ion lens 62 is shown. For the simulation, the applied potentials were 5100 V for the ion lens 62, 3500 V for the sprayer 12, 2000 V for the curtain plate 14, 190 V for the orifice plate 18 and 0 V for the housing 20. The simulation results show that the shape of the equipotentials generated near the tip of the sprayer 12 have improved when an ion lens 62 is placed near the tip of the sprayer 12. The equipotentials at the tip of the sprayer 12 are flatter compared to the equipotential lines near the tip of the sprayer 12 in FIG. 2. Accordingly, the resulting electric field lines near the tip of the sprayer 12 result in ion trajectories 160 which point directly to the aperture 15 in the curtain plate 14. The configuration of FIG. 13 reduces the spread of ion trajectories and directs the ion trajectories in the general direction of the desired axis of ion propagation. This results in a reduction of the defocusing effect observed in FIG. 2. Thus, more ions are guided towards the orifice 16 of a downstream device such as a mass spectrometer (not shown).

Figure 14:
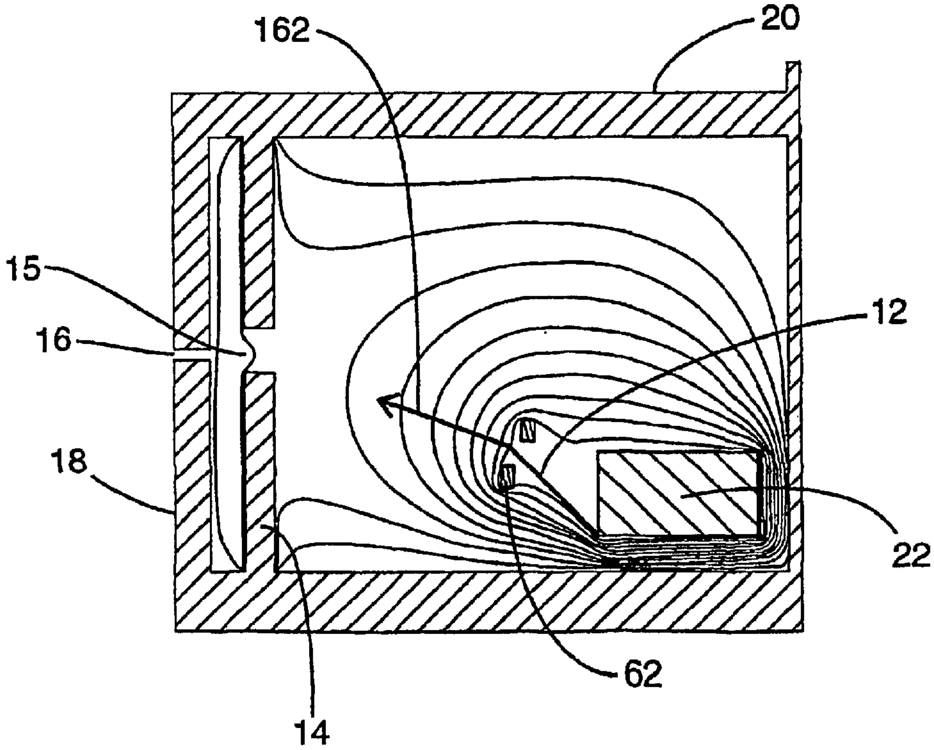
FIG. 14 is a simulation result showing equipotential lines and qualitative ion trajectories for an ionspray source, or an electrospray source operating at high liquid flow-rates, with an ion lens in accordance with the present invention.

Reference is next made to FIG. 14 which shows the result of a simulation done on an ion lens positioned near the vicinity of the sprayer of an ion source which was at substantially atmospheric pressure, similar to the ion source shown in FIG. 1. The applied potentials in this simulation were 5000 V for the sprayer 12, 5000 V for the ion lens 62, 1000 V for the curtain plate 14, 190 V for the orifice plate 18 and 0 V for the housing 20. The potentials applied to the sprayer 12 and the ion lens 62 are equal in this example but this does not necessarily have to be the case. FIG. 14 shows that the equipotential lines near the tip of the sprayer 12 are relatively flat which causes the trajectories of the generated ions to be more confined along an axis of propagation 162. In this simulation, the tip of the sprayer 12 is not aligned with the aperture 15 in the curtain plate 14, however, the ion signal transmitted to the orifice 16 is increased. In this embodiment, the sprayer 12 is oriented on approximately a 45 degree angle relative to the curtain plate, but it will be apparent to those skilled in the art that other orientations will be equally effective.

Experiments were also conducted to determine the effect of the ion lens on the stability of the ion signal. The experiments showed that the use of an ion lens resulted in a stabilization of the ion signal monitored in a mass spectrometer over time. The stability of the ion signal was measured using the relative standard deviation of the ion signal obtained for repeated measurements taken in 10 ms intervals. The measurements showed that with conventional ionspray sources, the relative standard deviation is approximately 2 times higher than that achieved with an ion lens. It was also found that there was a reduced dependence of the ion signal upon the location of the sprayer relative to the aperture in the curtain plate which made optimizing the location of the sprayer within the source housing much easier. These results will now be discussed.

In the experiments, an ionspray source was constructed to resemble the ionspray source shown in FIG. 7. The outer diameter at the tip 99 of the sprayer 98 was approximately 450 μm. The sprayer housed a fused silica capillary with an outer diameter of approximately 150 μm and an inner diameter of approximately 50 μm. A solution flow rate of between 1 and 4 μL/min was used. The sample used in the experiment was a 1 mM solution of β-cyclodextrin in water with 10 mM ammonium acetate at a pH of 7. The sprayer was located approximately 7.5 mm from the curtain plate. The potentials applied to the sprayer and the curtain plate were approximately 6000 V and 1800 V respectively. The experiments showed that it was preferable to apply a potential of 2500 to 5000 V to the ion lens and that it was not possible to maintain an ion signal when potentials greater than 5000 V were applied to the ion lens. The ionspray source was used with a conventional triple quadrupole mass spectrometer to analyze the ion signal which was produced by the ionspray source.

Experimental results for a sample of β-cyclodextrin in ammonium acetate showed that the predominant peak in the mass spectrum was cyclodextrin with an ammonium adduct at a m/z ratio of 1153. The experimental results also showed that the ion lens improved the short-term stability of the ion signal as determined by the Relative Standard Deviation (RSD) of repeated measurements. In fact, the RSD was decreased by a factor of approximately 2 for an ionspray source with an ion lens compared to a conventional ionspray source without an ion lens. The ion lens also allowed for a more precise calculation of the ratio of peaks in the mass spectrum. In addition, the magnitude of the ion signal increased by a factor of approximately 1.5.

In particular, Table 1 shows a comparison of the signal stability between an ionspray source without an ion lens and an ionspray source with an ion lens over a measurement period of approximately 15 minutes. The m/z ratio range from 800 to 1200 was scanned with a dwell time of 10 ms. Twenty repeat runs were averaged to obtain the standard deviation of the measured ion signal. Each of the twenty runs was the result of 10 scans. For each of these runs, the sprayer and ion path parameters were optimized to obtain as stable an ion signal as possible. In this case, the source with the ion lens is tuned to produce a similar signal intensity to that of the ionspray source without the ion lens. An average RSD of slightly less than 3% was obtained for the ionspray source without the ion lens. The addition of the ion lens reduced the RSD by a factor of approximately 2.0. However, there is still some instability from the source. The last row of Table 1 shows the RSD that would be obtained if the source was completely stable (i.e. if the RSD was determined purely by ion counting statistics).

TABLE 1

Comparison of the Signal Stability

| Measurement Parameter | Ionspray (Best Run) | Ionspray with an Ion Lens |
|---|---|---|
| Number of Measurements | 20 | 20 |
| Average Signal (cps) | $1.857 \times 10^6$ | $1.663 \times 10^6$ |
| RSD (%) | 2.84 | 1.41 |
| RSD of Count Statistics (%) | 0.55 | 0.58 |

Reference is next made to Table 2, which shows that the ion lens improved the ability to obtain the ratio of two peaks in a mass spectrum. In the experiment, the two peaks corresponded to protonated cyclodextrin at a m/z ratio of 1136 and cyclodextrin with an ammonium adduct at a m/z ratio of 1153. The peak at a m/z ratio of 1136 was generated by collisions within the region between the orifice and the skimmer of the downstream triple quadrupole mass spectrometer. Six repeat measurements were made to determine the average ratio of the aforementioned peaks. Table 2 shows that typical RSD values for an ionspray source without the ion lens were slightly greater than 3%. However, the addition of the ion lens near the tip of the ionspray source reduced the RSD to approximately 1.4%. Thus, an ionspray source with an ion lens may be used to improve precision in applications which require the accurate reading of ratios of peaks in a mass spectrum such as in determining isotope ratios. Again, there is still some instability from the source. The last row of Table 2 shows the RSD that would be obtained if the source was completely stable (i.e. if the RSD was determined purely by ion counting statistics).

TABLE 2

Comparison of the ratio of two peaks in the mass spectrum

| | Ionspray | Ionspray with an Ion Lens |
|---|---|---|
| Orifice-Skimmer Potential Difference (V) | 58 V | 58 V |
| Number of Measurements | 6 | 6 |
| Ratio Average | 17.6 | 12.3 |
| Ratio RSD (%) | 2.97 | 1.40 |
| Count Stats RSD (%) | 1.17 | 1.17 |

Referring now to Table 3, the RSD was calculated by performing an experimental trial that involved-taking 1498 readings (using a 10 msec dwell time) of the magnitude of the peak for cyclodextrin with an ammonium adduct over a time period of 1 minute. The sample flow rate was 4 μL/min. The data presented is the average of four trials. Table 3 shows that the ion signal is increased by a factor of slightly greater than 1.5 and the RSD is reduced from approximately 4.1% to approximately 2.6% for an ionspray source with an ion lens as compared to an ionspray source without an ion lens. Again, there is still some instability from the source. The last row of Table 2 shows the RSD that would be obtained if the source was completely stable (i.e. if the RSD was determined purely by ion counting statistics.)

TABLE 3

Comparison of the Signal Stability

| | Ionspray | Ionspray with an Ion Lens |
|---|---|---|
| Replicates | 1498 | 1498 |
| Average Ion Signal (cps) | $3.707 \times 10^5$ | $5.645 \times 10^5$ |
| Average RSD (%) | 4.10 | 2.64 |
| Count Stats RSD (%) | 0.04 | 0.04 |

Figure 15:
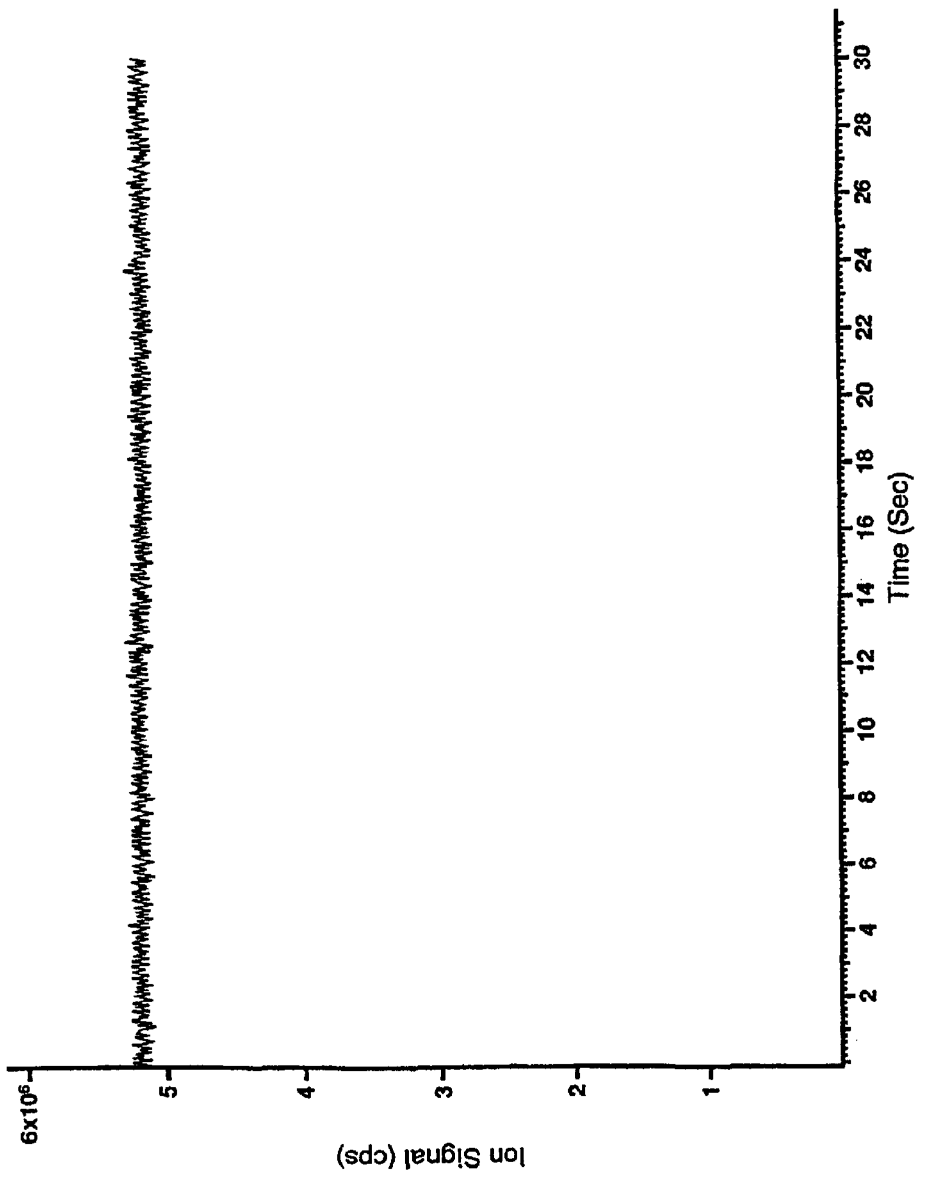
FIG. 15 is a graph of a signal measured in multiple ion mode while monitoring an ion signal using a prior art ionspray source without an ion lens.
Figure 16:
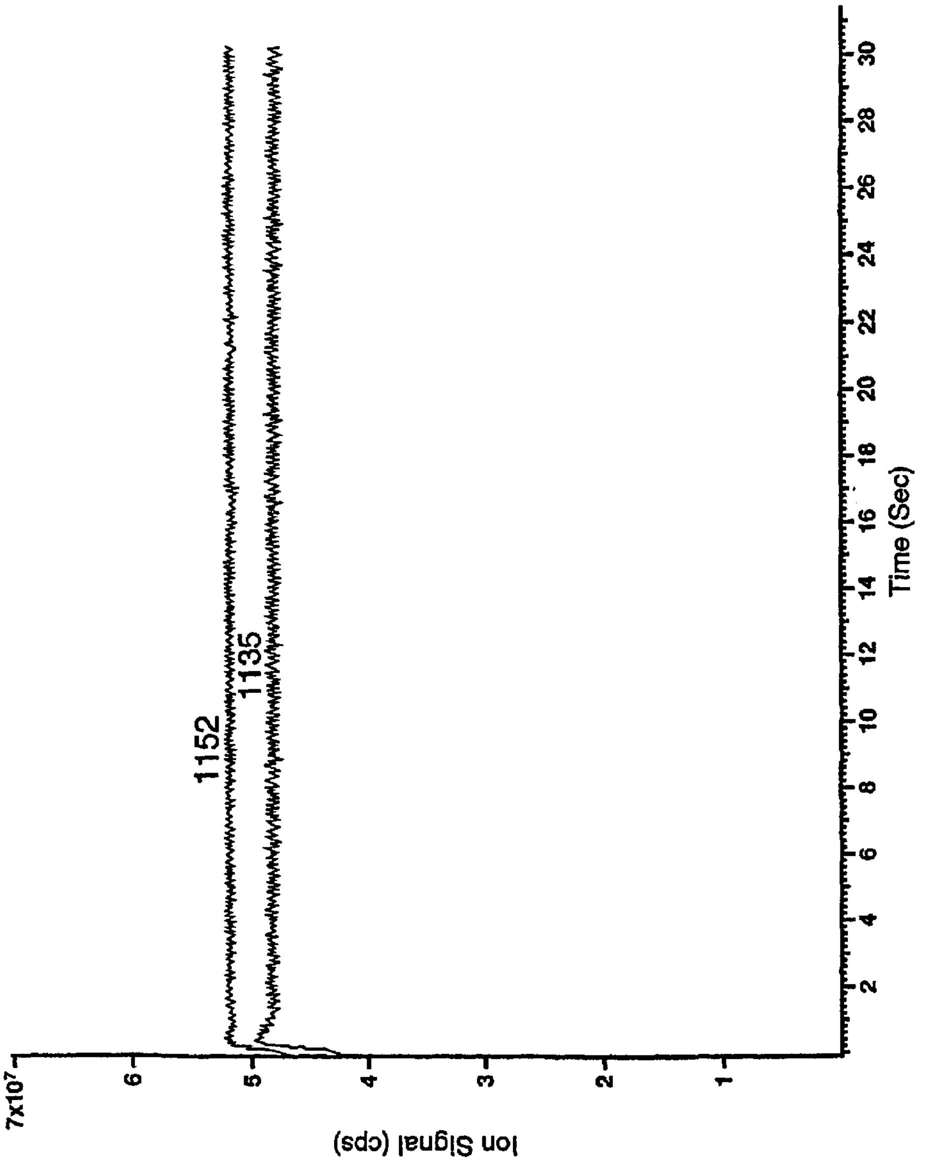
FIG. 16 is a graph of two signals measured in multiple ion mode while monitoring an ion signal using an ionspray source with an ion lens in accordance with the present invention.
Figure 17:
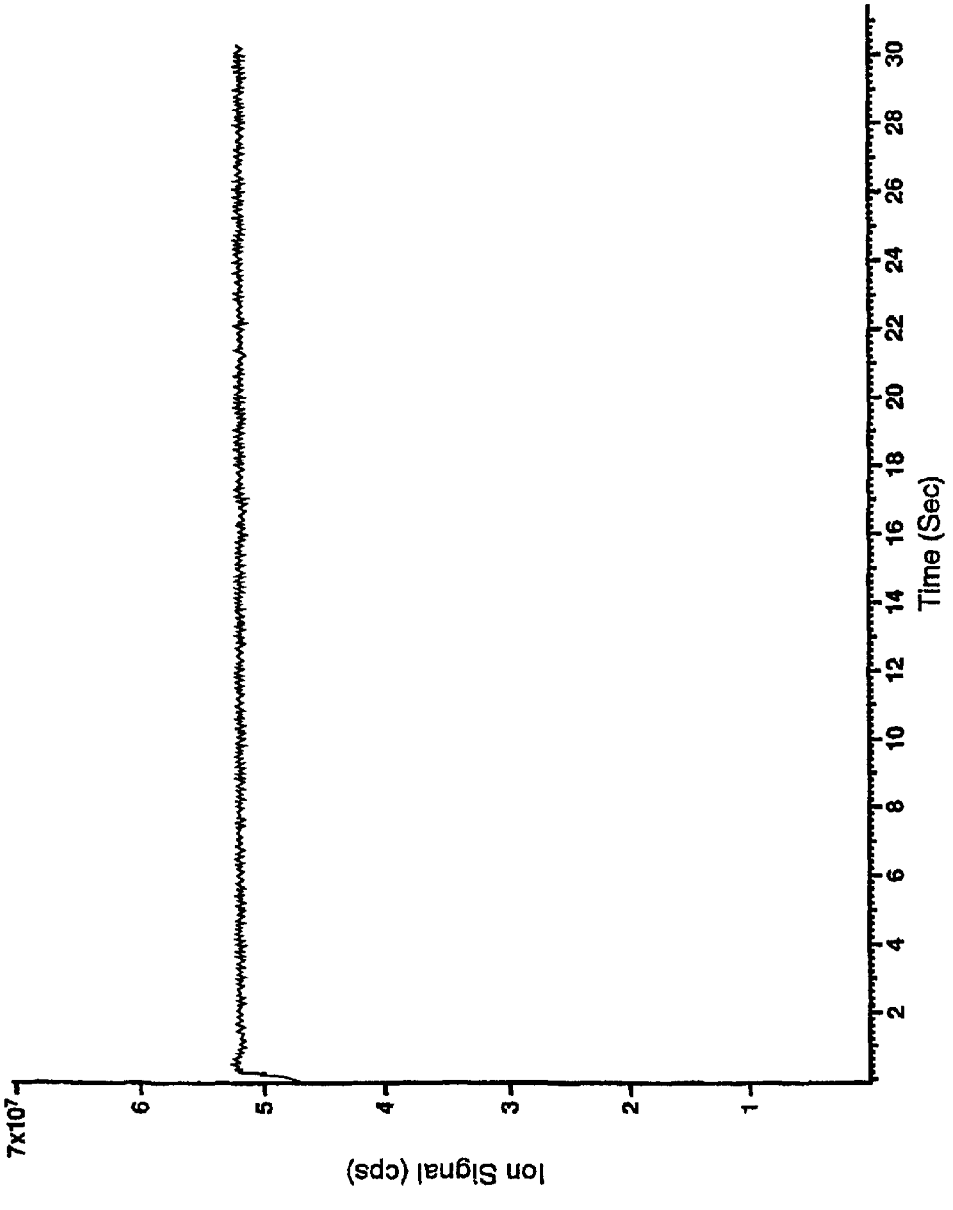
FIG. 17 is a graph of a signal measured in multiple ion mode while monitoring an ion signal using an ionspray source with an ion lens in accordance with the present invention.

The ion stability achievable for an ionspray with an ion lens is also shown in FIGS. 15–17. The data was collected in the multiple ion mode while monitoring an ion signal for cyclodextrin ions, at a m/z ratio of 1153, and protonated cyclodextrin, at a m/z ratio of 1136. In FIGS. 15–17, the vertical axis is the log (base 10) of the ion signal calculated as ions per second and the horizontal axis is the measurement number. There are 3000 measurements of 10 ms each, so the horizontal axis ranges from 0 to 30 s. FIG. 15 shows a graph of the signal versus time obtained in multiple ion mode while monitoring an ion signal for cyclodextrin at a m/z ratio of 1152 using an ionspray source without an ion lens. The signal is very "choppy" which makes it difficult to obtain an accurate measurement. FIG. 16 shows the signal from an ionspray source with an ion lens that is obtained in multiple ion mode while monitoring the ion signals at m/z ratios of 1152 and 1135. These signals are more stable. FIG. 17 shows the signal from the ionspray source with an ion lens that is obtained after further optimization of the potential of the ion lens and the position of the ion lens while monitoring the ion signal at a m/z ratio 1152. This signal is also more stable.

Figure 18:
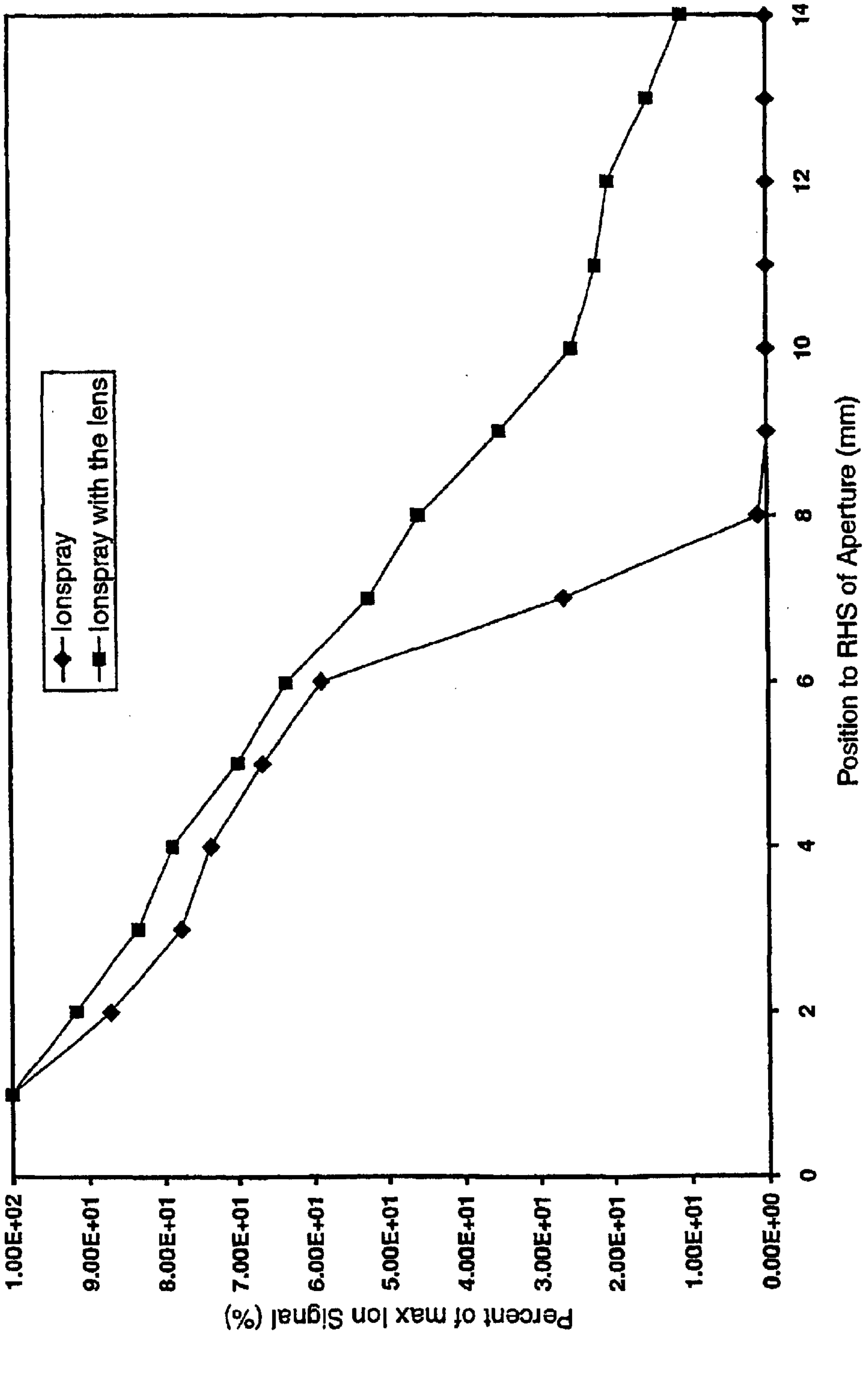
FIG. 18 is a graph of ion signal attenuation versus the horizontal position of the sprayer of a prior art ionspray source without an ion lens and an ionspray source with an ion lens in accordance with the present invention.

Reference is next made to FIG. 18 which shows a graph of ion signal versus the position of the sprayer of an ionspray source, at substantially atmospheric pressure, relative to the right hand side of the aperture in the curtain plate. The data is shown for an ionspray source without an ion lens (diamond shaped data points) and an ionspray source with an ion lens (square shaped data points). FIG. 18 shows that the ion lens makes the ionspray source easier to operate since the ion signal is not attenuated as much for the ion source with an ion lens compared to the ion source without an ion lens when the position of the sprayer changes. In FIG. 18, the point along the x axis defined as 0 mm is the point where the sprayer is located at the very right hand edge of the aperture in the curtain plate. The distance from the aperture was measured with a ruler attached to the top of the source housing.

FIG. 18 shows that the ion signal remains approximately constant (90% of the maximum ion signal, i.e. the ion signal at 0 mm) as the sprayer, of the ionspray source with an ion lens is moved from 0 mm to 2 mm from the right hand side of the aperture in the curtain plate. The improvement obtained with the ion lens becomes more apparent at distances greater than 6 mm. At 7 mm, the ion signal for the ionspray source without an ion lens, has dropped off to approximately 25% of the maximum ion signal. However, the ion signal obtained for the ionspray source with the ion lens is still above 50% of the maximum ion signal. At a distance of 8 mm, the ion signal for the ionspray source without an ion lens has dropped off to approximately 1% of the maximum ion signal, whereas the ion signal for the ionspray source with the ion lens Is still greater than 46% of the maximum ion signal. In fact, an ion signal is maintained even at a distance of 14 mm with the ion lens in place. Thus, FIG. 18 shows that the dependence of the ion signal on the horizontal position of the sprayer for the ion source decreases when an ionspray source with an ion lens is used.

Figure 19:
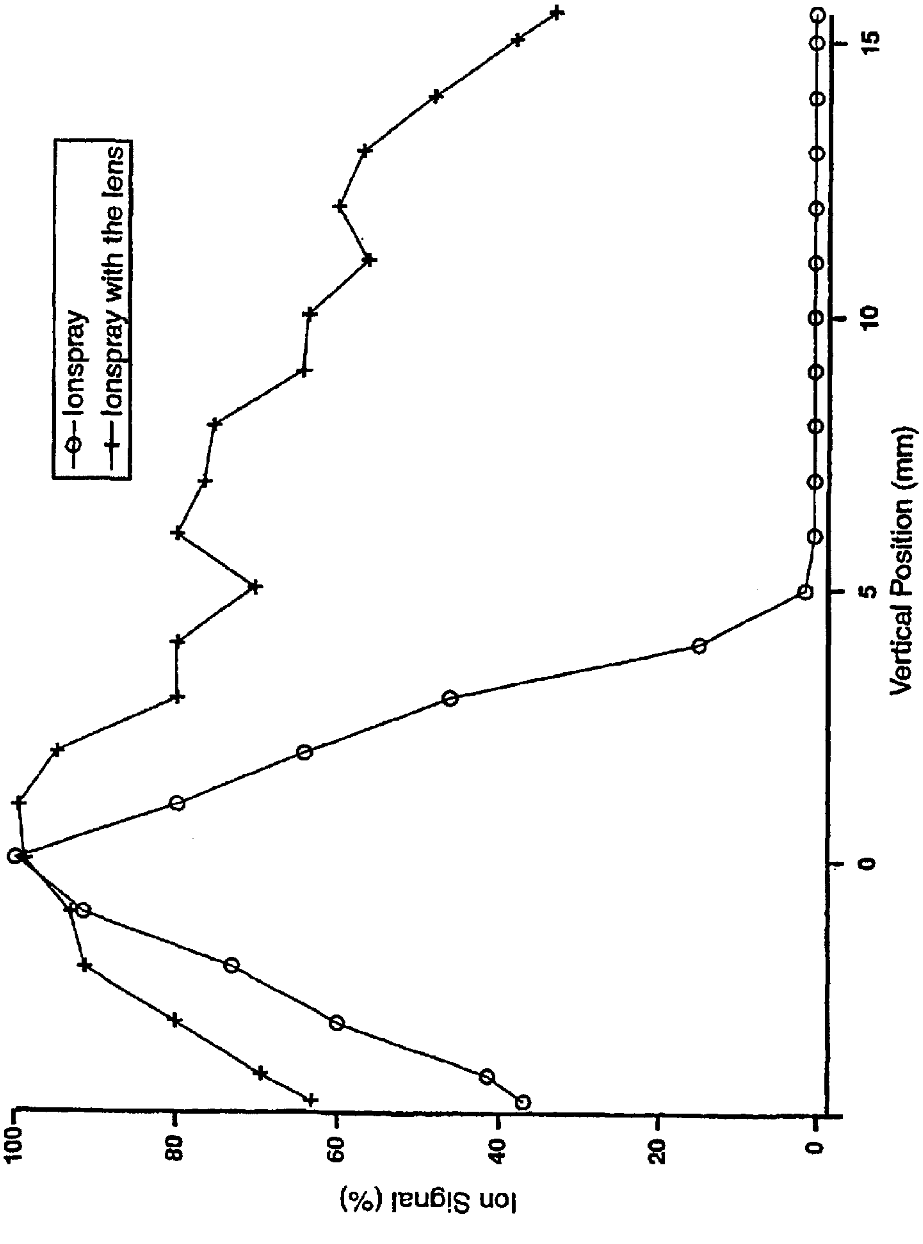
FIG. 19 is a graph of ion signal attenuation versus the vertical position of the sprayer of a prior art ionspray source without an ion lens and an ionspray source with an ion lens in accordance with the present invention.

Reference is next made to FIG. 19 which shows the dependence of the ion signal on the vertical position of the sprayer of an ionspray source without an ion lens (represented by 'o' shaped data points) and the sprayer of an ionspray source with an ion lens (represented by '+' shaped data points). This data was collected with the sprayer of the ionspray source located just off to the right hand side of the aperture in the curtain plate. From FIG. 19, the maximum ion signal for both ionspray sources was at a vertical position of approximately 0 mm (i.e. the sprayer was at the same vertical height as the middle of the aperture in the curtain plate). The experimental data shows that at all positions higher and lower than the center of the aperture in the curtain plate, a stronger ion signal was obtained for the ionspray source with an ion lens. Moving the position of the sprayer of the ionspray source without the ion lens 5 mm higher resulted in an ion signal which was approximately 1% of the maximum ion signal, whereas at the same position for the ionspray source with the ion lens, the ion signal was 70% of the maximum ion signal. Further increases in the height of the sprayer for the ionspray source without the ion lens resulted in complete elimination of the ion signal. However, with the ion lens in place, a strong ion signal (35% of the maximum ion signal) was maintained even at a vertical height of 15 mm above the center of the aperture in the curtain plate. Similar results were obtained as the sprayers were lowered by up to 5 mm. FIGS. 18 and 19 show that the ion signal is much less sensitive to position when an ion lens is used, even without optimizing the ion lens potential at each position.

Tables 1–3 and FIGS. 15–19 have shown that the addition of an ion lens to an ionspray source yields a stronger and more stable ion signal. Furthermore, the addition of the ion lens results in an apparatus which is much easier to operate since the position of the sprayer can vary a few millimeters without having an extremely detrimental effect on the resulting ion signal. Two important factors were the position of the ion lens along the sprayer tip and the potential applied to the ion lens. Favorable results were achieved when the ion lens was located preferably 1–3 mm behind the up of the sprayer of the ionspray source. A range of different ion lens sizes were also found to be useful for the ionspray source. The increased signal stability and the decreased dependence upon sprayer position for optimization are important benefits, particularly for applications such as isotopic analysis, LC mass spectrometry and CE mass spectrometry where the position of the sprayer can have a dramatic effect on the observed ion signal.

Figure 20:
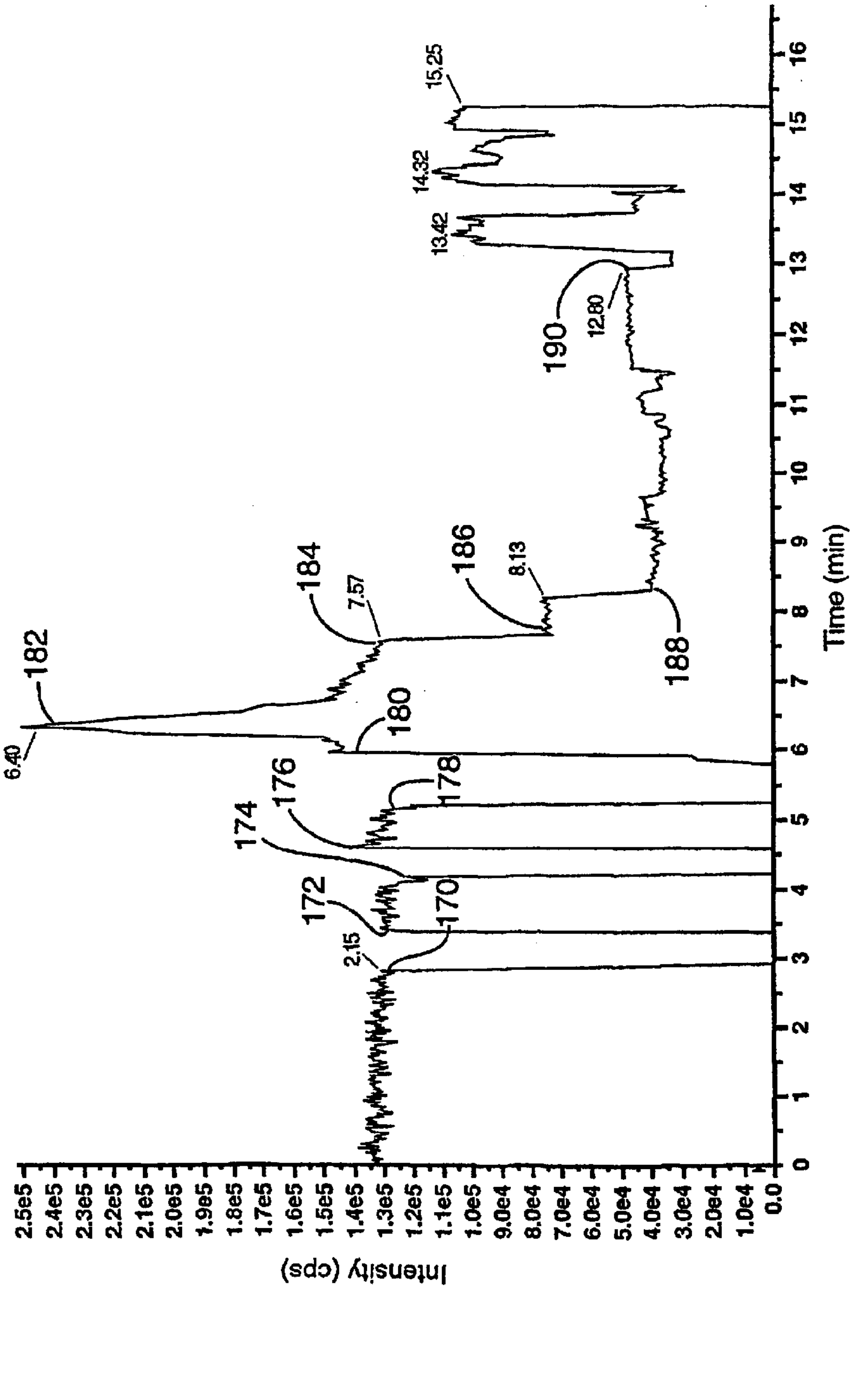
FIG. 20 is a graph of ion signal intensity versus time during a variation of the operating parameters of the ion source which incorporates an ion lens in accordance with the present invention.

Reference is next made to FIG. 20, which shows that the ion lens results in an ion signal which is stable over a wide range of conditions. FIG. 20 is a graph of the ion signal on a linear scale versus time, from 0 to 16 minutes. The ion signal measured in FIG. 20 was obtained with a Protana reduced flow-rate ion source fitted with an ion lens, which provided ions to a Q-Star mass spectrometer made by Applied Biosystems/MDS Sciex. The applied potentials were 3000 V for the sprayer, 1000 V for the ion lens and 526 V for the curtain plate. The sprayer had an internal diameter of approximately 15 microns at the tapered end. The sample, a digest of the protein casein, was prepared in a solution containing 90% water and 10% acetonitrile with 1% acetic acid. At approximately 2.8 minutes 170, the potential applied to the sprayer was removed. As a result, the ion signal dropped to zero cps. The potential was then re-applied to the sprayer, at its previous value, at approximately 3.4 minutes 172 and the intensity of the ion signal also returned to its prior level. At approximately 4.25 minutes 174, the potential applied to the ion lens was removed and at approximately 4.6 minutes 176, the potential was re-applied to the ion lens at its previous value. Once again, the intensity of the ion signal dropped to zero cps when the potential applied to the ion lens was removed, however, when the potential was reapplied to the ion lens, the intensity of the ion signal returned to its previous level. The solution flow rate was then set to zero at 5.13 minutes 178 and then set back to its previous value at 5.9 minutes 180. As a result, the ion signal dropped to zero cps when the solution flow rate was zero but then returned briefly to its previous level before spiking upwards when the solution flow rate was set to its previous level. The spike was due to a concentration effect in the tapered tip of the sprayer due to the evaporation of the solvent. At 7.51 minutes 184, the sprayer was moved back from the curtain plate until the time of 8.13 minutes 188. The ion signal intensity decreased but was still observed. From the time period of 8.45 minutes 188 to 12.8 minutes 190, the sprayer was moved to the left and to the right of the aperture in the curtain plate. Once again, the ion signal was still detectable. For the rest of the test data, the position of the sprayer relative to the entrance aperture of the mass spectrometer was varied in an attempt to eliminate the ion signal. The signal remained until the potentials were shut off. The results shown in the Figure demonstrate that even if the values of certain parameters change, once the parameters return to their original values, the ion signal intensity also returns to its original corresponding levels. FIG. 20 also demonstrates that this device is effective for samples with a high aqueous content (90% aqueous). It is important to note that the data presented in FIG. 20 is plotted with a linear scale on the y-axis. This causes the ion signal to appear less stable than the data presented in FIGS. 16 and 17 in which the y-axis has a log scale.

Figure 21A:
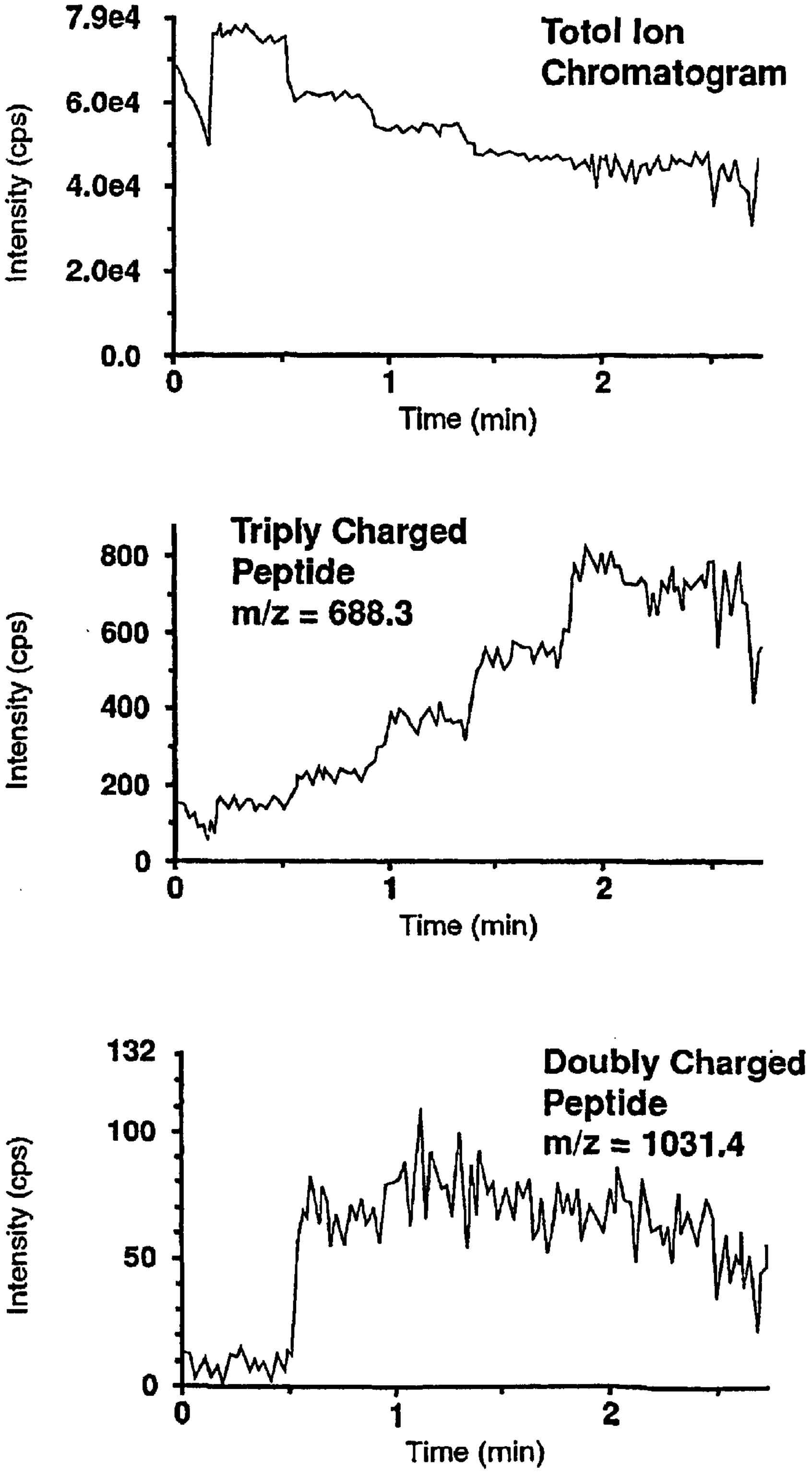
FIG. 21*a* includes three plots of ion signal intensity versus time as the potential applied to the ions lens of an ion source is increased in accordance with the present invention.
Figure 21B:
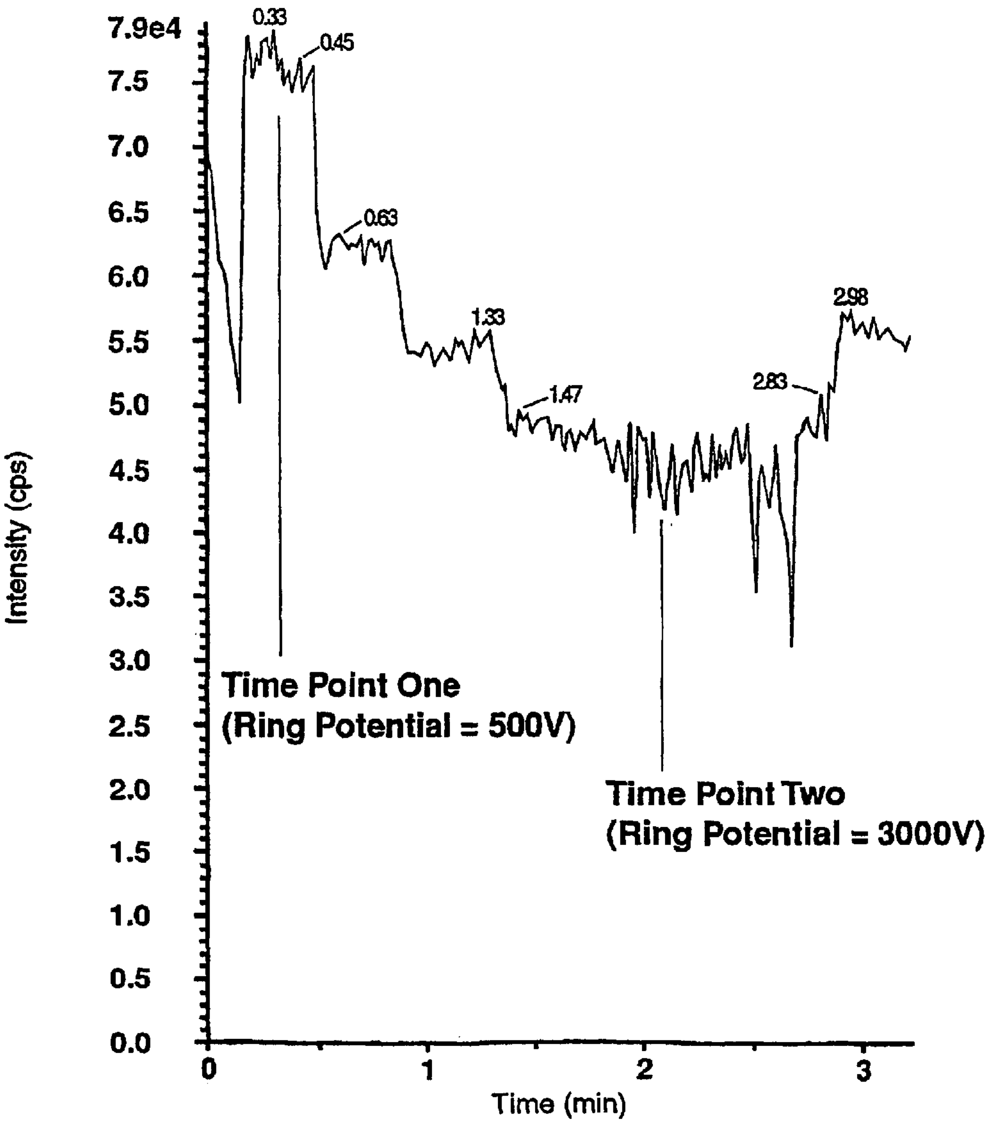
FIG. 21*b* is a plot of total ion signal intensity versus time as the potential applied to the ion lens of an ion source is increased in accordance with the present invention.
Figure 21C:
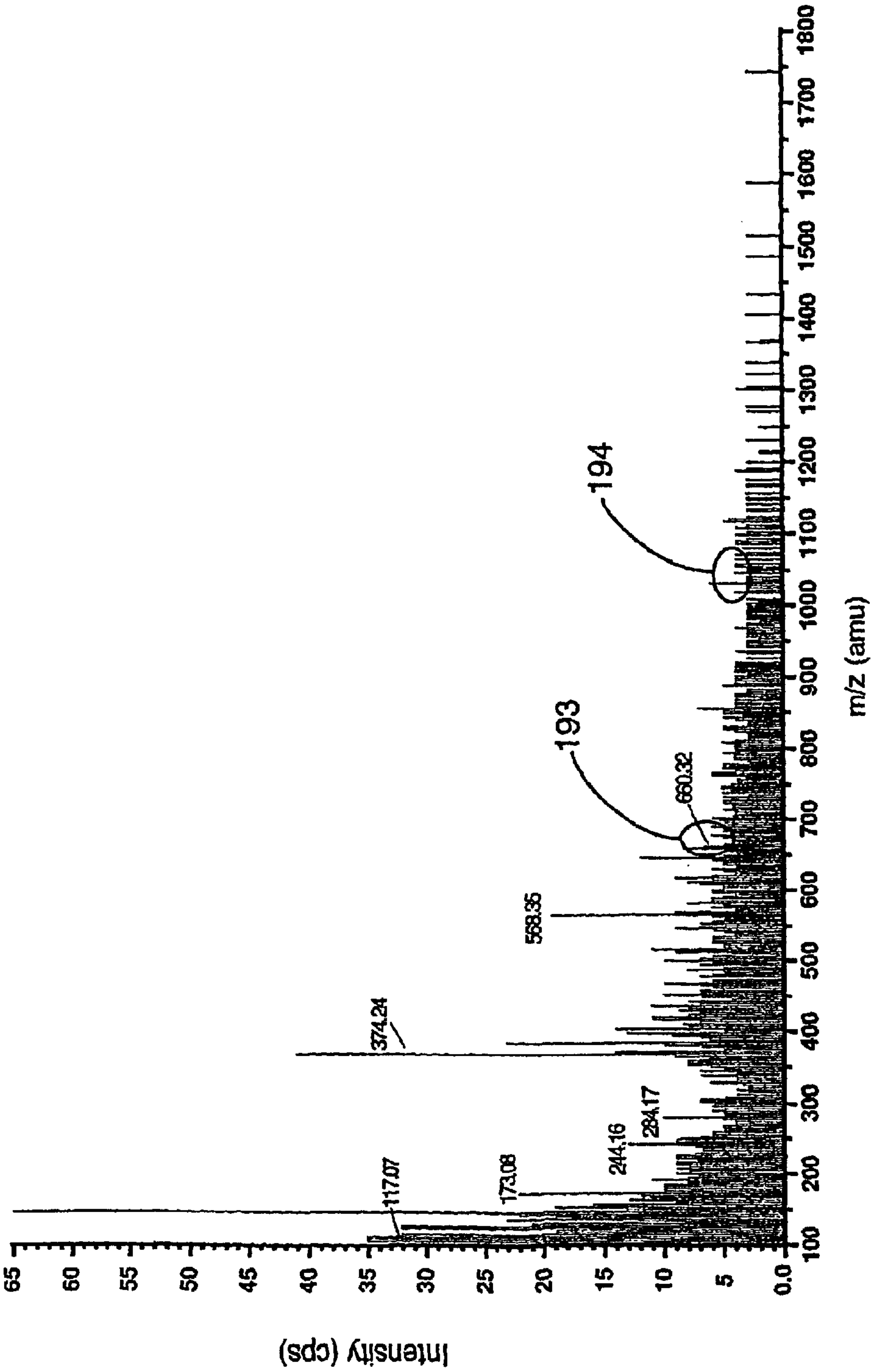
FIG. 21*c* is the mass spectra for the ion signal of FIG. 21*b* obtained at 0.433 minutes.
Figure 21D:
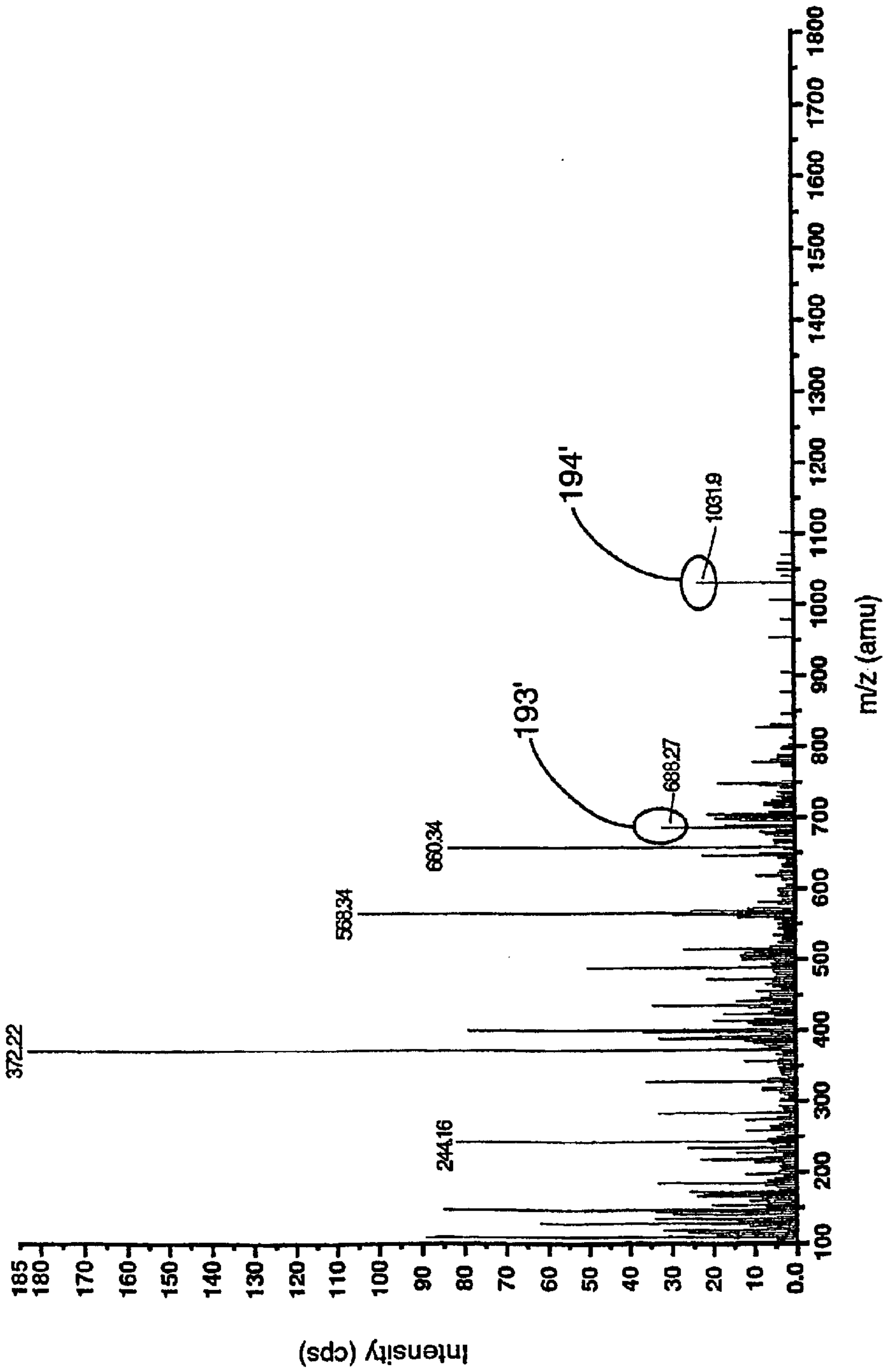
FIG. 21*d* is the mass spectra for the ion signal of FIG. 21*b* obtained at 2.07 minutes.

Reference is next made to FIGS. 21*a*–21*d* which show the effect of the ions lens on charge state over time. The FIGS. 21*a*–*b* are graphs of ion intensity versus time as the lens potential was varied using a Protana ion source. The top panel in FIG. 21*a* shows the total ion count for a digest of the protein β-casein as the potential on the ion lens was increased from 500 V to 3000 V. The top panel shows that the total ion count decreased due to a decrease in unwanted singly charged ions which contribute to background noise. The second and third panels show that there is an increase in the ion signal for triply and doubly charged peptide ions with an increase in the potential applied to the ion lens. Therefore, as the doubly and triply charged peptide ion signal increase in intensity, there is a concurrent decrease in the unwanted singly charged ions that contribute noise. This leads to an increase in the signal to noise ratio of the ion signal. FIG. 21*b* shows an expanded view of the total ion count as the potential applied to the ion lens is increased. FIGS. 21*c* and 21*d* show the mass spectrum of the ion signal taken at 0.43 minutes (point 191 in FIG. 21*b*) and 2.1 minutes (point 192 in FIG. 21*b*). The mass spectrum in FIG. 21*c* shows that it is difficult to detect the triply charged peptide ions at a mass to charge ratio of about 688 (region 193) and the doubly charged peptide ions at a mass to charge ratio of about 1031 (region 194). However, the mass spectrum in FIG. 21*d*, taken when a higher potential was applied to the ion lens, shows that the triply charged peptide ion signal 193' is now observed as well as the doubly charged peptide ion signal 194'. Therefore, when a higher potential was applied to the ion lens, the resulting mass spectrum was much less noisy, the ion intensities were greater, and the signal to noise ratios for the multiply charged peptide ions increased.

Figure 22A:
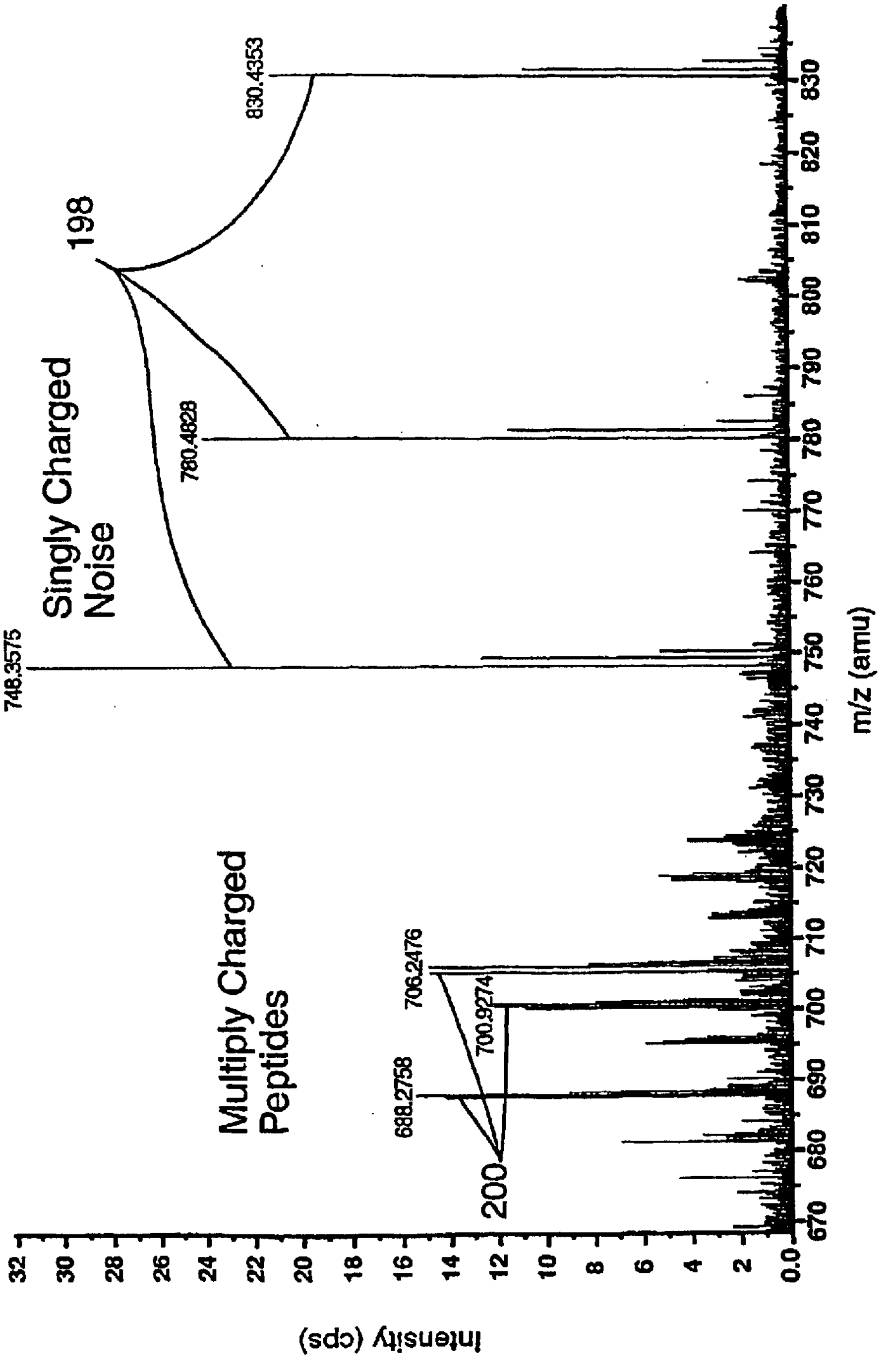
FIG. 22*a* is the mass spectra for a protein digest using a prior art reduced flow-rate ion source without an ion lens.
Figure 22B:
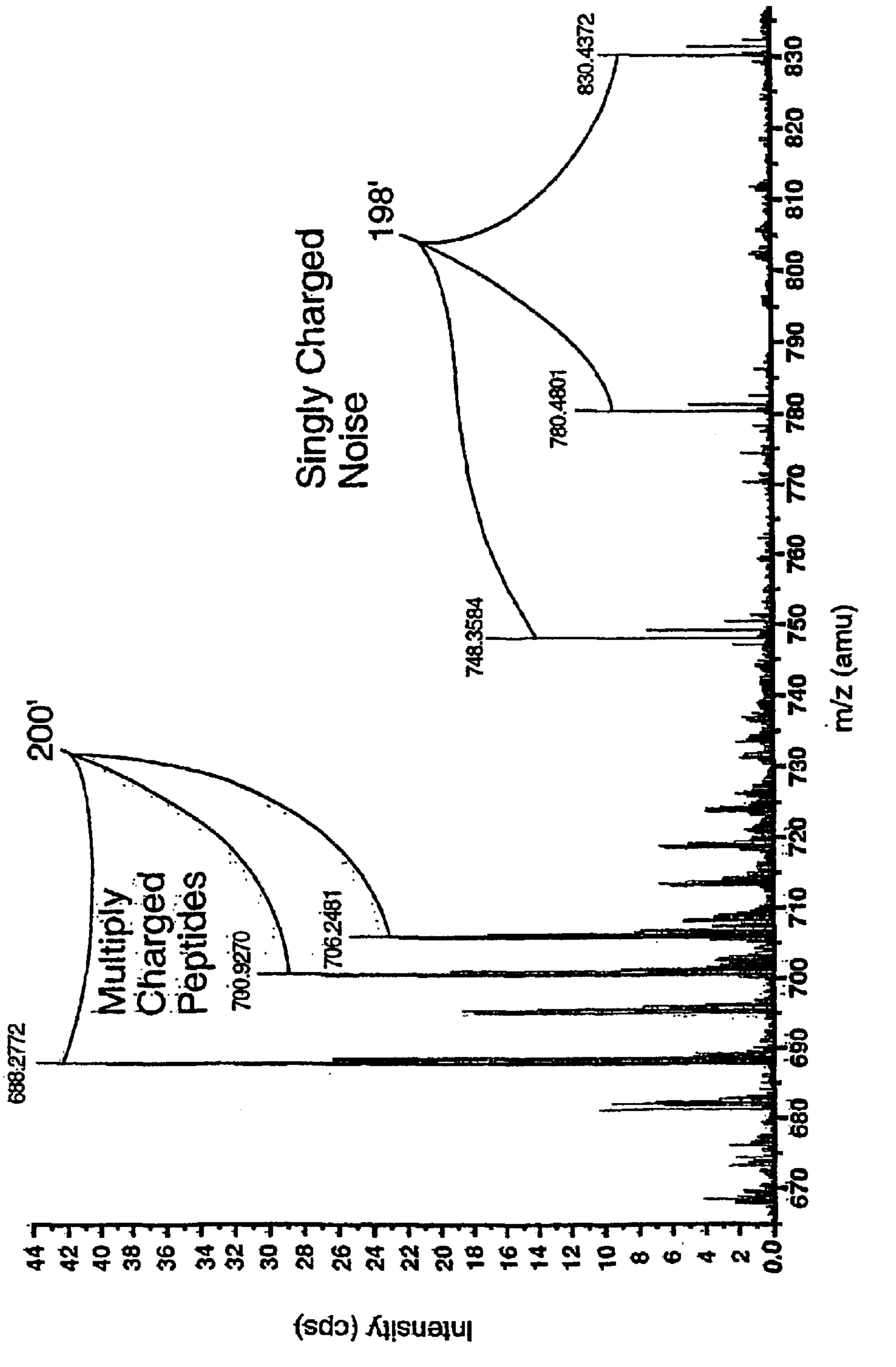
FIG. 22*b* is the mass spectra for a protein digest using a reduced flow-rate ion source with an ion lens in accordance with the present invention.

Reference is next made to FIGS. 22*a* and 22*b* which show experimental results using a reduced flow-rate ion source with and without an ion lens. The sprayer had an internal diameter of 15 μm. FIG. 22*a* shows that singly charged noise ions 198 have a larger presence in the mass spectrum than the multiply charged peptide ions 200. The results shown in FIG. 22*a* were obtained when the potentials applied to the curtain plate and the sprayer were adjusted to obtain the best ion signal possible. However, the resulting mass spectrum was still noisy. In contrast, the mass spectrum in FIG. 22*b* shows that, with the addition of an ion lens, much more favorable results can be obtained. The contribution of the singly charged noise ions 198' have been reduced and the ion signal Intensity for the multiply charged peptide ions 200' has increased from 16 to 44 cps. This represents a signal increase of approximately 2.5 to 3 times. This is important for applications in which multiply charged ions have to be detected.

Figure 23A:
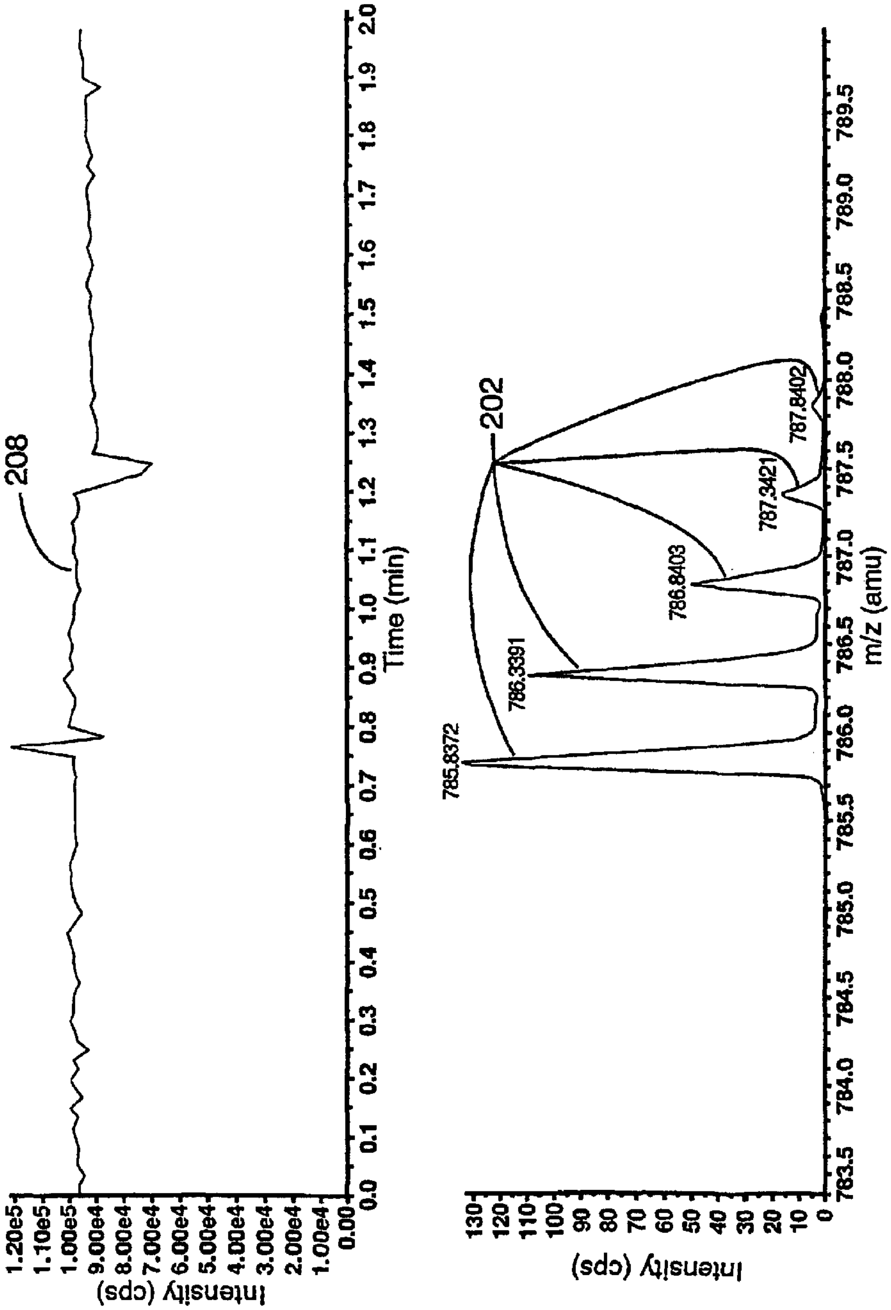
FIG. 23*a* is a graph of the ion intensity versus time and the corresponding mass spectrum for a sample of glufibrinopeptide obtained using a standard prior art reduced flow-rate ion source without an ion lens.
Figure 23B:
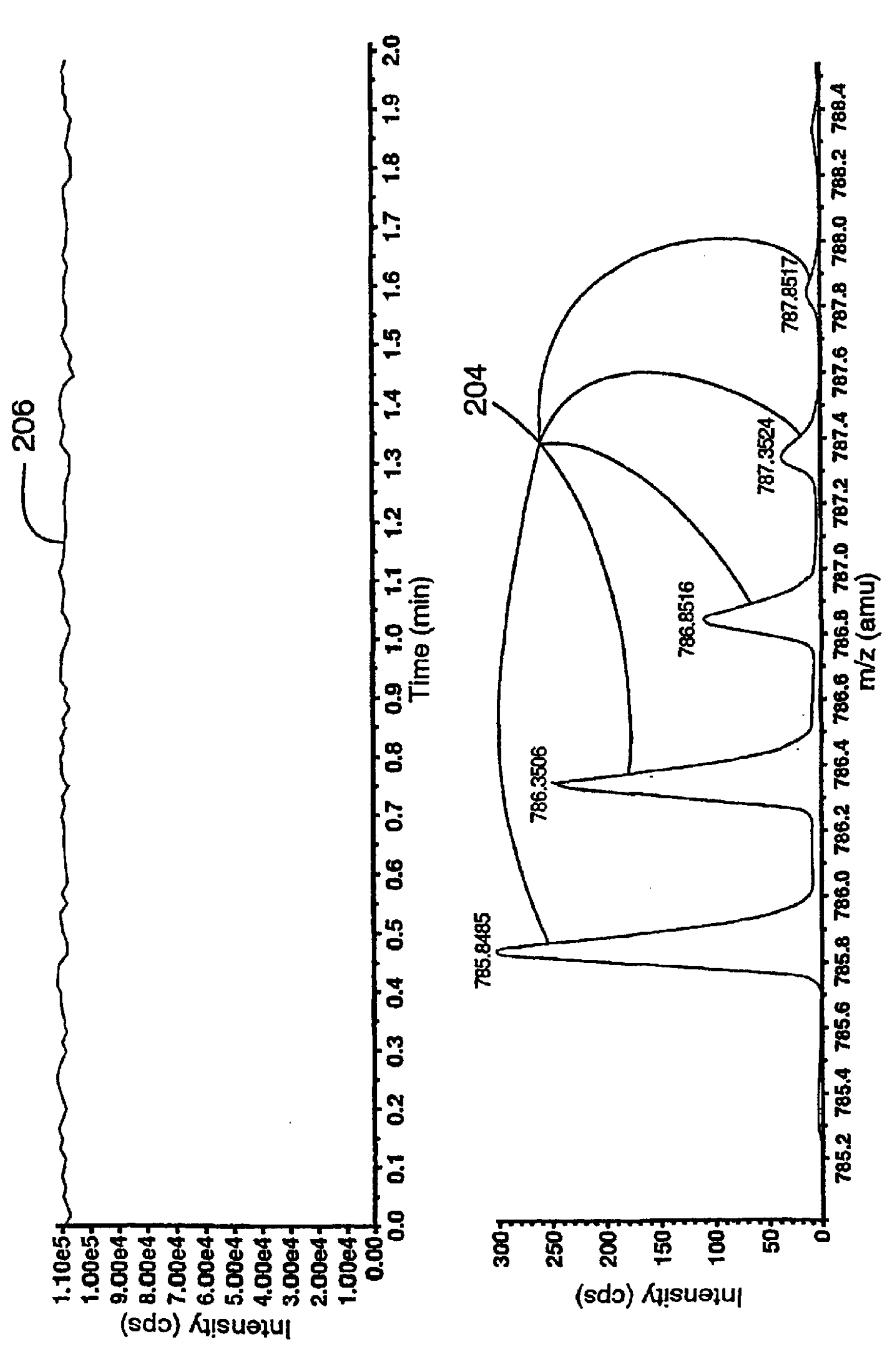
FIG. 23*b* is a graph of the ion signal intensity versus time and the corresponding mass spectrum for a sample of glufibrinopeptide obtained using a standard reduced flow-rate ion source with an ion lens in accordance with the present invention.

Referring now to FIGS. 23*a* and 23*b*, a sample of glufibrinopeptide was analyzed by a mass spectrometer having a standard ionspray source (FIG. 23*a*) with a flow rate of 3 μL/min and a mass spectrometer having a reduced flow-rate sprayer, with a flow rate of 400 nL/min and an ion lens (FIG. 23*b*). The Figures show that the ion intensity for a doubly charged ion of glufibrinopeptide 202 was increased from approximately 110 cps to 300 cps (peak 204 in FIG. 23*b*) with the use of an ion lens. The sensitivity is indicated by the vertical scale on the left of FIGS. 23*a* and 23*b*. This is an increase of about 2.7 times. Furthermore, the use of the ion lens, resulted in an ion signal with a smaller RSD since the ion signal waveform 206 in FIG. 23*b* is much flatter than the ion signal waveform 208. The measured RSD was reduced by a factor of 2 when the ion lens was used.

Figure 24A:
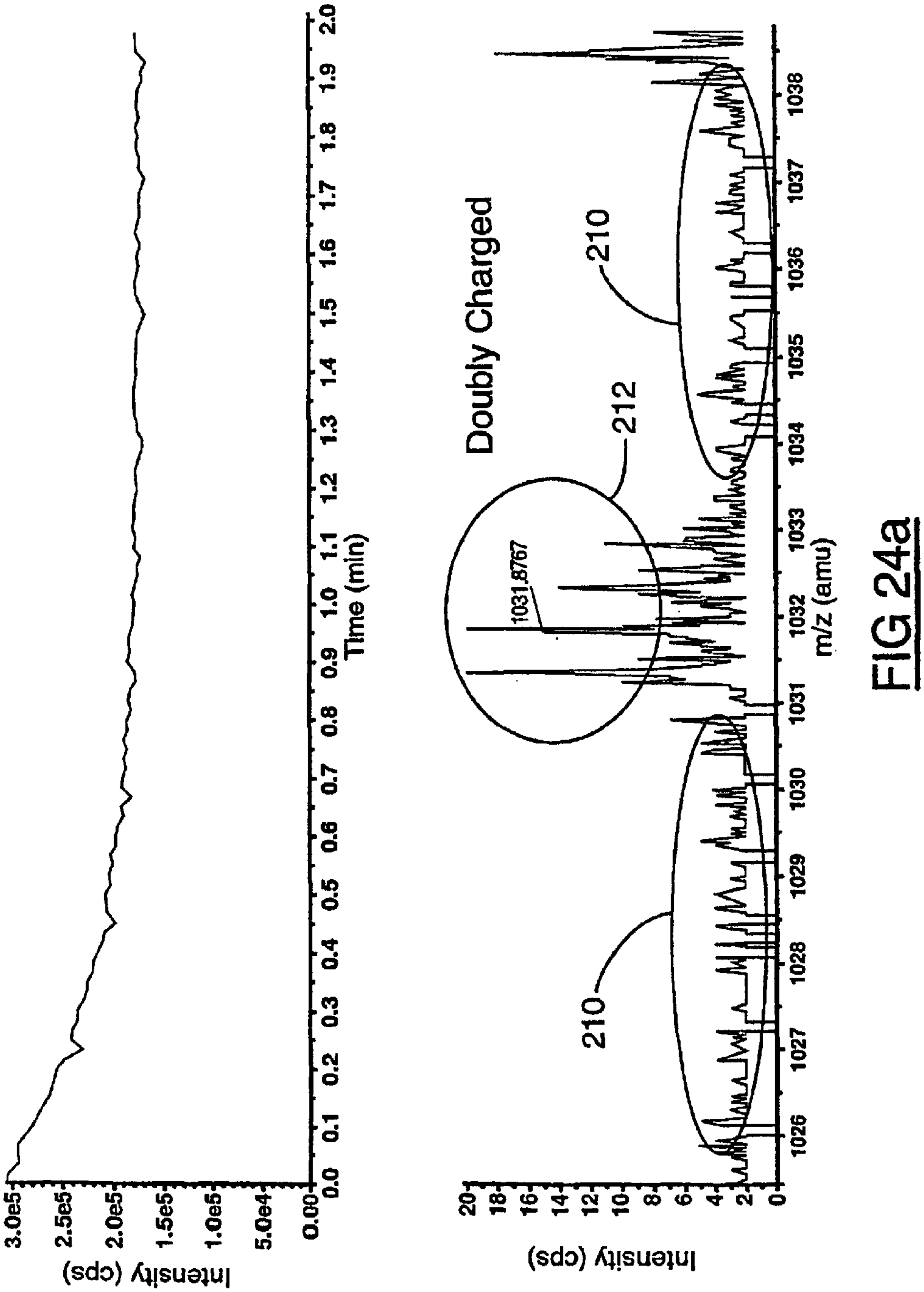
FIG. 24*a* includes graphs of the ion signal intensity versus time and the corresponding mass spectrum for one peptide in a digest of a 500 fmol sample of beta-casein obtained using a prior art reduced flow-rate ion source without an ion lens.
Figure 24B:
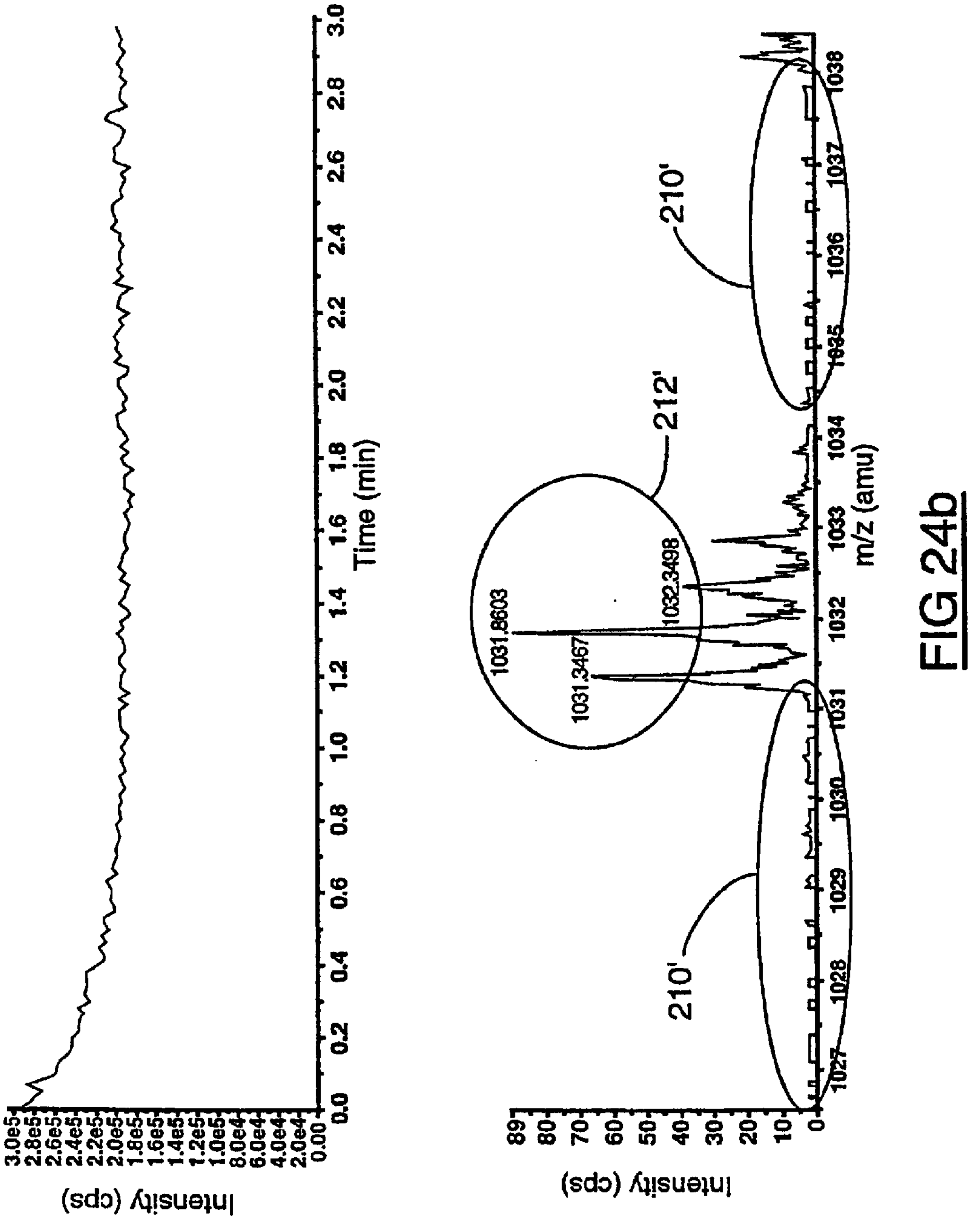
FIG. 24*b* includes graphs of the ion signal intensity versus time and the corresponding mass spectrum for one peptide in a digest of a 500 fmol sample of beta-casein obtained using a reduced flow-rate ion source with an ion lens in accordance with the present invention.
Figure 24C:
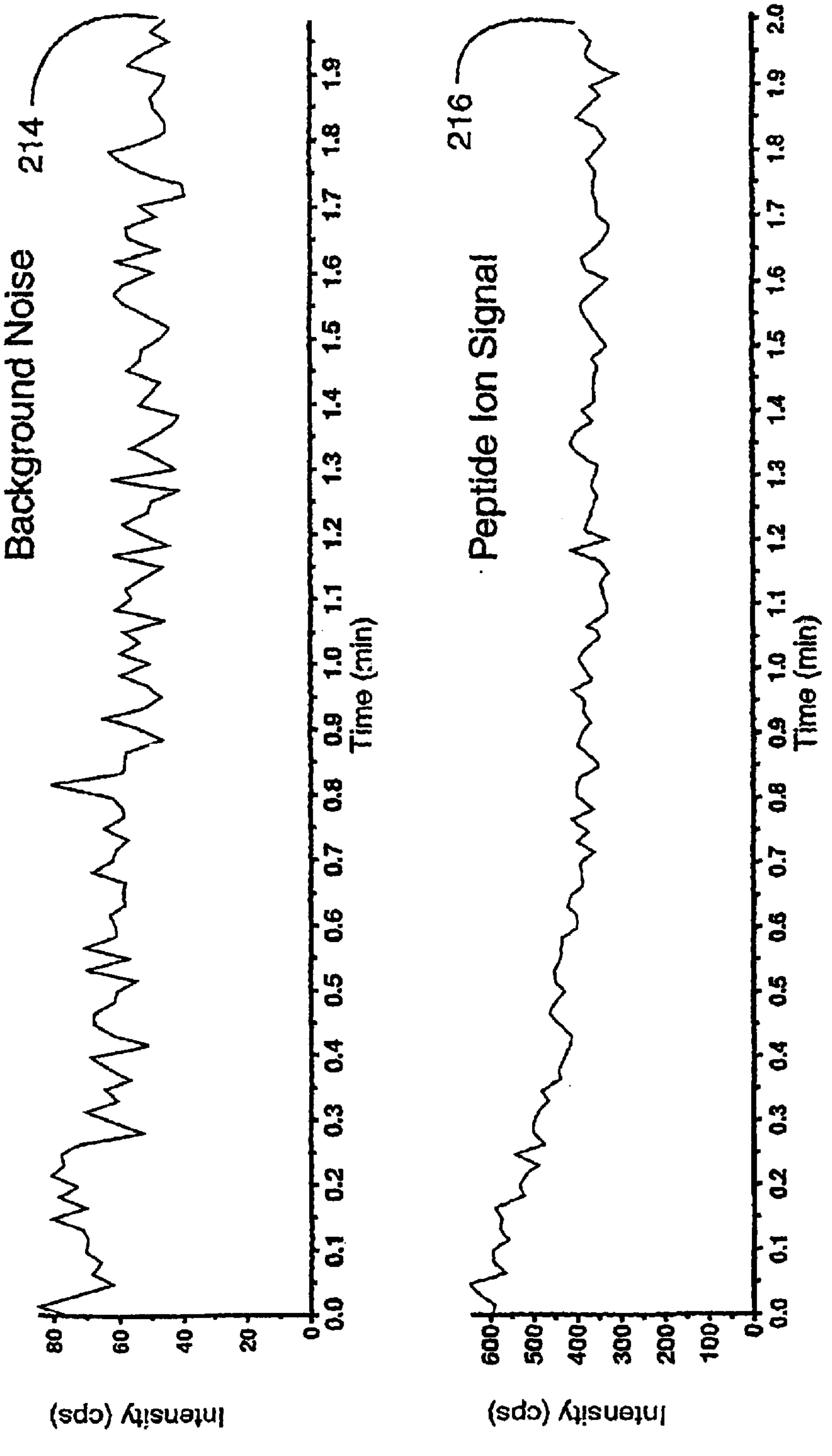
FIG. 24*c* includes graphs of the background noise intensity versus time and the ion signal intensity versus time for one peptide in a digest of a 500 fmol sample of beta-casein obtained using a prior art reduced flow-rate ion source without an ion lens.
Figure 24D:
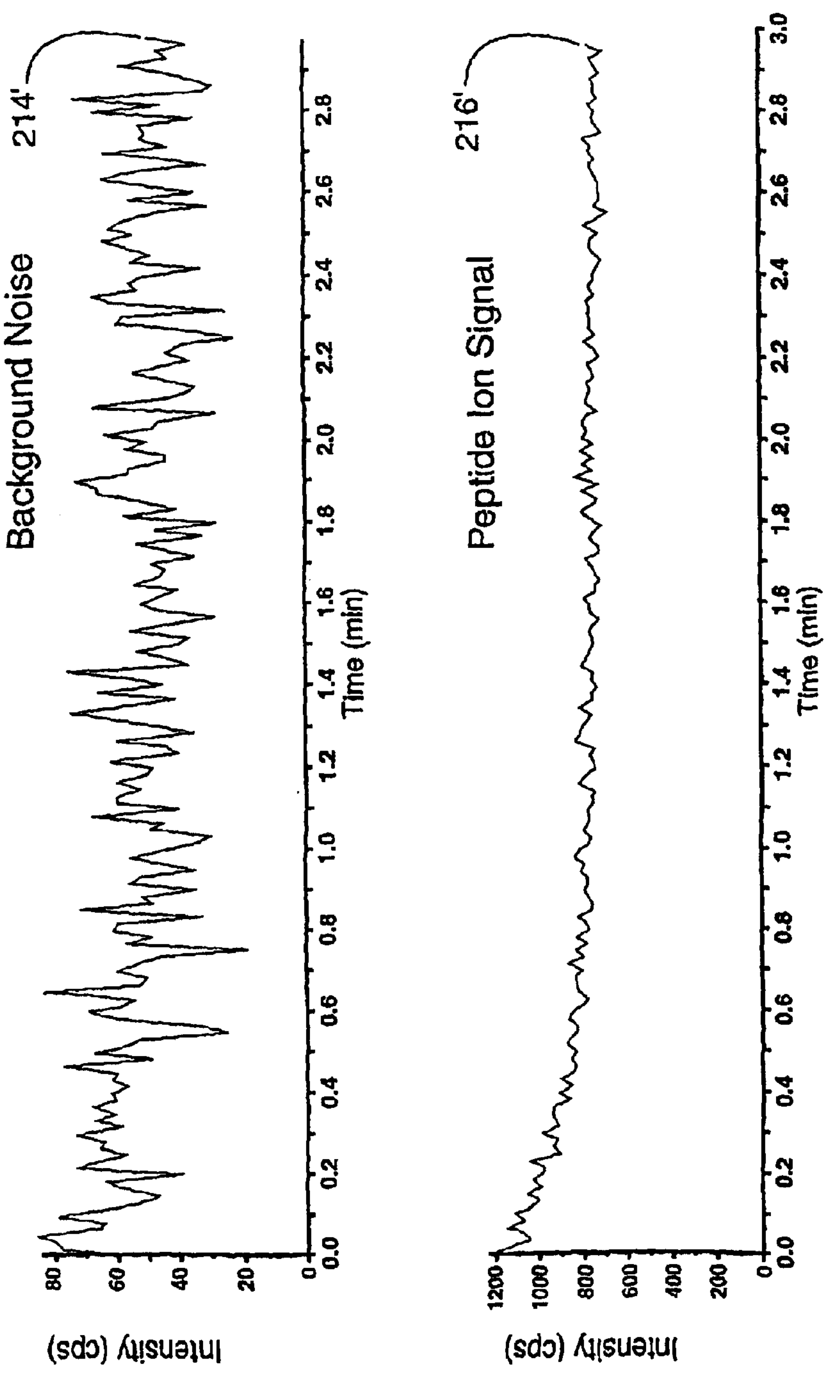
FIG. 24*d* includes graphs of the background noise intensity versus time and the ion signal intensity versus time for one peptide in a digest of a 500 fmol sample of beta-casein obtained using a reduced flow-rate ion source with an ion lens in accordance with the present invention.

Reference is next made to FIGS. 24*a*–24*d* which show the resulting ion signal for a digest of a 500 fmol sample of beta casein which was applied to a reduced flow-rate ion source without and with an ion lens. The flow rate was on the order of 200–400 nL/min. FIGS. 24*a* and 24*b* show that the ion lens resulted in an increase in ion signal intensity (212' versus 212) in the mass spectrum. FIGS. 24*c* and 24*d* show similar results in the time domain. With the addition of the ion lens, the background noise (214' versus 214) is decreased and the peptide ion signal is increased (216' versus 216). In this case, the signal to noise ratio was increased by a factor greater than 4.

Figure 25A:
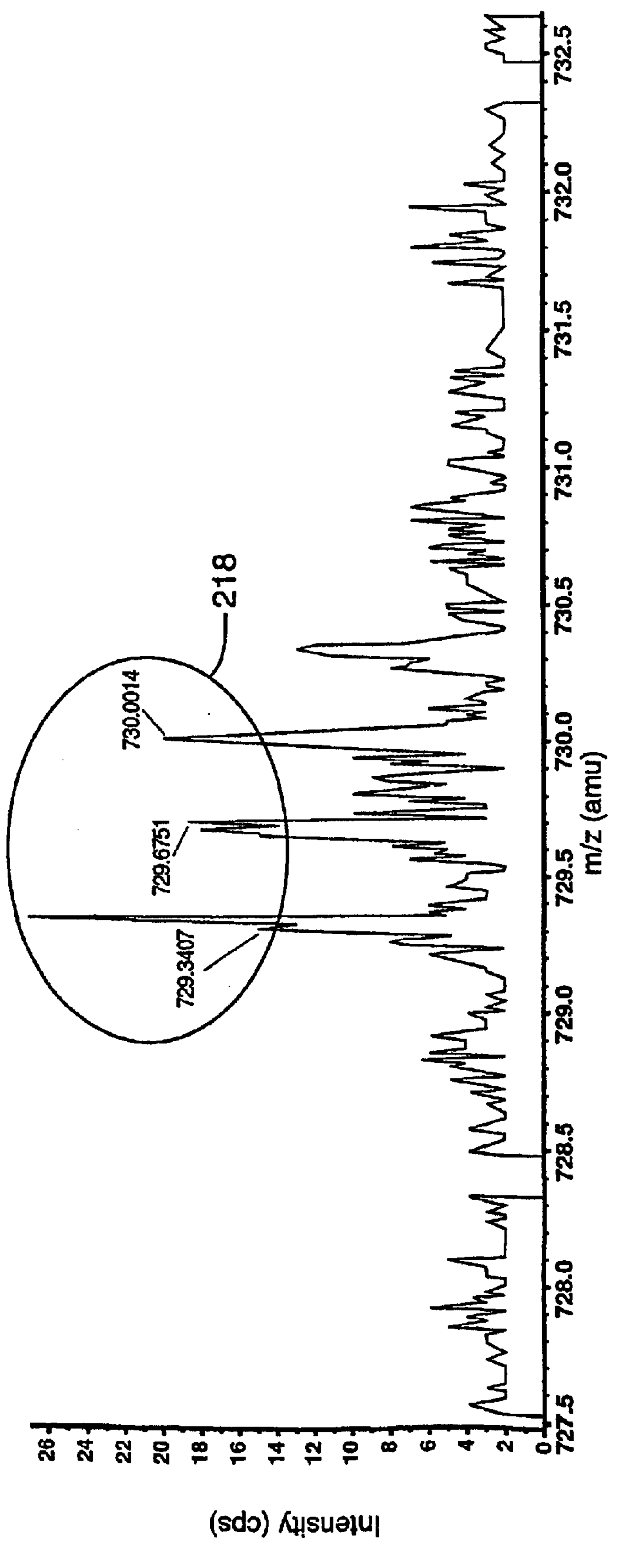
FIG. 25*a* is the mass spectrum for a triply charged peptide from a beta-casein digest obtained using a prior art reduced flow-rate ion source without an ion lens.
Figure 25B:
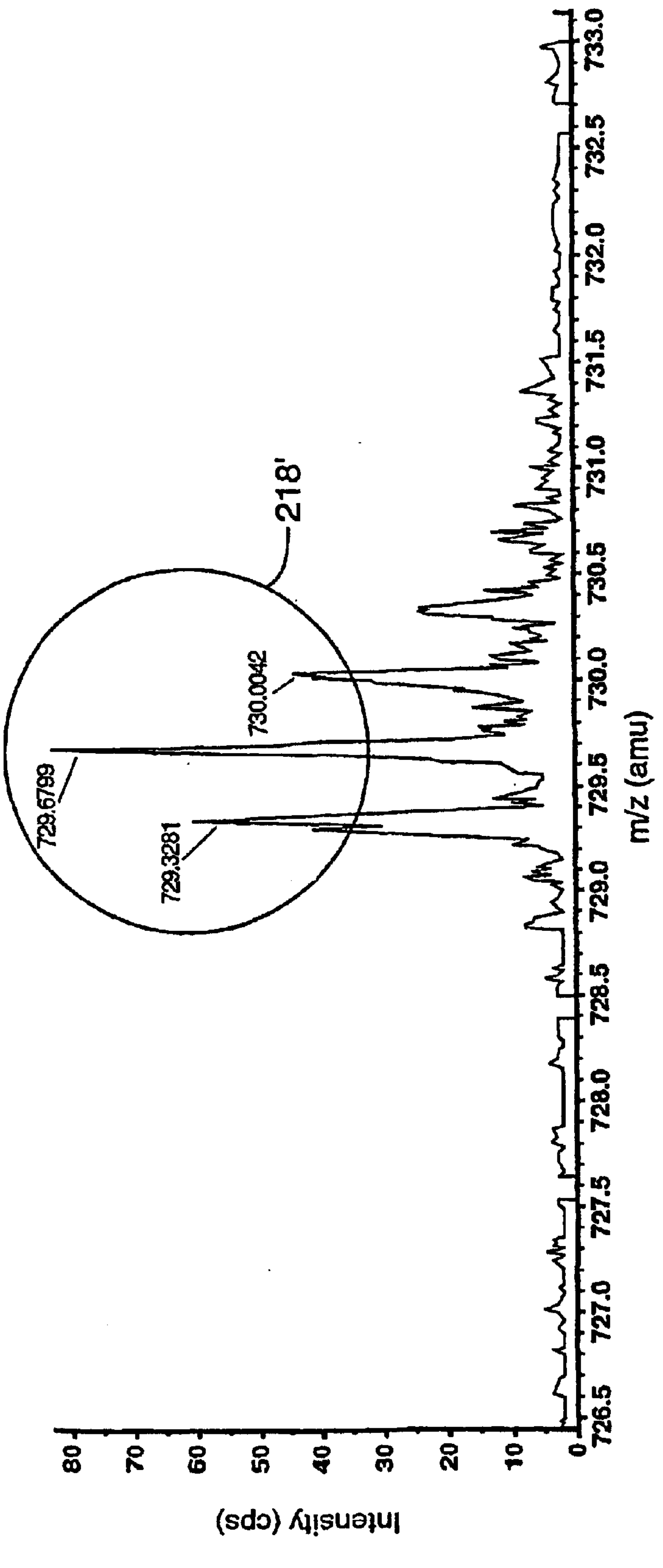
FIG. 25*b* is the mass spectrum for a triply charged peptide from a beta-casein digest obtained using a reduced flow-rate ion source with an ion lens in accordance with the present invention.

Referring now to FIGS. 25*a* and 25*b*, the mass spectrum is shown for another sample of beta-casein digest which was applied to a reduced flow-rate ion source without and with an ion lens, respectively. The addition of the ions lens allowed the triply charged peptide peak 218' in FIG. 25*b* to be more easily detected whereas without the ion lens in FIG. 25*a*, the triply charged peptide peak 218 was difficult to detect due to its low intensity and the high magnitude of the background noise. The intensity of the peptide peak was increased by a factor of 3.5 times with the addition of the ion lens.

Figure 26A:
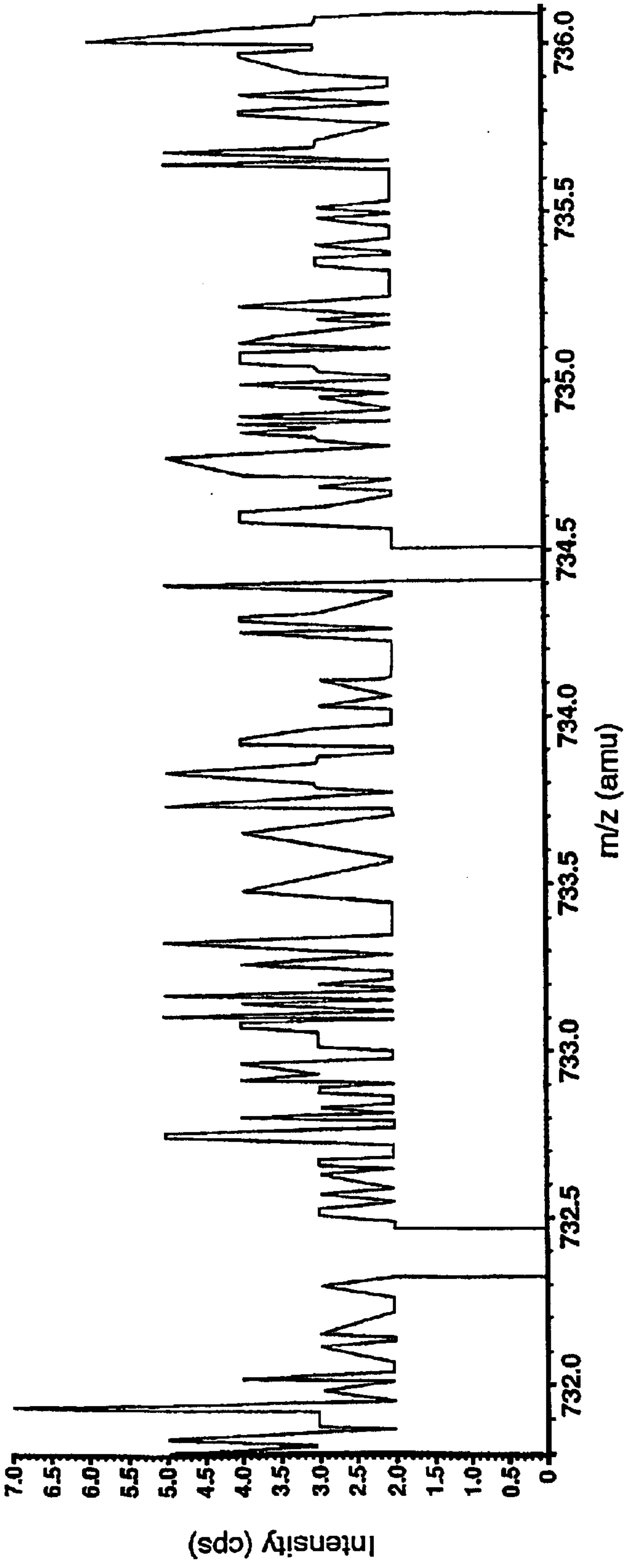
FIG. 26*a* is the background noise for a triply charged peptide (the signal in FIG. 25*a*) from a beta-casein digest obtained using a prior art reduced flow-rate ion source without an ion lens.
Figure 26B:
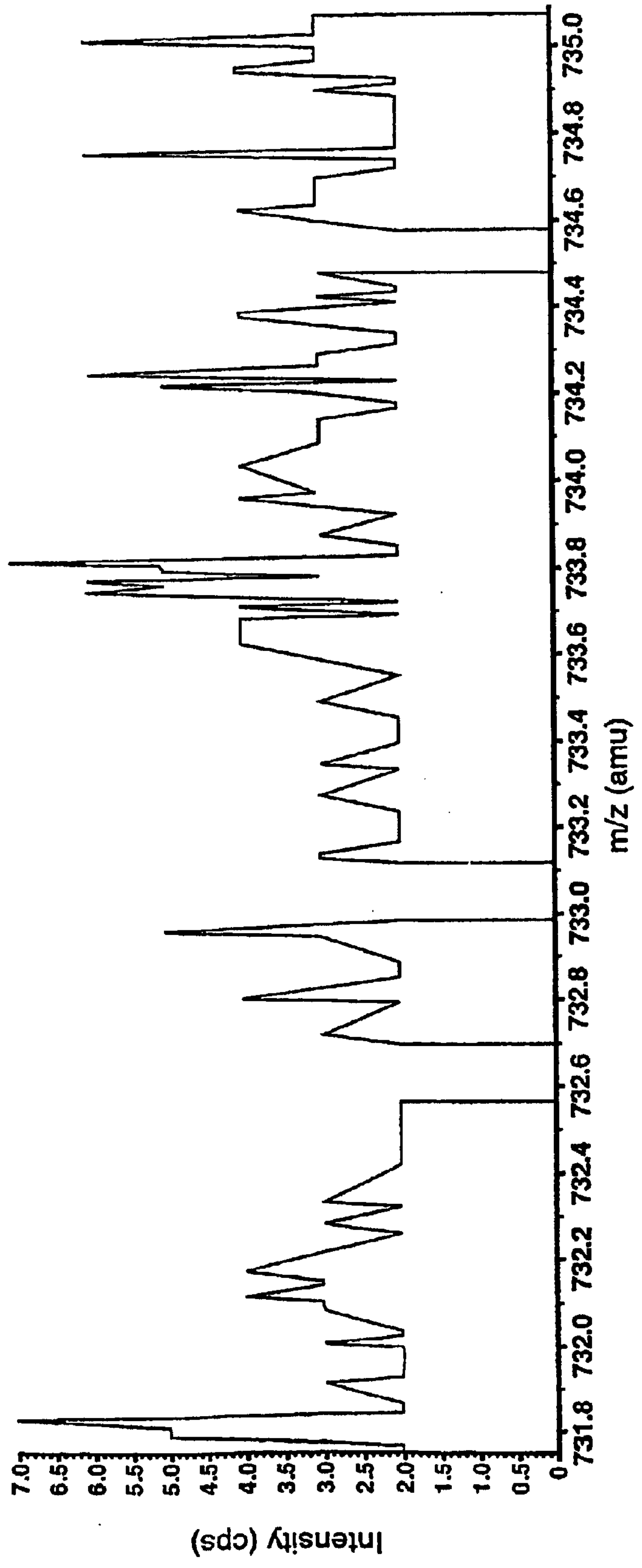
FIG. 26*b* is the background noise for a triply charged peptide (the signal in FIG. 25*b*) from a beta-casein digest obtained using a reduced flow-rate ion source with an ion lens in accordance with the present invention.

Referring now to FIGS. 26*a* and 26*b*, the graphs show the magnitude of the background noise in the vicinity of the triply charged peptide 218 and 218' shown in FIGS. 25*a* and 25*b*, respectively. FIG. 26*a* is the background noise for the reduced flow-rate ion source in the absence of the ion lens and FIG. 26*b* is the background noise with the ion lens. FIGS. 26*a* and 26*b* demonstrate that the background noise is the same with and without the lens. Therefore, the signal enhancement shown in FIGS. 25*a* and 25*b* does not lead to an increase in the background noise and the signal to noise ratio is thus increased by a factor of approximately 3.5 times.

Figure 27A:
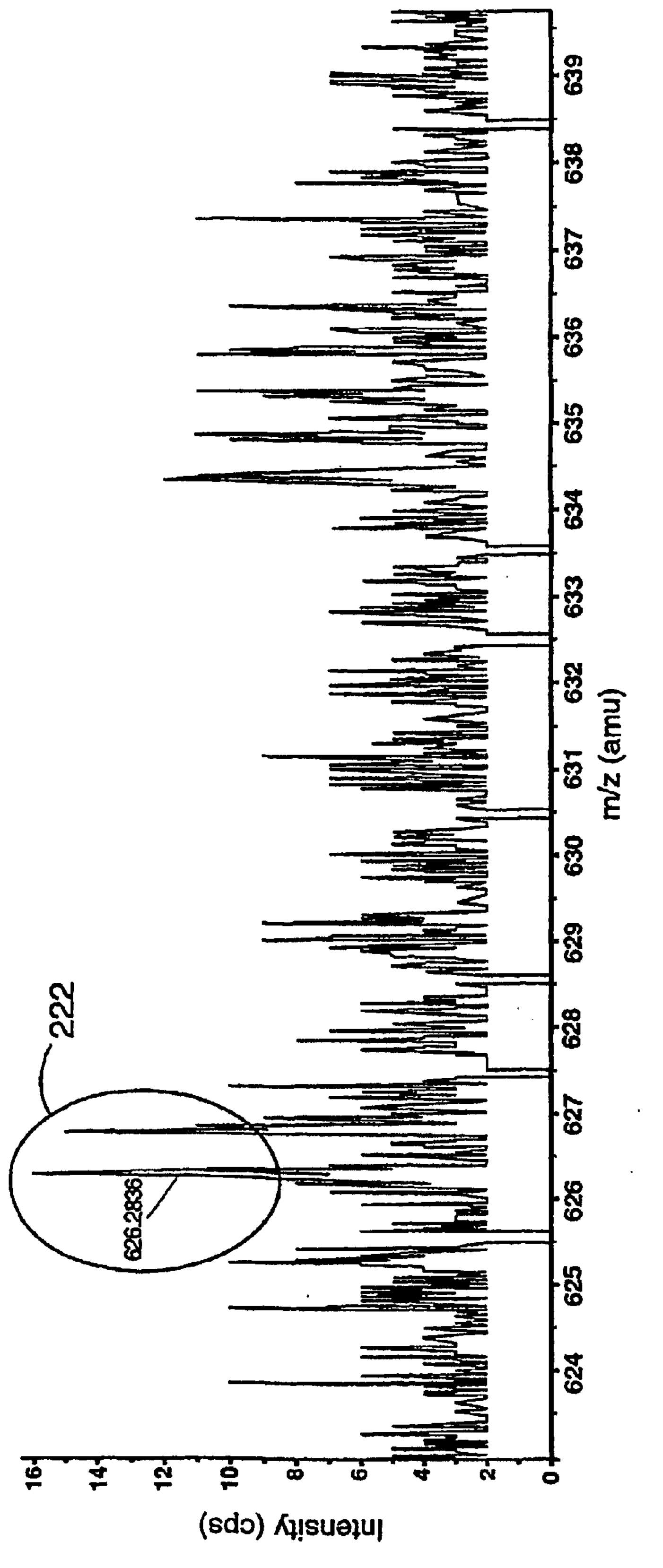
FIG. 27*a* is the mass spectrum for a doubly charged peptide from a beta-casein digest obtained using a prior art reduced flow-rate ion source without an ion lens.
Figure 27B:
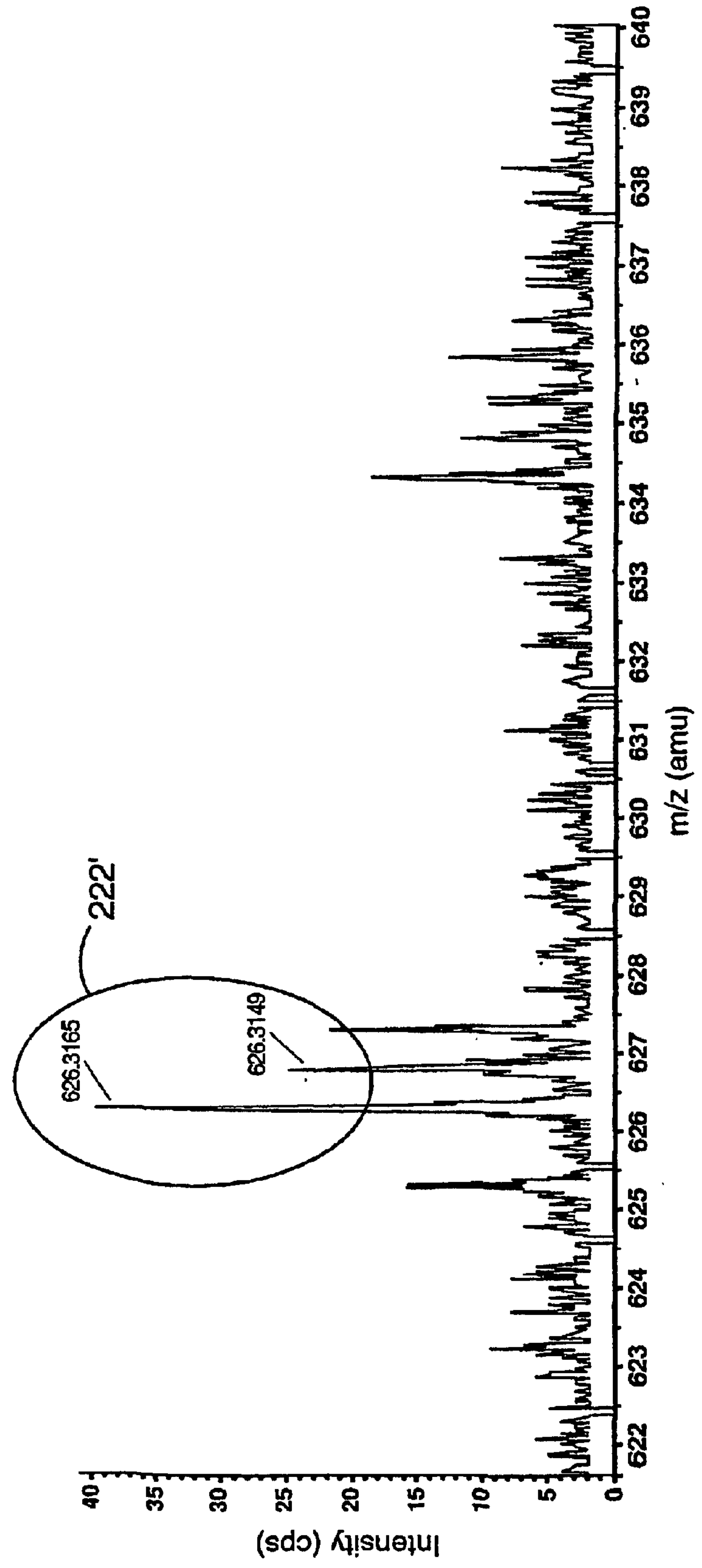
FIG. 27*b* is the mass spectrum for a doubly charged peptide from a beta-casein digest obtained using a reduced flow-rate ion source with an ion lens in accordance with the present invention.

Referring now to FIGS. 27*a* and 27*b*, the mass spectra are shown for a beta-casein digest sample which was applied to a reduced flow-rate ion source without and with an ion lens, respectively. In the mass spectrum shown in FIG. 27*a* (i.e. no ion lens), the doubly charged peptide ion signal 222 is difficult to detect. However, in FIG. 27*b* (i.e. with the ion lens), the doubly charged peptide ion signal 222' is more easily detected. Also, the ion signal intensity for the doubly charged peptide ion signal 222' is much larger when the ion lens was used.

Figure 28A:
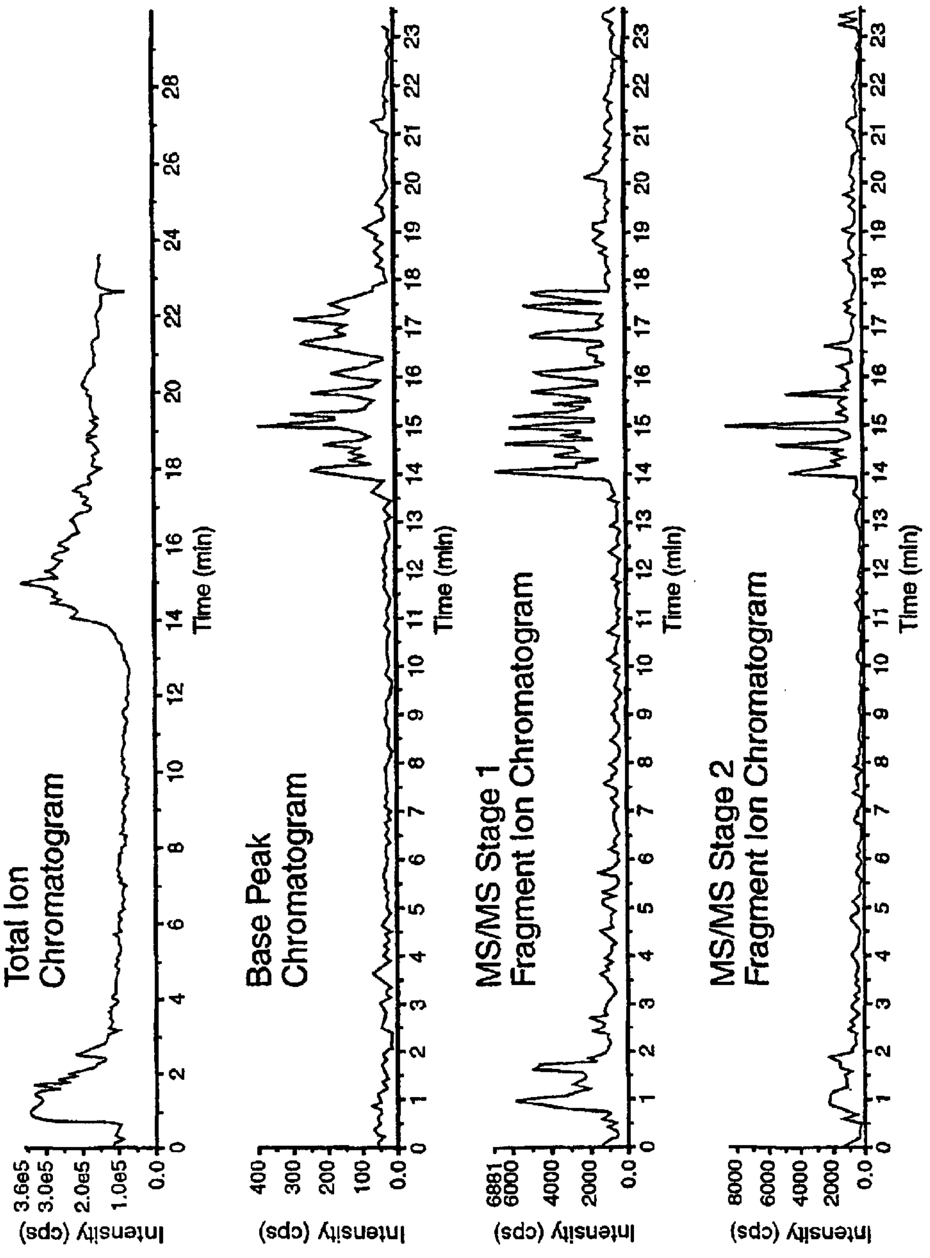
FIG. 28*a* includes graphs of the total ion chromatogram, base peak chromatogram, fragment ion chromatogram for the most dominant peptide in each scan of the mass spectrometer and fragment ion chromatogram from the second most dominant peptide in each scan of the mass spectrometer versus time for a digest of a 100 fmol sample of bovine serum albumin obtained using a nano-high performance liquid chromatography (HPLC)-MS with an ion source with an ion lens in accordance with the present invention.
Figure 28B:
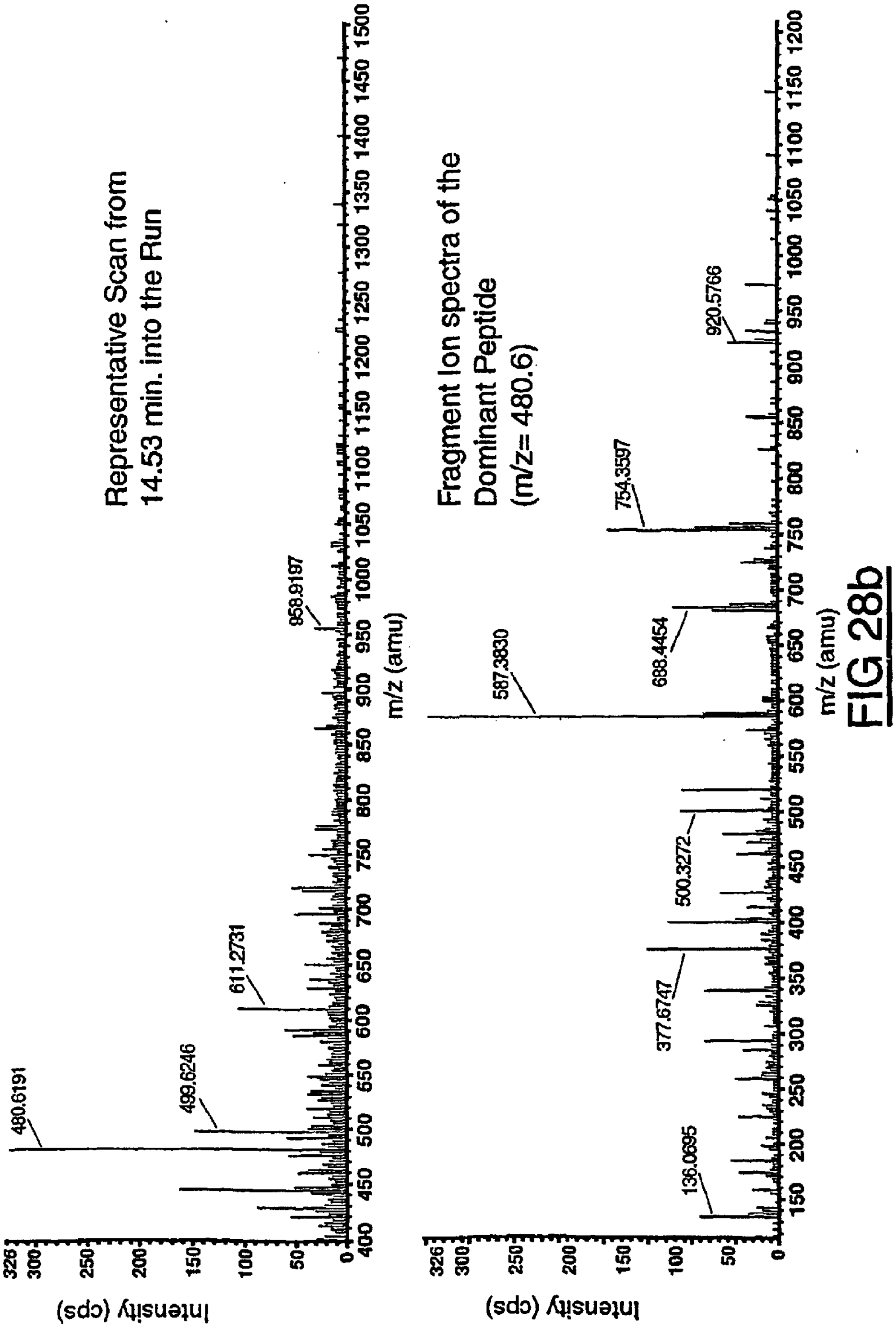
FIG. 28*b* is the mass spectra for a peptide and the fragment ions from the peptide from a digest of a 100 fmol sample of bovine serum albumin obtained using a nano-HPLC-MS mass spectrometer with an ion source with an ion lens in accordance with the present invention.

Referring now to FIGS. 28*a* and 28*b*, a 100 fmol sample of bovine serum albumin digest was applied to a nano-HPLC-MS with an ion lens. The liquid flow rate for the sprayer was 100–300 nL/min and the sprayer had an inner diameter of 15 μm. The test results showed that there was a sufficient increase in the signal to noise ratio when the ion lens was used. Tandem mass spectrometry (MS/MS) was carried out on the two strongest peptide ion signals detected in every scan. The total ion count for peptide fragments from the strongest peptide ion signal is shown in the third panel of FIG. 28*a*. The total ion count for the peptide fragments of the second strongest peptide ion signal is shown in the fourth panel of FIG. 28*a*. The largest number of peptide ions were observed around 14 minutes. The top panel in FIG. 28*b* shows the mass spectrum obtained at 14.53 minutes of the experiment. The bottom panel in FIG. 28*b* shows the fragment ion spectrum for the dominant peptide ion signal at a m/z ratio of 480.6. This data is important because the results shown in FIGS. 28*a* and 28*b* could not be achieved if the ion lens was not used in the ion source.

Figure 29:
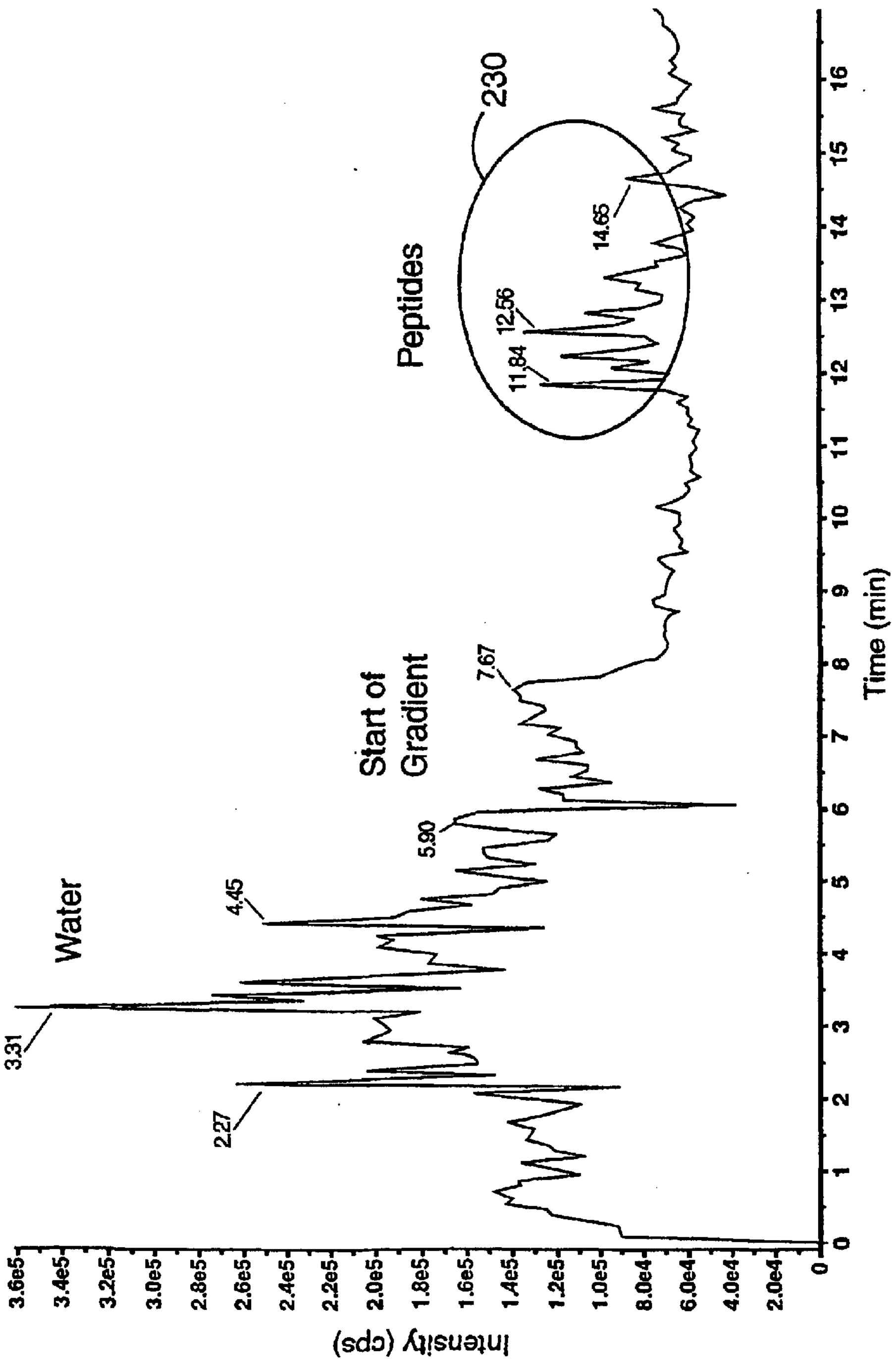
FIG. 29 is a graph of total ion signal intensity versus time for a digest of a 50 fmol sample of bovine serum albumin obtained using a nano-HPLC-MS with an ion lens in accordance with the present invention.

Reference is next made to FIG. 29 which shows the ion signal measured for a 50 fmol digest of bovine serum albumin which was applied to a nano-HPLC-MS with an ion lens. The ion lens is very important because before using the nano-HPLC-MS, water must be pumped through the device to condition the column. If an ion lens is not used, the ESI interface will not operate because water disrupts the spraying process due to its high surface tension. A gradient of water and organic solvent was used to separate hydrophobic and hydrophilic peptides. The test was prematurely terminated, but the peptides 230 were detected between 11.5 to 17 minutes after the test started. The measured ion signal was then referenced to a database to identify the digested protein. The protein was correctly identified with a certainty of approximately 300 orders of magnitude above that which would occur for a random ion signal (i.e. a noise signal). This test result shows that the detection limit for the peptide ion signal is substantially lower than the 50 fmol of digest used in the experiment. In addition, this test shows that an ion lens greatly increases the reliability of a nano-HPLC-MS run.

Figure 30:
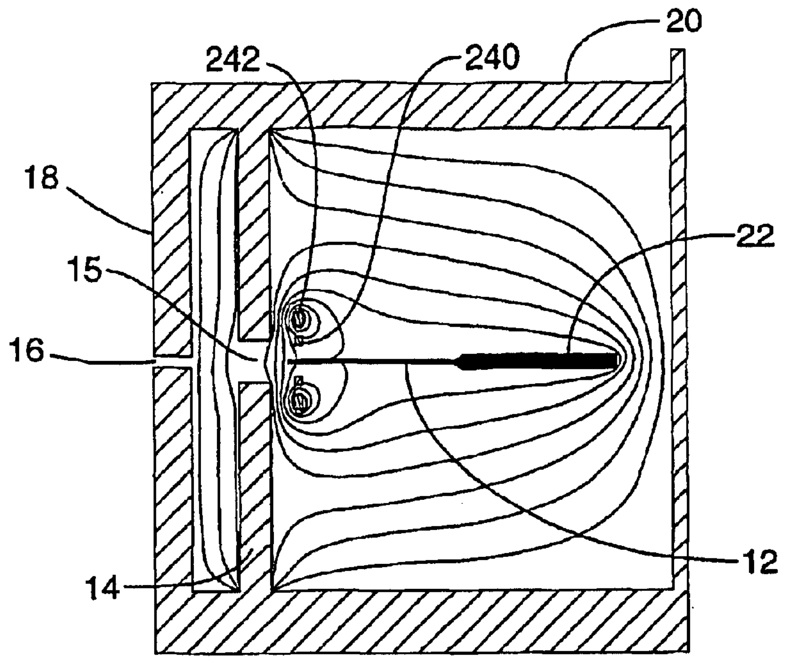
FIG. 30 is a simulation result showing equipotential lines for an ion source having two concentric ion lenses in accordance with the present invention.

In an alternate embodiment of the present invention, the ion source may have more than one ion lens placed in close proximity to the sprayer. Referring to FIG. 30, results are shown for a simulation which shows equipotential lines for an ion source with two concentric ion lenses surrounding a sprayer. The ion source comprises a sprayer 12, a curtain plate 14, an aperture in the curtain plate 15, an orifice 16, an orifice plate 18, a source housing 20, an inner ion lens 240 and an outer ion lens 242. In this simulation, the applied potentials were 3800 V for the sprayer 12, 1800 V for the curtain plate 14, 190 V for the orifice plate 18, 4200 V on the inner ion lens 240 and 6000 V on the outer ion lens 242. The results show that the equipotential lines are flat directly in front of the tip of the sprayer 12 which focuses the ions towards the aperture 15 in the curtain plate 14.

Figure 31:
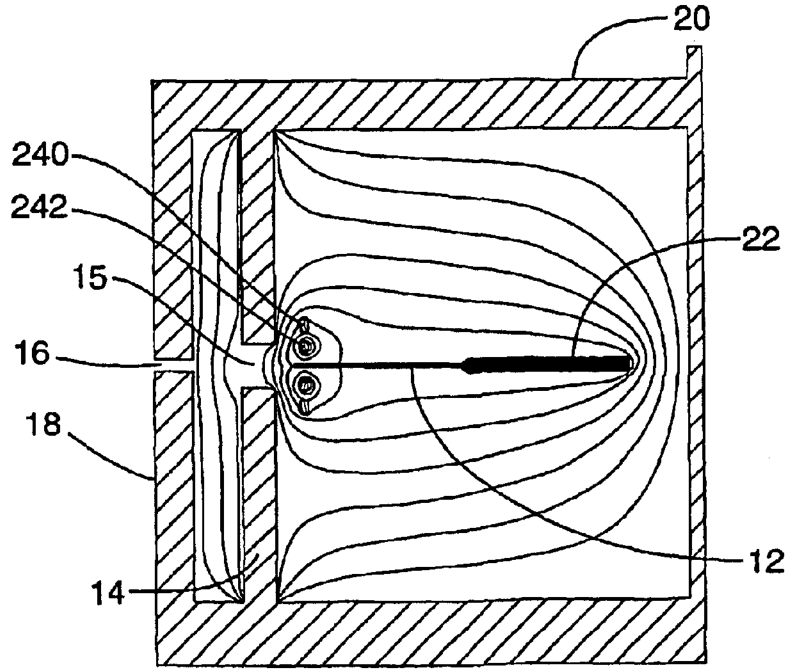
FIG. 31 is a simulation result showing equipotential lines for an ion source having two concentric ion lenses in accordance with the present invention.

Reference is now made to FIG. 31 which illustrates the results of a simulation which shows equipotential lines for the same ion source configuration shown in FIG. 30 except that the potentials applied to the inner ion lens 240 and the outer ion lens 242 are reversed. The potential applied to the inner ion lens 240 is 6000 V and the potential applied to the outer ion lens 242 is 4200 V. The resulting equipotential lines are once again flat directly in front of the tip of the sprayer 12 which should focus the ions towards the aperture 15 in the curtain plate 14.

Figure 32:
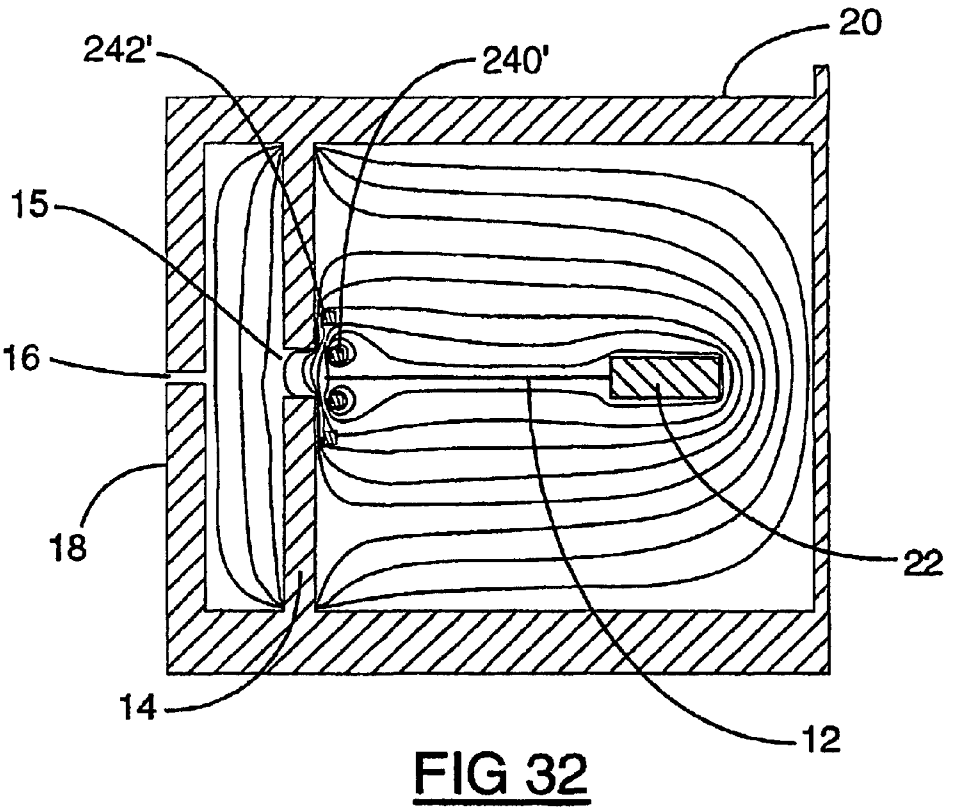
FIG. 32 is a simulation result showing equipotential lines for the ion source of FIG. 31 with the ion lenses slightly misaligned along the axis of the capillary in accordance with the present invention.

Reference is now made to FIG. 32 which illustrates the results of a simulation which shows equipotential lines for the same ion source configuration shown in FIG. 30 except that the ion lenses 240' and 242' have been slightly misaligned along the axis of the sprayer 12. A potential of 4200 V is applied to the sprayer 12, a potential of 5500 V is applied to the ion lens 242' and a potential of 3500 V is applied to the ion lens 240'. The curtain plate 14 is biased at a potential of 1800 V, the orifice plate 18 is biased at a potential of 190 V and the housing 20 is at ground. The simulation results show that the equipotential lines are flat directly in front of the sprayer 12 and perpendicular to the axis of the sprayer 12. Accordingly, this configuration should focus the ions towards the orifice 16 in the orifice plate 18.

Figure 33:
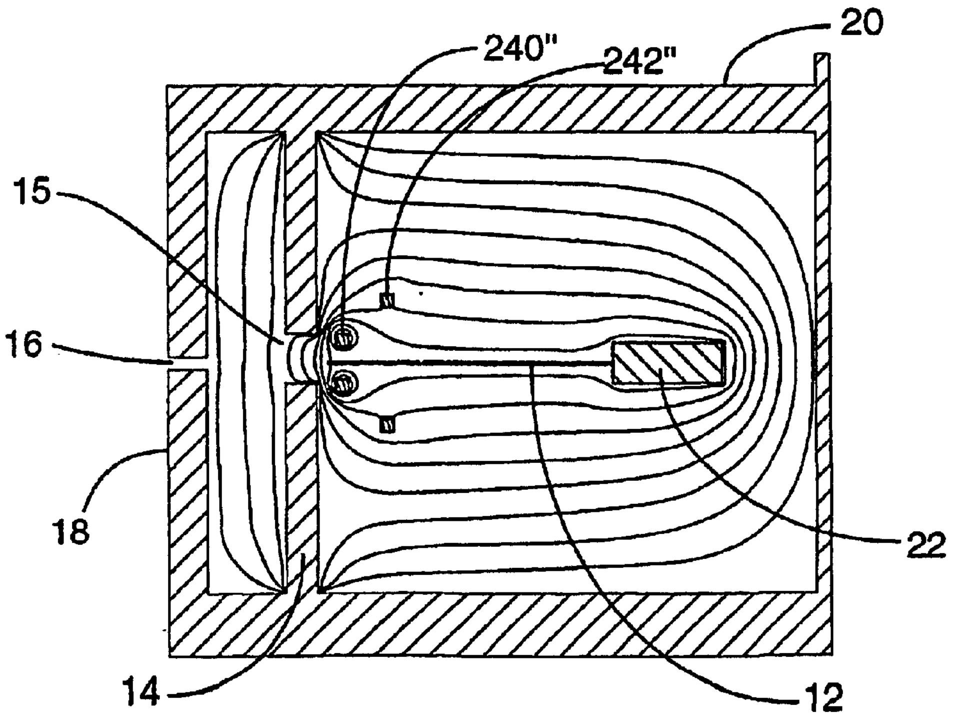
FIG. 33 is a simulation result showing equipotential lines for the ion source of FIG. 31 with the ion lenses substantially misaligned along the axis of the capillary In accordance with the present invention.

Reference is now made to FIG. 33 which illustrates the results of another simulation which shows equipotential lines for the same ion source configuration shown in FIG. 30 except that the ion lenses 240" and 242" have been substantially misaligned along the axis of the sprayer 12. A potential of 4200 V is applied to the sprayer 12, a potential of 5500 V is applied to the ion lens 240" and a potential of 3500 V is applied to the ion lens 242". The curtain plate 14 is biased at a potential of 1800 V, the orifice plate 18 is biased at a potential of 190 V and the housing 20 is at ground. Once again, the simulation results show that the equipotential lines are flat directly in front of the sprayer 12 and perpendicular to the axis of the sprayer 12. Accordingly, this configuration should focus the ions towards the orifice 16 in the orifice plate 18.

Figure 34:
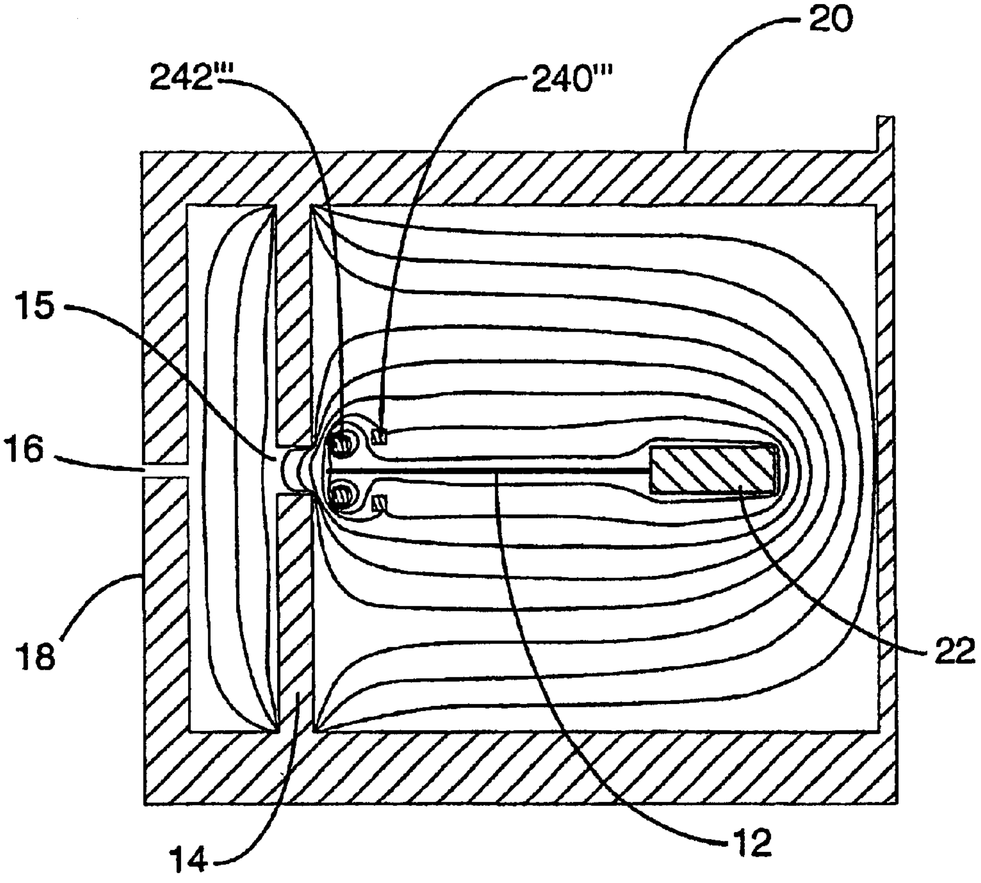
FIG. 34 is a simulation result showing equipotential lines for the ion source of FIG. 31 with the ion lenses placed longitudinally along the sprayer in accordance with the present invention.

Reference is now made to FIG. 34 which illustrates the results of another simulation which shows equipotential lines for the same ion source configuration shown in FIG. 30 except that the ion lenses 240'" and 242'" are aligned along the longitudinal axis of the sprayer 12. Note that ion lenses 240'" and 242'" do not have to have the same dimensions as may be suggested by FIG. 34. A potential of 4200 V is applied to the sprayer 12, a potential of 5500 V is applied to the ion lens 242'" and a potential of 3500 V is applied to the ion lens 240'". The curtain plate 14 is biased at a potential of 1800 V, the orifice plate 18 is biased at a potential of 190 V and the housing 20 is at ground. Once again, the simulation results show that the equipotential lines are flat directly in front of the sprayer 12 and perpendicular to the axis of the sprayer 12. This configuration should focus the ions towards the orifice 16 in the orifice plate 18.

The results shown in FIGS. 30 to 34 illustrate that two ion lenses may be used with an ion source to focus the generated ions towards an aperture. Alternatively, one may also use more than two ion lenses. The basic idea is that the incorporation of more than one ion lens provides an opportunity for further optimization via application of potentials to the extra ion lens(es) so that the equipotential lines can become more favorable directly in front of the sprayer which may result in an ion signal that is further enhanced. The extra ion lens may be oriented concentrically as shown in FIGS. 30 and 31 or misaligned as shown in FIGS. 32 and 33 or aligned longitudinally along the axis of the sprayer as shown in FIG. 34.

Figure 35:
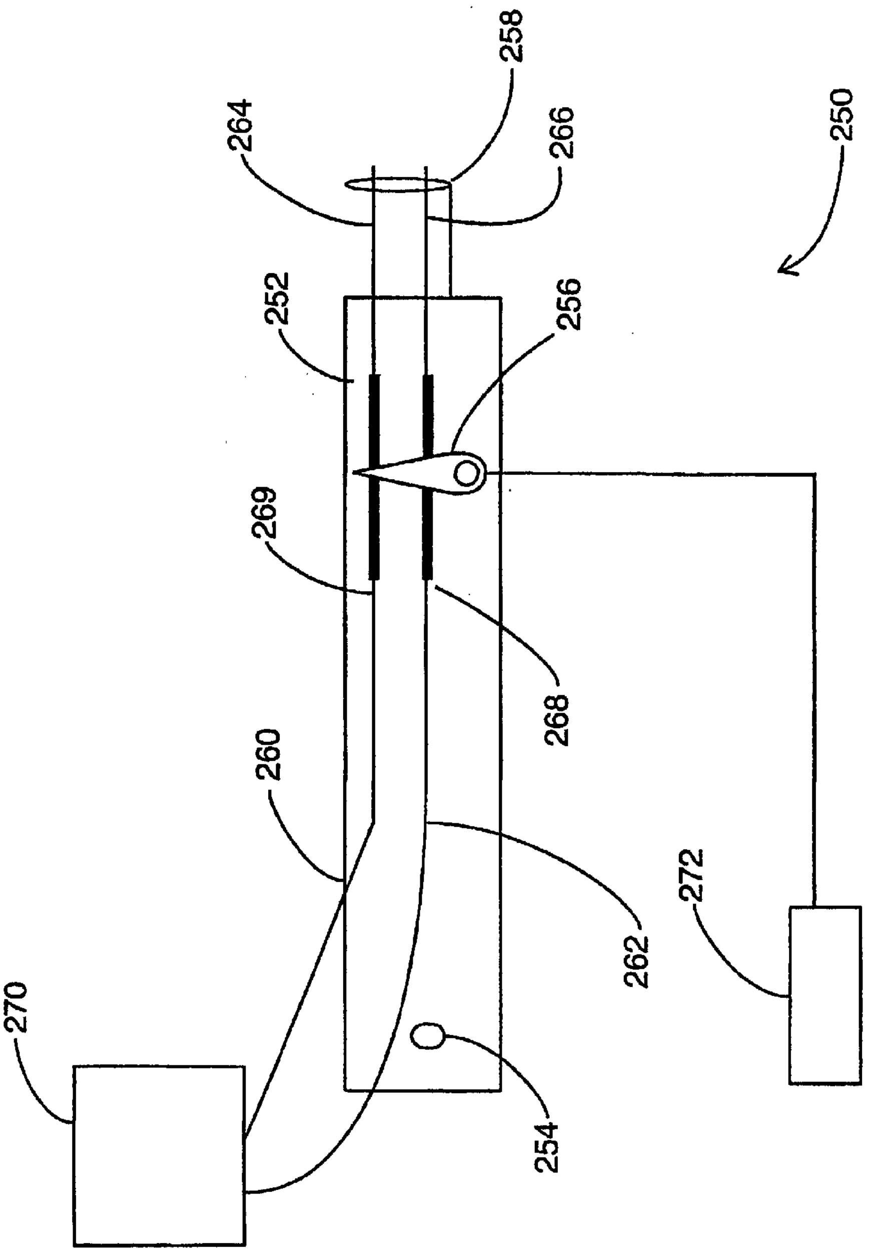
FIG. 35 is a schematic of a multispray ion source with an ion lens in accordance with the present invention.

In another embodiment of the present invention, the use of an ion lens may be extended to ion sources that have multiple sprayers. Referring to FIG. 35, a dual reduced flow-rate electrospray ion source 250 is shown comprising a sprayer mounting bracket 252, a mounting hole 254, a conductive tab 256, an ion lens 258, a first capillary 260 and a second capillary 262, a first sprayer 264 and a second sprayer 266, two capillary butt junctions 268 and 269, a syringe pump 270 and an electrospray power supply 272. The two sprayers 264 and 266 were pulled from fused silica capillaries (150 μm outer diameter and 50 μm internal diameter) to an internal diameter of approximately 15 μm (although other dimensions may be used). The ion lens 258 was placed approximately 2 mm behind the end of the tapered tips of the two sprayers 264 and 266. The ion lens 258 was constructed from stainless steel and was oblong in shape similar to the ion lens shown in FIG. 5*a*. The aperture of the ion lens 258 (not shown) had a length of 10.3 mm, a height of 4.6 mm and was 1.2 mm thick, although other dimensions could be used. The two sprayers 264 and 266 were centered in the ion lens 258. Alternatively, other configurations may be used such as those that were previously shown for the case of a single ion lens and a single sprayer, i.e. the sprayers may be asymmetrically oriented along one or both dimensions of the ion lens 258. Furthermore, the sprayers may be different lengths. In use, the two sprayers 264 and 266 are operated at a reduced liquid flow-rate simultaneously with the ion lens 258 located around the tapered tips of the sprayers 264 and 266. The solution flow rates ranged from 0.2 μL/min to 1 μL/min. Alternatively, other solution flow rates may be used. Also note that more than two sprayers may be used.

Experiments were conducted comparing the dual reduced flow-rate ion source 250 with an ion lens 258 versus a single reduced flow-rate ion source without an ion lens and a dual reduced flow-rate ion source without an ion lens. The applied potentials for the single and dual reduced flow-rate electrospray sources were 3895 V for the sprayers and 1000 V for the curtain plate. For the dual reduced flow-rate ESI ion source 250 with an ion-lens 258, the applied potentials were 4198 V for the sprayers 264 and 266, 1840 V for the curtain plate (not shown) and 2500 V for the ion lens 258.

The results in Table 4 show the measured ion signal for 10 scans of a sample of $10^{-5}$ M bradykinin. Table 4 indicates that doubling the number of sprayers increased the ion signal by a factor of 1.6. The addition of the ion lens further increased the signal Intensity by a factor of 1.34. Therefore, the combination of the extra sprayer and the ion lens resulted in an improvement in the ion signal intensity by a factor of 2.2. In theory, to achieve this increase in ion signal intensity with extra sprayers and no ion lens, 5 sprayers would be required.

TABLE 4

Measured ion signal for 10 scans of a Bradykinin sample

| Sprayer | Single reduced flow-rate electrospray | Dual reduced flow-rate electrospray | Dual reduced flow-rate electrospray with an ion lens |
|---|---|---|---|
| $(P + 2H)^{2+}$ signal (cps) | $2.05 \times 10^6$ | $3.28 \times 10^6$ | $4.45 \times 10^6$ |

Another advantage of the multiple sprayers with the ion lens is the reduced dependence of the strength of the ion signal upon the sprayer position relative to the aperture in the curtain plate. As more sprayers are positioned in front of the aperture, they become positioned further from the optimal location, leading to a decrease in the effectiveness of each additional sprayer. Thus, the improvement in ion signal intensity will decrease with the use of more sprayers. However, the use of anion lens positioned around the sprayers should help alleviate this problem.

Figure 36:
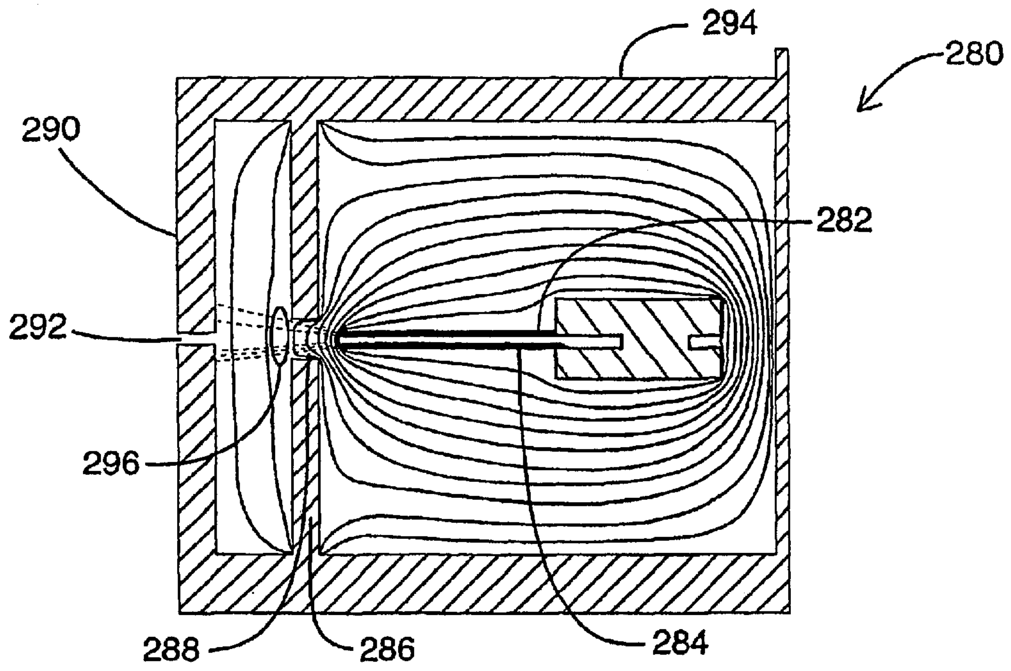
FIG. 36 is a simulation result showing equipotential lines for a prior art multispray ion source without an ion lens; and, FIG. 37 is a simulation result showing equipotential lines for a multispray ion source with an ion lens in accordance with the present invention.

Referring now to FIG. 36, the results of a simulation performed on a dual reduced flow-rate ion source 280 without an ion lens is shown. The dual sprayer ion source 280 comprises a first sprayer 282, a second sprayer 284, a curtain plate 286, an aperture 288, an orifice plate 290, an orifice 292 and a housing 294. The applied potentials in the simulation were 4000 V for the sprayers 282 and 284, 1000 V for the curtain plate 286, and 190 V for the orifice plate 290. The housing 294 was maintained at ground. The resulting equipotentials are curved near the tip of the sprayers 282 and 284 which results in a much wider spread of ion trajectories 296. The defocusing nature of the equipotentials causes many ions to be directed away from the orifice 292.

Figure 37:
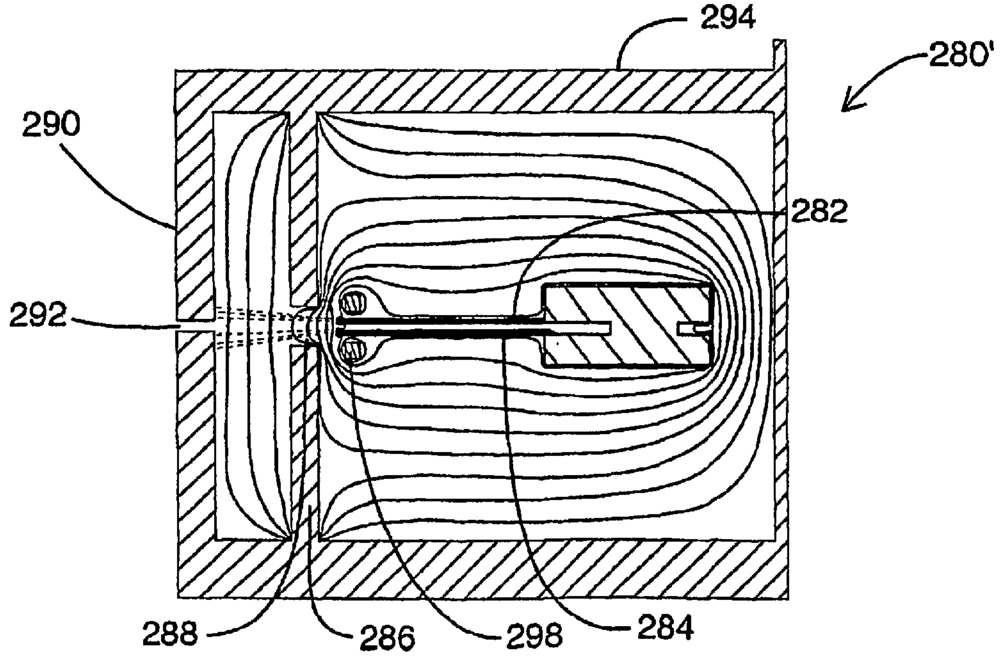

Referring now to FIG. 37, the results of a simulation done on a dual reduced flow-rate ion source 280' with an ion lens 298 shows the resulting equipotential lines. The dual sprayer ion source 280' comprises all of the elements shown in FIG. 36 for the dual sprayer ion source 280 in addition to an ion lens 298. The applied potentials in the simulation were 4300 V for the sprayers 282 and 284, 1800 V for the curtain plate 286, 5220 V for the ion lens 298, 190 V for the orifice plate 290 and 0 V for the housing 294. The equipotentials lines are flattened near the tip of the sprayers 282 and 284. This causes the ions to be directed straight towards the aperture 288 in the curtain plate 286 and then towards the orifice 292.

The dual reduced flow-rate ion source 280' with the ion lens 298 shown in FIG. 37 can be operated such that the sprayers 282 and 284 are used in succession. If two different samples are to be analyzed then one sample may be placed in the first sprayer 282 and the second sample may be placed in the second sprayer 284. The first sprayer 282 is then operated to create ions from the first sample which are then subsequently analyzed by a downstream mass spectrometer. When the analysis is complete, the first sprayer 282 is turned off by stopping the solution flow. The second sprayer 284 is then operated to create ions for the second sample which are then subsequently analyzed by the same mass spectrometer. In addition, separate power supplies can be used for each sprayer, allowing a sprayer to be turned off by controlling the electrospray potential. This system is preferable versus a system with a single sprayer when more than one sample needs to be analyzed since the single sprayer must be changed/cleaned after each sample is analyzed. Alternatively, more than two sprayers may be used. In an alternative embodiment, multiple different samples may be sprayed simultaneously from multiple different sprayers inserted into a single ion lens. This would be beneficial for studies involving the infusion of an internal standard or mass calibrant. A mass calibrant is useful for calibration of a mass range in devices such as a time of flight mass spectrometer whereas an internal standard is useful for determining the concentration of an analyte in an analysis. An internal standard is also helpful in detecting variations in sprayer efficiency.

Based on FIGS. 30 to 37, there are a variety of embodiments for using an ion lens or ion lenses with a sprayer or sprayers. There may be one sprayer and one ion lens surrounding the sprayer. Alternatively, there may be one sprayer and a plurality of ion lens surrounding the sprayer. There may also be a plurality of sprayers and one ion lens that surrounds the sprayers.

In the experiments, it has been observed that under some circumstances, the voltage on the ion lens cannot be increased above the voltage on the sprayer since the electrospray ceases and a droplet is observed to grow at the tip of the sprayer. This may occur because the electric field at the tip of the sprayer decreases to the point where the electric field is insufficient to overcome the surface tension of the droplet. However, as commonly known to those skilled in the art, a small fraction of methanol or other organic solvent may be used in the analyte sample to decrease the surface tension of the forming droplet which may lead to increases in the maximum potential applied to the ion lens which may further increase the ion signal.

The principles of substantially atmospheric pressure ion lenses were described for ESI, ionspray, reduced flow-rate ionspray, reduced flow-rate ESI and nanospray sources used in conjunction with a mass spectrometer. However, the principles of the present invention can also be utilized for capillary electrophoresis mass spectrometry, microchannel ESI mass spectrometry and the transfer of ions for other purposes such as, but not limited to, ion deposition onto surfaces to produce coatings. The present invention may also be applied to atmospheric pressure chemical ionization sources where ionization is produced at a corona discharge tip. The present invention may further be used for depositing a sample in ion sources which employ Matrix Assisted Laser Deposition ionization. The invention may further be used to provide ions that could be used in downstream regions that are at atmospheric pressure, sub-atmospheric pressure and at or near vacuum. Furthermore, the results shown for reduced flow-rate electrospray ion sources may also correspond to those which may be expected from reduced flow-rate ionspray sources.

It will be readily apparent to those skilled in the art that the invention can be modified in the number and shape of the ion lenses situated in the vicinity of the capillary tip without departing from the fundamental principles and spirit of the invention.

It will also be apparent to those skilled in the art that: 1) all potentials used in this description are relative and that for example, the sprayer may be operated at a potential of 0 V with the curtain plate and orifice plate operated at a high negative potential and the ion lens at an intermediate negative potential to produce positive ions; 2) the present invention can apply equally to negative ions provided that all of the potentials previously described are reversed in polarity; and, 3) the solution flow rates are not limited to those described herein which are for illustrative purposes only.

It should be understood that various modifications can be made to the preferred embodiments described and illustrated herein, without departing from the present invention, the scope of which is defined in the appended claims.

The invention claimed is:

1. An ion source apparatus for generating ions from an analyte sample, the apparatus comprising an ion source, at least one counter electrode and an ion focusing element, wherein the ion source is mounted opposite said at least one counter electrode and the ion focusing element is mounted relative to the ion source, whereby, in use, with a potential difference applied between the ion source and said at least one counter electrode to generate a plurality of ions, and to cause the plurality of ions to move towards said at least one counter electrode, and with a potential applied to the ion focusing element to change the equipotentials adjacent the ion source to focus and direct ions in a desired axis of ion propagation.

2. The apparatus of claim 1, wherein the ion focusing element is located adjacent to the ion source.

3. The apparatus of claim 1, wherein ions are directed along an axis extending from the ion source and wherein the equipotentials adjacent the ion source are substantially perpendicular to the desired axis of ion propagation, both on the axis and for a substantial area around the axis.

4. The apparatus of claim 1, wherein the ion source, the at least one counter electrode and the ion focusing element are mounted in a housing.

5. The apparatus of claim 4, wherein the housing is one of the counter electrodes.

6. The apparatus of claim 4, wherein the interior of the housing is at substantially atmospheric pressure.

7. The apparatus of claim 4, wherein the apparatus includes an orifice plate with an inlet orifice disposed downstream of a curtain plate that has an aperture and closes off the housing, wherein the ion source, the at least one electrode and the ion focusing element are adapted to direct the generated ions towards the inlet orifice, whereby in use, a greater and more stable flux of generated ions passes through the inlet orifice.

8. The apparatus of claim 4, wherein the apparatus includes an inlet plate having an inlet capillary closing off the housing, wherein the ion source, the at least one electrode and the ion focusing element are adapted to direct the generated ions towards the inlet capillary, whereby in use, a greater and more stable flux of generated ions passes through the inlet capillary.

9. The apparatus of claim 7, wherein the orifice plate is part of an inlet of a mass spectrometer.

10. The apparatus of claim 4, wherein the apparatus further comprises at least one power supply connected to the ion source and the ion focusing element, connectible in use to the at least one counter electrode, and adapted to provide different DC potentials thereto.

11. The apparatus of claim 2, wherein the ion focusing element comprises an ion lens and an attachment element, wherein the attachment element is adapted to receive a constant potential which is applied to the ion focusing element to direct and focus the generated ions.

12. The apparatus of claim 11, wherein the ion lens is mounted to surround substantially the tip of the ion source.

13. The apparatus of claim 12, wherein the ion lens is generally planar and is placed substantially perpendicular to the longitudinal axis of the ion source.

14. The apparatus of claim 12, wherein the ion lens is placed at an angle to the longitudinal axis of the ion source.

15. The apparatus of claim 12, wherein the ion lens is an annular lens having at least one of a continuous and discontinuous cross-section, said cross-section having a shape substantially similar to one of a circle, an oval, a square, a rectangle, a triangle and any other regular and irregular polygon.

16. The apparatus of claim 12, wherein the ion lens is placed at or behind the tip of the ion source.

17. The apparatus of claim 16, wherein the ion lens is placed approximately 0.1 to 5 mm behind the tip of the ion source.

18. The apparatus of claim 16, wherein the ion lens is placed approximately 1 to 3 mm behind the tip of the ion source.

19. The apparatus of claim 16, wherein the ion lens is placed approximately 2 mm behind the tip of the ion source.

20. The apparatus of claim 12, wherein the ion lens has an aperture and the tip of the ion source is symmetrically located along at least one dimension of the aperture.

21. An ion source apparatus for generating ions from an analyte sample, the apparatus comprising:

an ion source;

at least one counter electrode mounted opposite the ion source; and, an ion lens mounted adjacent to the ion source, wherein, during use, a potential difference is applied between the ion source and the at least one counter electrode to generate a plurality of ions, and to cause the plurality of ions to move towards the at least one counter electrode, and a constant potential is applied to the ion lens to chance the equipotentials adjacent to the ion source to stabilize the spray of ionized droplets and to focus and direct the ions in a desired axis of ion propagation.

22. The apparatus of claim 8, wherein the apparatus further includes a curtain gas disposed in front of the inlet capillary.

23. The apparatus of claim 22, wherein the inlet capillary is part of an inlet of a mass spectrometer.

24. The apparatus of claim 22, wherein the apparatus includes a plurality of ion focusing elements which are mounted to substantially surround the tip of the ion source.

25. The apparatus of claim 24, wherein the plurality of ion focusing elements are coaxially mounted in a common plane to substantially surround the tip of the ion source.

26. The apparatus of claim 25, wherein there are two ion focusing elements, the first ion focusing element being positioned to surround the tip of the ion source and the second ion focusing element being coaxially positioned around the first ion focusing element.

27. The apparatus of claim 24, wherein the plurality of ion focusing elements are spaced apart from one another along the longitudinal axis of the ion source.

28. The apparatus of claim 12, wherein the ion focusing element is adjustably mounted.

29. The apparatus of claim 12, wherein the ion lens has an aperture and the tip of the ion source is asymmetrically located along at least one dimensions of the aperture.

30. The apparatus of claim 1, wherein the apparatus comprises at least two ion sources and the ion lens is positioned in close proximity to the at least two ion sources to surround substantially the at least two ion sources.

31. The apparatus of claim 30, wherein the ion lens is placed behind the tip of at least one of the at least two ion sources.

32. The apparatus of claim 31, wherein the ion lens is placed approximately 0.1 to 5 mm behind the tip of at least one of the at least two ion sources.

33. The apparatus of claim 31, wherein the ion lens is placed approximately 1 to 3 mm behind the tip of at least one of the at least two ion sources.

34. The apparatus of claim 31, wherein the ion lens is placed approximately 2 mm behind the tip of at least one of the at least two ion sources.

35. The apparatus of claim 12, wherein the ion lens has an aperture with adjustable dimensions for further focusing and directing the generated ions.

36. The apparatus of claim 1, wherein the ion source is at least one of an atmospheric pressure chemical ionization source, a reduced flow-rate electrospray ion source, a reduced flow-rate ionspray source, an electrospray source, an ionspray source, a nanospray source, and a matrix assisted laser desorption ionization ion source.

37. A method for generating ions from an analyte sample, the method comprising the steps of:

1) supplying the analyte sample to an ion source;

2) providing at least one counter electrode spaced from the ion source;

3) providing a potential difference between the ion source and said at least one counter electrode to generate a plurality of ions; and, 4) providing an ion focusing element and applying a potential to the ion focusing element to change the equipotentials adjacent to the ion source to focus and direct the plurality of ions in a desired axis of ion propagation.

38. The method of claim 37, wherein the method further comprises providing the ion focusing element adjacent to the ion source.

39. The method of claim 37, wherein the ions are directed along an axis extending from the ion source and wherein the method further comprises adjusting the potential applied to the ion focusing element to ensure that the equipotentials adjacent to the ion source are substantially perpendicular to the desired axis of ion propagation, both on the axis and for a substantial area around the axis.

40. The method of claim 38 wherein the method further comprises providing at least one power supply connected to the ion source and the ion focusing element, connectible in use to the at least one counter electrode and providing different DC potentials to the ion source and the ion focusing element.

41. The method of claim 38, wherein the method further comprises providing an ion lens and an attachment element, wherein the method further comprises providing a constant potential to the attachment element for enabling the ion focusing element to direct and focus the generated ions.

42. The method of claim 41 wherein the method further comprises mounting the ion lens to surround substantially the tip of the ion source.

43. The method of claim 42, wherein the method further comprises mounting the ion lens so that the ion source abuts or intersects a plane defined by the ion lens.

44. The method of claim 41, wherein the ion lens has an aperture and the method further comprises adjusting the aperture to further focus and direct the generated ions.

45. The method of claim 41, wherein there are at least two ion sources, the method further comprises the step of placing the ion lens to surround substantially the tip of the at least two ion sources and the ion lens is placed behind the tip of at least one of the at least two ion sources.

46. The method of claim 37, wherein the method further comprises the step of:

5) providing the generated ions to a downstream mass analysis device.

47. The method of claim 42, wherein the method further comprises the step of;

5) providing the generated ions for ion deposition to coat surfaces.

48. The method of claim 46, wherein the method further comprises the steps of:

5) placing similar analyte samples in each ion source; and, 6) operating each ion source simultaneously, whereby, the overall flux of ions generated from the analyte sample is increased.

49. The method of claim 45, wherein the method further comprises the steps of:

5) placing different analyte samples in each ion source; and, 6) operating each ion source sequentially, whereby, switching between the different analyte samples is facilitated.

50. The method of claim 45, wherein the method further comprises the steps of:

5) placing an analyte sample in one ion source and a mass calibrant in another ion source;

6) operating each ion source simultaneously; and, 7) passing the generated ions into a mass analyzer for mass analysis, whereby, the mass calibrant is used to calibrate the mass analyzer.

51. The method of claim 45, wherein the method further comprises the steps of:

5) placing an analyte sample in one ion source and an internal standard in another ion source;

6) operating each ion source simultaneously; and, 7) passing the generated ions into a mass analyzer for mass analysis, whereby, the internal standard is used to assess ion source efficiency and aid in analyte quantitation.

52. The method of claim 45, wherein the method further comprises the steps of:

5) placing an analyte sample in one ion source and a different analyte sample in another ion source;

6) operating each ion source simultaneously; and, 7) passing the generated ions into a mass analyzer for mass analysis.

53. The method of claim 37, wherein the method further comprises optimally positioning the ion source and applying appropriate potentials to the ion focusing element and the ion source such that the magnitude of the ion signal derived from the generated ions is increased.

54. The method of claim 37, wherein the method further comprises optimally positioning the ion source and applying an appropriate potential to the ion focusing element and the ion source such that the relative standard deviation of an ion signal derived from the generated ions is decreased.

55. The method of claim 37, wherein the method further comprises optimally positioning the ion source and applying an appropriate potential to the ion focusing element such that the charge states of the generated ions is changed.

56. The method of claim 37, wherein the method further comprises optimally positioning the ion source and applying an appropriate potential to the ion focusing element such that the ion fragmentation of an ion signal derived from the generated ions is changed.

57. The method of claim 37, wherein the method further comprises optimally positioning the ion source and applying an appropriate potential to the ion focusing element such that the intensity of unwanted background noise ions is reduced.

58. The method of claim 37, wherein the method further comprises applying an appropriate potential to the ion focusing element such that the ion source and the ion focusing element can be used in a broader range of positions relative to a downstream orifice or capillary.

59. The apparatus of claim 7, wherein the apparatus further includes a curtain gas emanating from between the orifice plate and the curtain plate.

60. An ion source apparatus for generating ions from an analyte sample, the apparatus comprising:

an ion source:

at least one counter electrode mounted opposite the ion source; and, a plurality of ion focusing elements mounted to substantially surround the tip of the ion source, wherein, in use, a potential difference is applied between the ion source and the at least one counter electrode to generate a plurality of ions, and to cause the plurality of ions to move towards the at least one counter electrode, and potentials are applied to the plurality of ion focusing elements to change the equipotentials adjacent to the ion source to stabilize the spray of ionized droplets and to focus and direct the ions in a desired axis of ion propagation.

61. The apparatus of claim 60, wherein the plurality of ion focusing elements are coaxially mounted in a common plane to substantially surround the tip of the ion source.

62. The apparatus of claim 60, wherein the plurality of ion focusing elements are spaced apart from one another along the longitudinal axis of the ion source.

* * * * *

UNITED STATES PATENT AND TRADEMARK OFFICE

CERTIFICATE OF CORRECTION

PATENT NO. : 7,067,804 B2

APPLICATION NO. : 10/275990

DATED : June 27, 2006

INVENTOR(S) : David D.Y. Chen et al.

It is certified that error appears in the above-identified patent and that said Letters Patent is hereby corrected as shown below:

In the Detailed Description of the Invention, column 13, line 52, the word --tip-- has been inserted, so that the line reads --the tapered tip 74 affects the generated ion signal. The ion lens--

In the Detailed Description of the Invention, column 15, line 38, the letter “P” has been changed to symbol --ß--, so that the line reads --next dominant peak is protonated ß-cyclodextrin at a m/z--.

In the Detailed Description of the Invention, column 16, line 61, the word “Up” has been changed to --tip-, so that the line reads --V for the ion lens. In addition, the tip of the reduced--.

In the Detailed Description of the Invention, column 27, line 54, the hyphen (-) has been deleted from the word “ion-lens”, so that the line reads --ion source 250 with an ion lens 258, the applied potentials--.

In the Detailed Description of the Invention, column 27, line 62, the word “Intensity” has been amended to --intensity--, so that the line reads --increased the signal intensity by a factor of 1.34. Therefore,--.

In the Claims, column 31, line 24, claim 21, the word “chance” has been amended to --change--, so that the line reads --lens to change the equipotentials adjacent to the ion--.

In the Claims, column 31, line 33, claim 24, the number “22” has been amended to number --2--, so that the line reads --The apparatus of claim 2, wherein the apparatus--.

In the Claims, column 31, line 51, claim 29, the word “dimensions” has been replaced by the word --dimension--, so that the line reads --located along at least one dimension of the aperture.--

In the Claims, column 32, line 65, claim 47, the semi-colon “;” has been replaced with a colon ---:--, so that the line reads --comprises the step of:--

In the Claims, column 33, line 1, claim 48, the number “46” has been changed to number --45--, so that the line reads --The method of claim 45, wherein the method further--.

UNITED STATES PATENT AND TRADEMARK OFFICE

CERTIFICATE OF CORRECTION

PATENT NO. : 7,067,804 B2
APPLICATION NO. : 10/275990
DATED : June 27, 2006
INVENTOR(S) : David D.Y. Chen et al.

It is certified that error appears in the above-identified patent and that said Letters Patent is hereby corrected as shown below:

In the Claims, column 34, line 27, claim 60, the colon ":" has been replaced with a semi-colon --;--, so that the line reads "an ion source;".

Signed and Sealed this

First Day of May, 2007

JON W. DUDAS
*Director of the United States Patent and Trademark Office*